(12) United States Patent
Sakoda et al.

(10) Patent No.: US 9,462,536 B2
(45) Date of Patent: Oct. 4, 2016

(54) WIRELESS COMMUNICATION SYSTEM, WIRELESS COMMUNICATION APPARATUS, WIRELESS COMMUNICATION METHOD AND COMPUTER PROGRAM

(71) Applicant: SONY CORPORATION, Tokyo (JP)

(72) Inventors: Kazuyuki Sakoda, Tokyo (JP); Kenzo Nishikawa, Kanagawa (JP); Yuichi Morioka, Tokyo (JP); Mitsuhiro Suzuki, Chiba (JP)

(73) Assignee: SONY CORPORATION, Tokyo (JP)

( * ) Notice: Subject to any disclaimer, the term of this patent is extended or adjusted under 35 U.S.C. 154(b) by 72 days.

(21) Appl. No.: 14/507,258

(22) Filed: Oct. 6, 2014

(65) Prior Publication Data
US 2015/0023299 A1    Jan. 22, 2015

Related U.S. Application Data

(63) Continuation of application No. 13/333,582, filed on Dec. 21, 2011, now Pat. No. 8,873,517, which is a continuation of application No. 12/610,058, filed on Oct. 30, 2009, now Pat. No. 8,111,671, which is a continuation of application No. 11/066,482, filed on Feb. 28, 2005, now Pat. No. 7,664,130.

(30) Foreign Application Priority Data

Mar. 1, 2004    (JP) ................... 2004-056776

(51) Int. Cl.
*H04W 4/00*    (2009.01)
*H04W 48/02*    (2009.01)
(Continued)

(52) U.S. Cl.
CPC .............. *H04W 48/02* (2013.01); *H04L 47/10* (2013.01); *H04W 28/06* (2013.01); *H04W 74/08* (2013.01); *H04W 84/12* (2013.01); *H04W 84/18* (2013.01)

(58) Field of Classification Search
USPC ....... 370/336, 330, 328, 329, 338, 346, 450, 370/321, 324, 337, 345, 442; 455/63.1, 455/67.1, 517, 146; 375/146
See application file for complete search history.

(56) References Cited

U.S. PATENT DOCUMENTS 6,567,458 B1    5/2003 Kagaya
6,907,258 B2    6/2005 Tsutsumi et al.
(Continued)

FOREIGN PATENT DOCUMENTS

JP    2002-158667    5/2002
JP    2003-143644    5/2003
(Continued)

OTHER PUBLICATIONS

Office Action issued Aug. 31, 2010 in JP Application No. 2005-048878.

*Primary Examiner* — Chi H Pham
*Assistant Examiner* — Alexander O Boakye
(74) *Attorney, Agent, or Firm* — Oblon, McClelland, Maier & Neustadt, L.L.P

(57) ABSTRACT

The present invention eliminates a transmission-waiting operation which is unnecessary while accommodating a prioritized traffic. Although a communication station enters a transmission-disallowed state in response to detection of a signal addressed to another station in accordance with medium access control based on CSMA, if the communication station receives a frame transmitted with priority to a local station during the transmission waiting, it cancels the transmission-disallowed state, sends back a frame responding the frame transmitted with priority and effectively operates a transmission prioritized period. The communication station starts a search procedure to perform a processing of evading duplication of the transmission prioritized periods if it judges a possibility of a problem occurring in a time zone in which reception with priority is possible.

6 Claims, 42 Drawing Sheets

(51) Int. Cl.
*H04L 12/801* (2013.01)
*H04W 28/06* (2009.01)
*H04W 74/08* (2009.01)
*H04W 84/12* (2009.01)
*H04W 84/18* (2009.01)

(56) References Cited

U.S. PATENT DOCUMENTS

| | | | |
|---|---|---|---|
| 6,990,082 B1 | 1/2006 | Zehavi et al. | |
| 7,305,004 B2* | 12/2007 | Sherman | H04W 74/0808 370/329 |
| 7,346,357 B1 | 3/2008 | Kim et al. | |
| 7,535,878 B2 | 5/2009 | Adrangi et al. | |
| 7,535,879 B2 | 5/2009 | Morioka et al. | |
| 7,542,453 B2 | 6/2009 | Morioka et al. | |
| 7,567,540 B2 | 7/2009 | Sakoda | |
| 7,664,130 B2 | 2/2010 | Sakoda et al. | |
| 7,710,929 B2* | 5/2010 | Moreton | H04W 74/02 370/338 |
| 7,983,296 B2 | 7/2011 | Morioka et al. | |
| 8,111,671 B2 | 2/2012 | Sakoda et al. | |
| 2005/0105504 A1 | 5/2005 | Sakoda | |
| 2005/0210157 A1 | 9/2005 | Sakoda | |
| 2006/0025136 A1 | 2/2006 | Fujita et al. | |
| 2006/0039281 A1 | 2/2006 | Benveniste | |
| 2009/0201901 A1 | 8/2009 | Morioka et al. | |
| 2010/0208714 A1 | 8/2010 | Morioka et al. | |

FOREIGN PATENT DOCUMENTS

| | | |
|---|---|---|
| JP | 2003-309572 | 10/2003 |
| JP | 2004-40645 | 2/2004 |
| JP | 2004-350093 | 12/2004 |

* cited by examiner

FIG.27

RTS Frame

| Frame Control | Duration | RA | TA | FCS |

CTS/ACK Frame

| Frame Control | Duration | RA | FCS |

Data Frame

| Frame Control | Duration | Addr1 | Addr2 | Addr3 | SEQ | Addr4 | Frame Body | FCS |

WIRELESS COMMUNICATION SYSTEM, WIRELESS COMMUNICATION APPARATUS, WIRELESS COMMUNICATION METHOD AND COMPUTER PROGRAM

CROSS REFERENCES TO RELATED APPLICATIONS

This is a continuation of U.S. application Ser. No. 13/333,582, filed on Dec. 21, 2011, which is a continuation of U.S. application Ser. No. 12/610,058, filed Oct. 30, 2009, which is a continuation of U.S. application Ser. No. 11/066,482, filed Feb. 28, 2005, now U.S. Pat. No. 7,664,130, issued Feb. 16, 2010. This application is based upon and claims the benefit of Japanese Application JP 2004-56776 filed in the Japanese Patent Office on Mar. 1, 2004, and contains subject matter related to Japanese Application JP 2005-048878 filed Feb. 24, 2005. The entire contents of each of these documents are incorporated herein by reference.

BACKGROUND OF THE INVENTION

Field of the Invention

The present invention relates to a wireless communication system for mutual communication among a plurality of wireless stations such as a wireless LAN (Local Area Network), a wireless communication apparatus, a wireless communication method and a computer program, and more particularly to a wireless communication system, a wireless communication apparatus, a wireless communication method and a computer program, in which a wireless network is configured by each station operating in a self-organized distributed manner.

To be more precise, the present invention relates to a wireless communication system, a wireless communication apparatus, a wireless communication method and a computer program, all enabling each communication station to perform medium access control in accordance with the Carrier Sense Multiple Access (CSMA) system or the Time Division Multiple Access (TDMA) system in an autonomous distributed type wireless communication environment. In particular, the present invention relates to a wireless communication system, a wireless communication apparatus, a wireless communication method and a computer program, all enabling each communication station to evade mutual interference while performing communication securing a band by providing a prioritized utilization region.

As one of the standard specifications of wireless networks, IEEE (The Institute of Electrical and Electronics Engineers) 802.11 (e.g., refer to Non-patent Document 1), HiperLAN/2 (e.g., refer to Non-patent Document 2 or Non-patent Document 3), IEEE 802.15.3, Bluetooth communication and the like can be enumerated. The IEEE 802.11 standard includes extended standards such as the IEEE 802.11a (e.g., refer to Non-patent Document 4), b, g and the like, depending upon a difference of a wireless communication scheme and a frequency band in use.

In general, in order to configure a local area network by using wireless technologies, a method is used by which one apparatus to be used as a control station called an "access point" or a "coordinator" is installed in an area and a network is formed under the collective control by the control station.

In a wireless network disposing access points, in a case where information is transmitted from a certain communication apparatus, an access control method based on band-width reservation has been adopted widely by which a band necessary for transmitting the information is first reserved at an access point to use a transmission path without collision of information transmission with other communication apparatuses. Namely, synchronous wireless communication is performed by mutually synchronizing with communication apparatuses in the wireless network by distributing access points.

In a case where asynchronous communication is to be performed between communication apparatuses on the transmission side and reception side in a wireless communication system having access points, this wireless communication requires by all means wireless communication via an access point so that there arises the problem that a transmission path use efficiency is decreased by half.

As another method of configuring a wireless network, "Ad-hoc communication" has been devised in which terminals perform wireless communication directly and asynchronously. It can be considered that the ad hoc communication in which arbitrary terminals perform wireless communication directly without using a particular access point is suitable particularly for a small scale wireless network configured with a relatively small number of clients positioned near each other.

The Ad-hoc wireless communication system has no central controlling station so that it is suitable for configuring a home network which comprises home electric appliances. The ad-hoc network is characterized in that: the routing is automatically changed if one terminal is in error or turned off so that the network is not easily broke down; and a plurality times of hopping of a packet between mobile stations makes it possible to transfer data relatively further while keeping high data transfer rate. Various developing examples of the ad-hoc system have been known (e.g., refer to Non-patent Document 5).

For example, in a wireless LAN system of IEEE802.11 system, the networking in the IEEE 802.11 is based on the concept of a basic service set (BSS). The BSS is composed of two kinds of modes, namely BSS defined by an infra-structure mode, in which a master such as an access point (AP) functioning as a controlling station exists, and an ad hoc mode composed of only a plurality of mobile terminals (MTs) functioning as mobile stations. The ad-hoc mode, the latter, operates peer to peer in a self-organized manner without having a relation of a controlling station and a controlled station. In this operation mode, when a beacon transmission time comes, each terminal starts counting a random time period and in a case where it receives no beacon from another terminal by the end of the time period, it transmits a beacon.

Now, IEEE 802.11 is exemplified to describe the details of the conventional wireless networking.

<Infrastructure Mode>

In the BSS at the time of the infrastructure mode, an access point performing coordination is indispensable in a wireless communication system. In other words, the access point arranges a range in which radio waves can reach around a local station as BSS, and configures a "cell" so referred to in a so-called cellular system. A mobile terminal existing in the neighbor of the access point is accommodated in the access point to enter the network as a member of the BSS.

The access point transmits a control signal called as a beacon at an appropriate time interval, and a mobile terminal capable of receiving the beacon recognizes the existence of the access point in its vicinity, and further the mobile terminal performs the establishment of a connection with the access point. On the other hand, because the mobile terminal can recognize the next beacon transmission time by receiving a beacon and by decoding the TBTT field in the beacon, the mobile terminal existing around the access point sometimes enters its sleep state by turning off the power sources of its receiver until the next TBTT or a plurality of times later TBTT (in a case where no necessity exists for receiving).

In a case of the infrastructure mode, only the access point transmits a beacon at a predetermined frame period. On the other hand, the peripheral mobile terminal enters the network by receiving the beacons from the access point, and does not transmit any beacons. It is noted that the present invention principally aims to operate a network without intervening by any master controlling station such as the access point, and does not relate to the infrastructure mode directly. Accordingly, the infrastructure mode is not described any more.

<Ad Hoc Mode>

Referring to FIG. 25, the operation in IEEE 802.11 at the time of the ad hoc mode on the other hand is described.

In an IBSS of the ad hoc mode, an MT defines an IBSS in a self-organized distributed manner after performing a negotiation among a plurality of mobile terminals. When the IBSS has been defined, the mobile terminal group determines TBTTs at every fixed interval after negotiations. When each mobile terminal recognizes the arrival of a TBTT by referring to a clock in a local station, the mobile terminal transmits a beacon in a case where the mobile terminal recognizes that no mobile terminal has transmitted a beacon yet after a delay of a random time.

In the example shown in FIG. 25, a situation in which two mobile terminals constitute an IBSS is shown. In this case, any one of the mobile terminals belonging to the IBSS transmits a beacon every arrival of a TBTT. Moreover, there is also a case where beacons transmitted from each mobile terminal collide with each other.

<Frame Format in IEEE 802.11a>

FIG. 26 shows a configuration example of a frame format prescribed in an extended standard of IEEE 802.11, that is, IEEE 802.11a.

A preamble for indicating the existence of a packet is added to the lead of each packet. In the preamble, a known symbol pattern is defined by the standard, and a reception side of the packet judges whether the received signal is worthy of a preamble or not on the basis of the known pattern. Then, the reception side can recognize the existence of a signal.

A signal field is defined successively to the preamble. In the signal field, the information necessary for decoding the information section of the packet is stored. The information necessary for decoding the packet is called as a Physical Layer Convergence Protocol header (PLCP header). In the PLCP header, a RATE field indicating a transmission rate of the information section (including a Service field being part of the PLCP header), a LENGTH field indicating the length of the information section, a parity bit, a Tail bit of an encoder, a Service field and the like are included. On the reception side of the packet, the decoding operations of the subsequent information section can be performed on the basis of the result of the decoding of the RATE field and the LENGTH field of the PLCP header.

The SIGNAL field storing the PLCP header has received coding strong against noises, and is transmitted at a rate equivalent to 6 Mbps. On the other hand, in a packet, the information section is ordinarily transmitted in a transmission rate mode in which the highest bit rate within a range in which errors are generated as little as possible is provided according to the SNR of a receiver or the like.

In IEEE 802.11a, eight kinds of transmission rate modes of 6, 9, 12, 18, 24, 36, 48 and 54 Mbps are defined. Consequently, when a transmitter-receiver is nearly located, a transmission rate mode having a high bit rate is selected, and there is a case where a communication station being located distant cannot decode the information.

The information section is transferred as Physical Layer Service Data Unit (PSDU) to a link layer being an upper layer.

In IEEE 802.11, several frame types are defined. FIG. 27 shows the configuration of the PSDU section in each frame of RTS, CTS, ACK and Data, which are used in the RTS/CTS procedures described above. RTC and CTS will be described later.

In each frame, a Frame Control field and a Duration field are commonly defined. The Frame Control field stores the information indicating the kind and the application of the frame, and the like. In specific, the information shown in the following table 1 is recorded.

TABLE 1

| Title of Field | Length [bit] | Description |
| --- | --- | --- |
| Protocol Version | 2 | Version Information |
| Type/Subtype | 6 | Identifier Indicating Frame Type |
| ToDS, FromDS | 2 | Identifier Determining the Indication Contents of Each ADDR |
| More Fragment | 1 | Flag Indicating the End of Fragment |
| Retry | 1 | Flag Indicating Resending or not |
| ower Management | 1 | Flag Indicating Power Management Mode |
| More Data | 1 | Flag Indicating the Existence of More Accumulated data |
| WEP | 1 | Flag Indicating the Use of WEP |
| Order | 1 | |

In the Duration field, the information of the application (which will be described later) of Network Allocation Vector (NAV) is stored, and a time until the end of the transaction of the packet is recorded.

In the RTS frame, in addition to the above contents, a receiver address (RA) indicating a destination, a transmitter address (TA) indicating a transmission source, and FCS being a check sum exist. Moreover, in the CTS frame and the ACK frame, in addition to the above contents, the RA indicating a destination, and the FCS being a check sum exist.

In the Data frame, in addition to the above contents, four address fields for specifying a transmission source, a destination communication station and the like, a sequence field (SEQ), a Frame Body being the net information to be provided to the upper layer, and a Frame Check Sequence (FCS) being a check sum exist.

<Access Control Procedure in IEEE 802.11>

It is necessary to evade contention when a plurality of users performs access on the same channel. As a representative communication procedure for evading contention, Carrier Sense Multiple Access with Collision Avoidance (CSMA) is known. The CSMA is a connection method for performing multiple accesses on the basis of carrier detection. Because it is difficult in wireless communication to receive a signal which the transmitter performed its information transmission, collisions are evaded by beginning its own information transmission after the transmitter has ascertained the nonexistence of the information transmissions of the other communication apparatus by the CSMA/CA (Collision Avoidance) system not by the CSMA/CD (Collision Detection) system.

The communication system based on the CSMA/CA is described with reference to FIG. 28. In the shown example, it is supposed that there are four communication stations #0 to #3 in the communication environment.

Each communication station having transmission data monitors the state of media for a predetermined frame interval DIFS (DCF (Distributed Coordination Function) Inter Frame Space) from the last detection of a packet. In the case where no media are cleared, namely no transmission signals exist, each communication station performs random backoff. Moreover, in a case of no transmission signals exist further in this period, transmission right is given.

In the shown example, the communication station #0 which has set a random backoff shorter than those of the other neighboring stations can acquire the transmission right to begin a data transmission to the communication station #1.

At the time of the data transmission, the transmission source communication station #0 stores the application information of Network Allocation Vector (NAV) in the Duration field of the header of a MAC frame (MAC header). In the application information, a time until the end of the transaction of the data communication is recorded.

The communication station #1, which is the transmission destination of the data frame, performs a reception operation of the data addressed to the local station only during the period of Duration recorded in the MAC header. Then, when the data reception is completed, the communication station #1 returns an ACK packet to the data source communication station #0.

Moreover, when the communication stations other than the data transmission destination received the data frame, the communication stations decode the record in the Duration field of the MAC header, and recognize the state in which the media is occupied without monitoring the media until the end of the transaction to stop their transmissions. The operation is called such that a neighboring station "sets a NAV". The NAV becomes valid over a period shown in the Duration field. For example, a period until the communication station #1, being the reception destination, returns the ACK packet is assigned as the Duration.

In such a way, according to the CSMA/CA system, a single communication station acquires a transmission right while evading contention, and neighboring stations stop their data transmission operations during a period of a data communication operation to make it possible to evade collisions.

However, in a wireless LAN network in an ad hoc environment, it is known that a hidden terminal problem is generated. The hidden terminal means a communication station that, in a case of performing communication between certain specific communication stations, one of the communication stations of the communication party can listen but the other communication station of the communication stations cannot listen. Because the hidden terminals cannot perform any negotiation among them, there is the possibility that transmission operation collides with each other in a case of the above-mentioned CSMA/CA system only.

As a methodology for solving the hidden terminal problem, CSMA/CA (Carrier Sense Multiple Access Collision Avoidance) in accordance with a RTS/CTS (Request To Send/Clear To Send) procedure is known. The IEEE 802.11 also adopts the methodology.

Moreover, in the RTS/CTS system, a communication station of a data transmission source transmits a transmission request packet RTS (request to send), and starts to transmit data in response to the reception of a confirmation information packet CTS (clear to send) from a communication station of a data transmission destination. Then, when the hidden terminal receives at least one of the RTS or the CTS, the hidden terminal can avoid a collision by setting a transmission suspension period of the local station for a period in which data transmission based on the RTS/CTS procedure is expected to be performed.

FIG. 29 shows an operation example of the RTS/CTS procedure. In the wireless communication environment, it is supposed that four communication stations #0-#3 exist. The communication station #2 can communicate with its neighbor communication apparatus #0. The communication station #0 can communicate with its neighbor communication station #1 and #2. The communication station #1 can communicate with its neighbor communication station #0 and #3. The communication station #3 can communicate with its neighbor communication station #3. However, the communication station #2 is a hidden terminal for the communication station #1, and the communication station #3 is a hidden terminal for the communication station #0.

After the communication station #0 ascertains in accordance with the procedure of the CSMA described above that the media are clear for a fixed period (from a time T0 to a time T1), the communication station #0 transmits an RTS packet to the communication station #1 from the time T1. In the Type/SubType information in the Frame Control field of the RTS packet, the information indicating that the packet is the RTS is recorded. In the Duration field, a time until the end of the transmission-reception transaction of the packet (namely a time until a time T8) is recorded. In the RA field, the address of the destination communication station (the communication station #1) is recorded. In the TA field, the address of the local station (the communication station #0) is recorded.

The transmission rate of each frame of CTS/DATA/ACK, which are transmitted and received subsequently to the RTS packet, basically conforms to the transmission rate mode which is applied in the RTS.

The RTS packet is also received by the communication station #2 located in the neighborhood of the communication station #0. When the communication station #2 receives the RTS signal, the communication station #2 begins its reception operation by finding the preamble, and decodes the PSDU on the basis of the information obtained by decoding the PLCP header. Then, the communication station #2 recognizes that the packet is the RTS packet on the basis of the recorded contents in the Frame Control field in the PSDU, and knows the fact that the communication station #0 intends to transmit some information. Furthermore, from the RA field the communication station #2 recognizes that the local station is not the destination communication station. Then, in order not to prevent the desire of the communication station #0 to perform the transmission, the communication station #2 recognizes the state in which the media are occupied without monitoring the media until the transaction ends, and sets the NAV to stop its transmission. The NAV becomes valid over a period shown in the Duration field, and the communication station #2 enters a transmission-disallowed state until a time T8.

On the other hand, the RTS packet is also received by the communication station #1, being the destination. When the communication station #1 recognizes that the communication station #0 intends to transmit a packet to the local station by decoding the PSDU by the procedure similar to the procedure described above, the communication station #1 sends back a CTS packet at a time T3 after a frame interval SIFS (Short Inter Frame Space) shorter than an ordinary interval (DIFS).

The transmission rate mode of the CTS packet must be the same as that of the RTS. Moreover, in the Frame Control field of the PSDU, a fact that the packet is a CTS packet is recorded. In the Duration field, a time until the end of the transaction (namely a time until the time T8) is recorded. In the RA field, an address of the destination communication station (communication station #1) is recorded.

The CTS packet is also received by the communication station #3 located in the neighborhood of the communication station #1. The communication station #1 decodes the PSDU by the procedure similar to that described above, and thereby recognizes that a certain communication station in the neighborhood schedules the reception of a packet until the time T8. Then, in order not to prevent the desire of the communication station #1 to perform the reception, the communication station #3 sets the NAV to stop its transmission until the end of the transmission. The NAV becomes valid over a period shown in the Duration field, and the communication station #3 also enters the transmission-disallowed state until the time T8 (as described above).

On the other hand, the CTS packet is also received by the communication station #0, being the destination. The communication station #0 decodes the PSDU by the procedure similar to that described above, and thereby recognizes that the communication station #1 is ready to perform reception. Then, the communication station #0 begins to transmit the Data packet at a time T5 after a short frame interval SIFS. In the case where the transmission of the Data packet ended at a time T6 and the communication station #1 could decode the Data packet without any errors, the communication station #1 sends back an ACK at a time T7 after the interval SIFS. By the fact of the reception of the ACK by the communication station #0, the transmission-reception transaction of a packet ends at the time T8.

At the time T8, the communication stations #2 and #3, both being neighboring communication stations, remove their NAVs, and return to their ordinary transmission-reception states.

Summarizing this, by the exchanges of the RTS packet and the CTS packet, the neighboring stations of the communication station #0, the transmission station, are forbidden to perform any transmissions in answer to the reception of the RTS. The neighboring stations of the communication station #1, a reception station, are forbidden to perform any transmissions in answer to the reception of the CTS. As a result, without being interrupted by a sudden transmission signal from a neighboring station, the information transmission from the communication station #0 to the communication station #1 and the sending back of an ACK are performed.

Each communication station in the system performs the transmission procedure with using random backoff (setting a time for medium sensing using random numbers for ascertaining that the media are clear before a transmission) together, and thereby access control by disperse control is performed.

In the IEEE 802.11, four kinds of packet intervals (IFS: inter frame space) are defined. Hereupon, three IFSs of them are described with reference to FIG. 29. As the IFSs, SIFS (short IFS), PIFS (PCF IFS) and DIFS (DCF IFS) are defined in the order of shortness.

In the IEEE 802.11, as a basic medium access procedure, the CSMA is adopted (as described above). Before a transmitter transmits something, the transmitter operates a timer of the backoff for a random time while monitoring a medium state, and the transmission right is not given to the transmitter until the state of the nonexistence of transmission signals during that period is confirmed.

When an ordinary packet is transmitted in accordance with the CSMA procedure (called as a distributed coordination function (DCF)), the medium state is first monitored only for DIFS after the transmission of some packet has been completed. In a case where no transmission signals exist during the period, the random backoff is performed. Moreover, in a case where no transmission signals exist also during the period of the random backoff, the transmission right is given to the transmitter.

On the other hand, when a packet having exceptionally high urgency such as an ACK is transmitted, it is allowed to transmit the packet after the SIFS packet interval. Consequently, a packet having high urgency can be transmitted before a packet to be transmitted in accordance of the ordinary CSMA procedure.

In short, the reason why different kinds of packet interval IFS's are defined is that the priority setting of the transmission right competition of packets is performed according to which one of the SIFS, the PIFS and the DIFS the IFS is, namely according to the length of the packet interval. For what object the PIFS is used will be described later.

<Prioritized Transmission in IEEE 802.11>

IEEE 802.11 prepares means for performing bandwidth reservation transmissions by the communication station's setup of a prioritized transmission time zone in a transmission frame. The bandwidth reservation transmission is described.

In access contention based on the CSMA, it is impossible to secure a fixed bandwidth with a guarantee. Accordingly, in IEEE 802.11, a mechanism for securing a bandwidth with a guarantee and a Point Coordination Function (PCF) exist.

The PCF is realized on the basis of polling, and the PCF is implemented by locating a control station to be a coordinator in the system similarly to the access control by TDMA such as HIPERLAN/2 and IEEE 802.15.3.

FIG. 32 shows an operation example of the PCF. In the example shown in the same drawing, a case where the communication station #0 operates as an access point (AP) and the communication stations #1 and #2 enter the BSS managed by the AP is supposed. Then, it is also supposed that the communication station #1 guarantees a bandwidth to perform the transmission of information.

After the communication station #0 has transmitted, for example, a beacon, the communication station #0 performs poling to the communication station #1 after the interval SIFS further passed (CF-Poll in the drawing). The transmission right of data is given to the communication station #1, which has received the CF-Poll, and the communication station #1 is permitted to transmit the data after the passage of the interval SIFS. Accordingly, the communication station #1 transmits the data after the SIFS.

When the communication station #0 sends back an ACK to the transmission data and a single transaction has ended, the communication station #0 performs the polling to the communication station #1 again. In the shown example, the polling at this time has failed owing to some reason. In this case, when the communication station #0 recognizes that no information has been transmitted from the communication station #1 even if the interval SIFS has passed after the polling, the communication station #0 regards the situation as one in which the polling has failed, and performs the polling again after the passage of the interval PIFS. When the polling has succeeded, the data is transmitted from the communication station #1, and an ACK is sent back.

For example, even if the communication station #2 holds a transmitted packet during the series of procedure, because the communication station #0 or #1 performs a transmission with the interval SIFS or PIFS before the passage of the time interval DIFS, there is no chances of the transfer of the transmission right to the communication station #2, the communication station #1, which has received Polling, always has a prioritized right.

These access periods by the PCF are located in the transmission frame with an object of, for example, regular data deliveries. For example, as shown in FIG. 32, APs frequently periodically locate the PCF.

[Non-Patent Document 1]
International Standard ISO/IEC 8802-11:1999(E) ANSI/IEEE Std 802.11, 1999 Edition, Part II: Wireless LAN Medium Access Control (MAC) and Physical Layer (PHY) Specification

[Non-Patent Document 2]
ETSI Standard ETSI TS 101 761-1 V1.3.1 Broadband Radio Access Networks (BRAN); HIPERLAN Type 2; Data Link Control (DLC) Layer; Part 1: Basic Data Transport Functions

[Non-Patent Document 3]
ETSI Standard ETSI TS 101-761-2 V1.3.1 Broadband Radio Access Network (BRAN); HIPERLAN Type 2; Data Link Control (DLC) Layer; Part 2: Radio Link Control (RLC) sublayer

[Non-Patent Document 4]
Supplement to IEEE Standard for Information technology-Telecommunications and information exchange between systems-Local and metropolitan area networks-Specific requirements-Part 11: Wireless LAN Medium Access Control (MAC) and Physical Layer (PHY) specifications: High-speed Physical Layer in the 5 GHZ Band

[Non-Patent Document 5]
C. K. Tho, "Ad Hoc Mobile Wireless Network" (Prentice Hall PTR)

SUMMARY OF THE INVENTION

As described above, as a methodology for providing prioritized communication, it is known to provide a periodical or quasi-periodical transmission prioritized period. However, in the case where the arrangement of the communication stations as shown in FIG. 33 is supposed, weak points of the methodology of locating the time zones of the prioritized transmissions regularly are exposed. In the example shown in the same drawing, it is supposed that each of the communication stations #0 and #3 operates as a coordinator (AP) and electric waves arrive at only between respective adjacent communication stations.

An operation example showing problems causable in this case is shown in FIG. 34. Because the communication stations #0 and #3 both operating as coordinators (AP) are in the state in which they cannot directly communicate with each other, they cannot be even synchronized with each other. Moreover, although these coordinators just grasp the states of the communication stations under the control of the local station, but do not know the behaviors of the other communication stations. Consequently, as shown in FIG. 34, the situation in which mutual interferences are generated between the communication stations #1 and #2 to make it impossible to perform communication can be generated.

In the arrangement configuration of each communication station as shown in FIG. 33, the communication station #0 is located beyond the communication range of the communication station #2. Consequently, the data transmission from the communication station #0 to the communication station #1 does not hinder the data transmission from the communication station #3 to the communication station #2, and these data transmission operations ought to be able to perform in parallel at the same time.

However, in the example shown in FIG. 34, because the prioritized transmission (PCF) period of the communication station #3 has begun prior to the prioritized transmission (PCF) period of the communication station #0, the communication station #1 enters a transmission-disallowed state for suppressing the interference to the communication station #2, and cannot answer the calling out from the communication station #0. Furthermore, owing to the interference from the communication station #1, the communication station #1 cannot receive any signals from the communication station #0. Consequently, the band cannot be efficiently utilized, and the accommodation of prioritized traffic is difficult.

The present invention took the technical problem described above into consideration. The principal object of the invention is to provide an excellent wireless communication system, a wireless communication apparatus, a wireless communication method and a computer program, all enabling a wireless network to be suitably managed by making each communication station perform autonomous distributed communication operations.

The present invention further provides an excellent wireless communication system, a wireless communication apparatus, a wireless communication method and a computer program, all enabling each communication station to suitably perform medium access control by the CSMA system or the TDMA system.

Moreover, the present invention provides an excellent wireless communication system, a wireless communication apparatus, a wireless communication method and a computer program, all enabling each communication station to perform communication using a guaranteed bandwidth by providing a prioritized utilization region while evading mutual interferences.

Moreover, the present invention provides an excellent wireless communication system, a wireless communication apparatus, a wireless communication method and a computer program, all capable of eliminating unnecessary transmission waiting operation and using a bandwidth efficiently while accommodating prioritized traffic in a wireless network.

The present invention was made in consideration of the problem. A first aspect of the invention is a wireless communication system in which each communication station sets a prioritized utilization region to perform frame transmission with priority. In the communication system, each communication station cancels a transmission-disallowed state and sends back a frame responding to a prioritized transmission frame addressed to a local station in answer to reception of the prioritized transmission frame in a prioritized utilization region of a neighboring station during a period of waiting a transmission on the basis of detection of a signal.

It should be noted that the "system" used in this specification means a logical collection of a plurality of apparatus (or functional modules realizing specific functions) and does not specifically refer to whether or not each apparatus or function module is accommodated in a single housing.

In the wireless communication system according to the present invention, no coordinators are especially disposed. Each communication station informs of beacon information, and thereby let the other neighboring communication stations (i.e. within a communication area) its own existence. Each communication station notifies the other communication station of a network configuration. Moreover, a communication station to anew enter a communication area of a certain communication station can detect a rush into the communication area, for example, by receiving a beacon signal, and can know a network configuration by decoding information recorded in the beacon.

In such a case, when there are no communication stations therearound, the communication station can begin to transmit beacons at suitable timing. Subsequently, a communication station anew entering the communication area sets its own beacon transmission timing so that the beacon should not collide with an existing beacon arrangement. In this case, because each communication station acquires a prioritized utilization region immediately after a beacon transmission, a beacon arrangement is performed in accordance with an algorithm for sequentially setting beacon transmission timing of a newly entered station at the almost middle timing of the beacon interval set by the existing communication stations. Alternatively, the beacon transmission timing of a newly entered station is set at a vacant time of the beacon interval set by the existing communication stations in view of the transmission traffic quantity of the station.

In a general access contention system by the CSMA, each communication station monitors the state of a transmission path. Then, when no transmission signals exist among the transmission paths, each communication station acquires a transmission right. On the other hand, according to the present invention, each communication station sets a transmission prioritized period in a frame period, and performs a data transmission in which a band is guaranteed. For example, a beacon transmission station can perform a transmission with a shorter frame interval in its transmission prioritized period immediately after a beacon transmission, and the other communication stations can perform a transmission after a backoff over a frame interval equal to or longer than that of the beacon transmission station and a random time.

In this case, the priority setting in a contention for the transmission right of a packet is performed according to the length of a frame interval, and consequently a communication station which has set a shorter frame interval can inevitably acquire the transmission right. Consequently, by performing the transmission of the packet with a frame interval shorter than that of the other communication stations over a transmission prioritized period having a length according to a band quantity required by an upper layer after the beacon transmission, the communication station can execute a series of communication procedure without being hindered by neighboring stations. Consequently, a softer QoS management can be realized.

However, in a case of setting the prioritized traffic in such a communication system for performing random access on the premise of the CSMA procedure, or further in case of setting the prioritized traffic by the TDMA system, there is a problem in which the transmission prioritized period set by a communication station sometimes does not operate validly.

For example, in a case where communication stations neighboring to each other operate under the control of a communication station being a hidden terminal to each other to set a transmission prioritized period independent of each other, or in a case where transactions by the RTS/CTS system are simultaneously begun from communication stations being hidden terminals to each other, a situation in which communication cannot performed because an interference is regarded to be caused is created, though respective transmission prioritized periods can be simultaneously operated in parallel in a normal situation. That is to say, owing to a transaction on one side which transaction has begun previously on the basis of the set value of backoff or the like, the transaction on the other side sets a transmission stopping period, though being in a transmission prioritized period, and the transaction on the other side does not operate well (see FIG. 34).

On the other hand, according to the present invention, although a communication station enters a transmission-impossible state in response to a detection of a signal addressed to another station on the basis of the medium access control by the CSMA, the communication station can cancel the transmission-impossible state to send back a frame responding to a frame transmitted with priority which has been addressed to the local station during the transmission waiting and has received.

For example, when the communication station receives a CTS addressed to another station (e.g. a hidden terminal to the local station) from a neighboring station, the communication station sets a NAV to enter the transmission-disallowed state. When the communication station receives an RTS frame which is addressed to the local station and has been transmitted from another neighboring station by utilizing a transmission prioritized period during the transmission waiting period, the communication station cancels the transmission-disallowed state to send back a CTS frame. Thereby, the communication station can effectively operate the transmission prioritized period.

Moreover, in a case where a communication station cancels the transmission-disallowed state, the communication station judges that there is the possibility that some problem is generated in a time zone enabling prioritized reception, and determines to begin a search procedure. Through the search procedure, the communication station executes the processing of evading the duplication of transmission prioritized periods.

For example, in a case where a second communication station recognizes that a signal from a third communication station is received in a time zone in which a transmission using a prioritized utilization region is performed from a first communication station to the second communication station, the second communication station determines to begin the search procedure, and transmits a first message requiring the third communication station to report its reception state. Then, the third communication station sends back a second message including the information pertaining to the communication stations being in transmission-reception states by means of the prioritized utilization region in response to the first message.

Then, for evading the duplication of the prioritized utilization regions, the second communication station transmits a third message to the first communication station which third message requests the evasion of the transmission in the time zone which is record in the second message and in which the third communication station performs transmission and reception using the prioritized utilization region. To the third massage, the first communication station changes the transmission time zone addressed to the second communication station in response to the third message, and thereby the duplication of the prioritized utilization regions is evaded.

Now, the system may be adapted so that the second communication station extracts only entries of the communication stations which are not recognized by the local station on the basis of the second message and transmits the third message to the first communication station which third message requests the restraint of transmissions in the time zones included in the extracted entries.

Moreover, the system may be adapted so that, after the first communication station has ascertained the vacant states of media by the detection of signals, the first communication station changes the transmission time zone addressed to the second communication station.

Moreover, the system may be adapted so that, after the first communication station has changed the transmission time zone in response to the third message, the first communication station may send back a fourth message to the second communication station which fourth message reports a result of the change with regard to whether the first communication station could satisfy the request recorded in the third message or not. To the fourth message, the second communication station judges the propriety of the generation of a future new first message on the basis of the contents of the fourth message.

Moreover, the system may be adapted so that the second communication station transfers the fourth message to the third communication station in a case where the second communication station could not satisfy the request recorded in the third message. To the fourth message, the third communication station judges the propriety of the generation of a future new first message on the basis of the contents of the fourth message.

Moreover, the system may be adapted so that the first communication station stops the transmission operation at least in a part of the prioritized utilization region to the second communication station in a case where the first communication station cannot satisfy the request recorded in the third message from the second communication station. Alternatively, the system may be adapted so that the first communication station utilizes at least a part of the prioritized utilization region to the second communication station in a transmission operation addressed to a station other than the second communication station.

Moreover, as another way of coping with the case of judgment of the existence of the possibility of the generation of some problem in the time zone enabling prioritized reception, the system may be adapted so that the second communication station transmits the second message including the information pertaining to communication stations in the transmission-reception state to the third communication station by means of the prioritized utilization region. In this case, the third communication station transmits a third message to a fourth communication station to be a communication partner of the local station. The third message requests the evasion of the transmission in the time zone which is recorded in the second message and in which the second communication station performs transmission and reception by means of the prioritized utilization region. Then, the fourth communication station changes the transmission time zone addressed to the third communication station in response to the third message.

Now, the system may be adapted so that the third communication station extracts only entries of the communication stations which are not recognized by the local station on the basis of the second message and transmits the third message to the fourth communication station which third message requests the restraint of transmissions in the time zones included in the extracted entries.

Moreover, the system may be adjusted so that, after the fourth communication station has ascertained the vacant states of the media by the detection of signals, the fourth communication station changes the transmission time zone addressed to the second communication station.

Moreover, the system may be adapted so that, after the fourth communication station has changed the transmission time zone in answer to the third message, the fourth communication station sends back the fourth message to the third communication station which fourth message reports a result of the change with regard to whether the fourth communication station could satisfy the request recorded in the third message or not. In this case, the third communication station can judge the propriety of the generation of a future new first message on the basis of the contents of the fourth message.

Moreover, the system may be adapted so that the third communication station transfers the fourth message to the second communication station and the second communication station judges the propriety of the generation of a future new first message on the basis of the contents of the fourth message in a case where the third communication station could not satisfy the request recorded in the third message.

Moreover, the system may be adapted so that the fourth communication station stops the transmission operation at least in a part of the prioritized utilization region to the third communication station in a case where the fourth communication station cannot satisfy the request recorded in the third message from the third communication station. Alternatively, the system may be adapted so that the fourth communication station utilizes at least a part of the prioritized utilization region to the third communication station in a transmission operation addressed to a station other than the third communication station.

Moreover, the system may be adapted so that each communication station preserves the received time zone of a prioritized transmission frame which is not addressed to the local station as a transmission-reception dangerous zone in answer to the reception of the frame.

In such a case, the communication station performing the prioritized transmission can transmit a message requesting a report of the transmission-reception dangerous zone to the partner station of the prioritized transmission, and thereby can receive a message reporting the transmission-reception dangerous zone which is preserved by the partner station. Then, the communication station performing the prioritized transmission can set a prioritized utilization region in a time zone other than the transmission-reception dangerous zone on the basis of the record of the sent-back message to perform the prioritized transmission.

Moreover, each communication station can gather the transmission-reception dangerous zone by receiving the prioritized transmission frame from a neighboring station, and the system may be adapted so that each communication station informs the acquired information pertaining to the transmission-reception dangerous zone to the neighboring station. In such a case, when each communication station tries to perform a frame transmission, the communication station can prevent collisions previously by performing the frame transmission in the way of avoiding the transmission-reception dangerous zones recorded in the information signal received from the transmission destination.

Moreover, a second aspect of the present invention is a computer program described in a computer readable format for executing the processing to set a prioritized utilization region for performing a frame transmission with priority on a computer system. The program includes:

a step of waiting a transmission on the basis of signal detection;

a step of removing a transmission-disallowed state and sending back a frame responding to a prioritized transmission frame addressed to a local station in response to reception of the prioritized transmission frame in a prioritized utilization region of a neighboring station during a period of waiting a transmission;

a step of judging that there is a possibility that some problem is generated in the prioritized utilization region in a case where the transmission-disallowed state is cancelled, and of determining to begin a search procedure for trying to find a cause; and a step of executing processing of evading duplication of transmission prioritized periods through the search procedure.

The computer program according to the second aspect of the present invention defines a computer program described in a computer readable format for implementing predetermined processing on the computer system. In other words, by installing a computer program according to the second aspect of the present invention in a computer system, a cooperating action becomes effective on the computer system, and the computer system operates as a wireless communication apparatus. By activating a plurality of wireless communication apparatus like the above to build a wireless network, operations and advantages similar to those of the wireless communication system according to the first aspect of the present invention can be obtained.

According to the present invention, there can be provided an excellent wireless communication system, a wireless communication apparatus, a wireless communication method and a computer program, all enabling a wireless network to be suitably managed by letting each communication station perform an autonomous distributed communication operation.

Moreover, according to the present invention, there can be provided an excellent wireless communication system, a wireless communication apparatus, a wireless communication method and a computer program, all enabling each communication station to perform medium access control suitably in accordance with the CSMA system or the TDMA system.

Moreover, according to the present invention, there can be provided an excellent wireless communication system, a wireless communication apparatus, a wireless communication method and a computer program, all enabling each communication station to perform communication having a guaranteed bandwidth by providing a prioritized utilization region while evading mutual interferences.

Moreover, according to the present invention, there can be provided an excellent wireless communication system, a wireless communication apparatus, a wireless communication method and a computer program, all enabling the elimination of unnecessary transmission waiting operations to use a bandwidth efficiently while accommodating prioritized traffic in a wireless network.

Other objects, features and advantages of the present invention will become apparent from the preferred embodiments of the present invention to be described later and the more detailed description given in conjunction with the accompanying drawings.

BRIEF DESCRIPTION OF THE DRAWINGS

FIG. 26 is a view showing an example of a frame format in IEEE 802.11a;

FIG. 27 is a view showing a structural example of a frame field defined for every frame type in IEEE 802.11a;

DESCRIPTION OF PREFERRED EMBODIMENTS

The preferred embodiments of the present invention are described in detail with reference to the drawings.

Communication transmission paths assumed in the present invention are wireless, and a network is built among a plurality of communication stations. Communication assumed in the present invention is traffics of a storage switch type, and information is transferred in the unit of a packet. Moreover, in the following description, a single channel is supposed to each communication station, but it is also possible to extend the channel to one using a transmission medium composed of a plurality of frequency channels, i.e. a multi-channel.

A wireless network system according to the present invention has a self-organized distribution type system structure without disposing a coordinator, and executes a transmission control effectively utilizing channel resources by using a transmission (MAC) frame having a loose time division multiple access structure. Moreover, each communication station can transmit information directly and asynchronously in accordance with an access procedure based on a carrier sense multiple access (CSMA: carrier detection multiple connection) so that a self-organized distribution type wireless network can be configured. In an embodiment of the present invention, the communication environment is assumed to be IEEE 802.11a being an extended standard of IEEE 802.11, for example.

In such a wireless communication system without particularly disposing a controlling station as described above, each communication station notifies beacon information on a channel to let another communication station in the neighbor (i.e., within a communication range) know the existence of the local communication station and informs of a network configuration. Furthermore, a communication station newly entering a communication range of a certain communication station can detect itself entering the communication range by receiving a beacon signal and can know the network configuration (or enter the network) by decoding the information described in the beacon.

The processing in each communication station which processing will be described later is basically the processing to be executed by all communication stations entering a network. However, in some cases, not all of the communication stations constituting a network execute the processing which will be described in the following.

Figure 1:
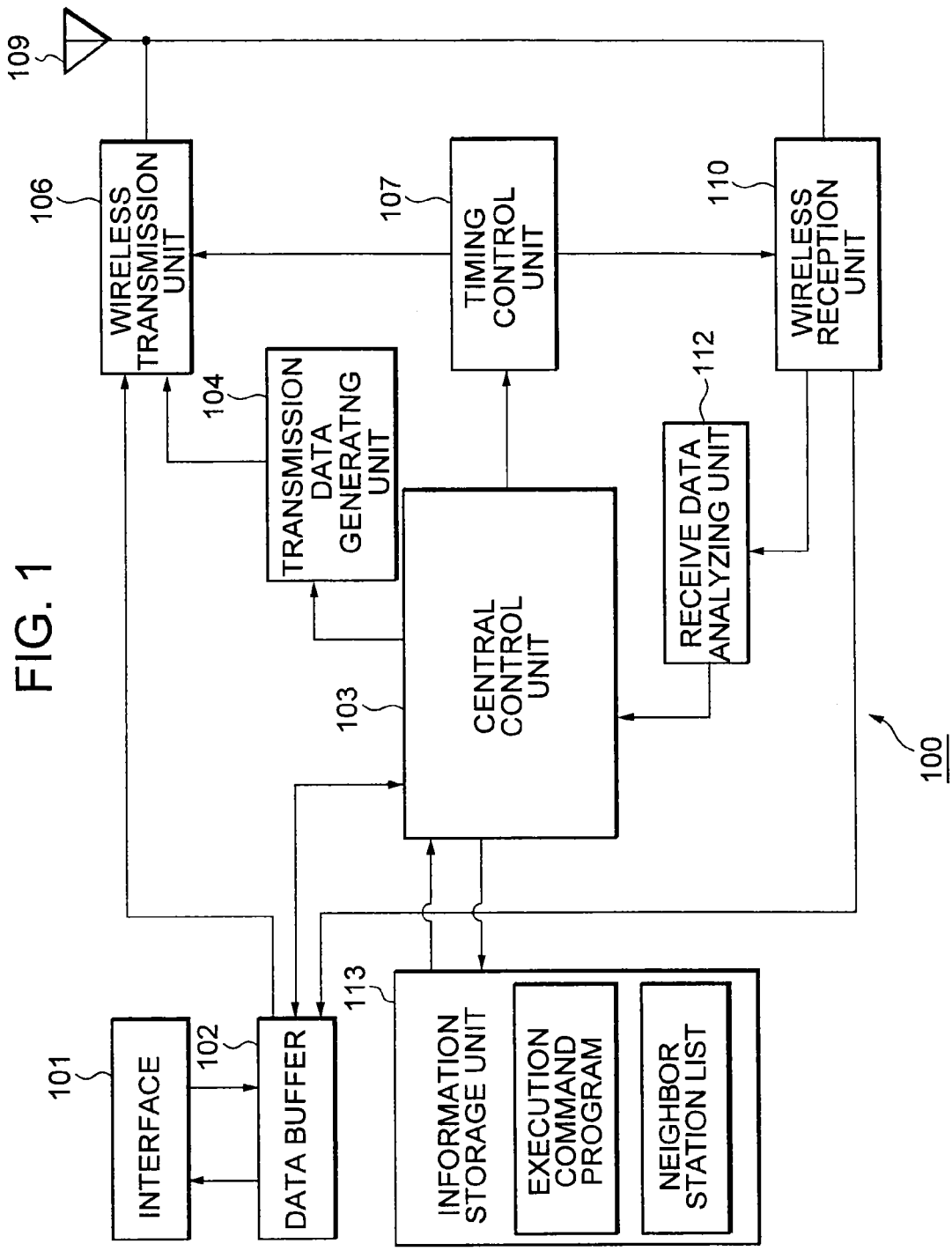
FIG. 1 is a view schematically showing a functional construction of a wireless communication apparatus operating as a communication station in a wireless network according to a preferred embodiment of the present invention.

FIG. 1 schematically shows a functional construction of a wireless communication apparatus operating as a communication station in a wireless network according to a preferred embodiment of the present invention. The shown wireless communication apparatus 100 can form a network while avoiding collisions by effectively performing a channel access in the same wireless system.

As shown in the figure, a wireless communication apparatus 100 is composed of an interface 101, a data buffer 102, a central control unit 103, a transmission data generating unit 104, a wireless transmission unit 106, a timing control unit 107, an antenna 109, a wireless reception unit 110, a receive data analyzing unit 112 and an information storage unit 113.

The interface 101 exchanges various kinds of information with an external apparatus (e.g., a personal computer (not shown) or the like) connected to the wireless communication apparatus 100.

The data buffer 102 is used for temporarily storing data sent from an apparatus connected via the interface 101 or data received via a wireless transmission path, before the data is sent out via the interface 101.

The central control unit 103 performs the management of a series of information transmission and reception processing at the wireless communication apparatus 100 and the access control of a transmission path in an integrated manner. In the present embodiment, basically, medium access control based on CSMA or TDMA is performed and the central control unit 103 can handle prioritized communication with another station. According to the access steps based on CSMA, a backoff timer is operated for a random time period while monitoring a condition of the transmission path so that a transmission right is acquired in a case where no transmission signals exist during this period.

The transmission data generating unit 104 generates a packet signal and a beacon signal to be transmitted from a local station to a neighboring station. The term "packet" here includes a transmission requesting packet RTS of a communication station being a reception destination, an ascertainment responding packet CTS to the RTS, an ACK packet and the like in addition to a data packet. For example, data packet is generated by cutting out the transmission data stored in the data buffer 102 for a predetermined length to be a payload.

The wireless transmission unit 106 includes a modulator for modulating a transmission signal by a predetermined modulation method such as an Orthogonal Frequency Division Multiplexing (OFDM), a D/A converter for converting a digital transmission signal to an analog signal, an up-converter for up-converting an analog transmission signal by performing frequency conversion of the analog transmission signal, a power amplifier (PA) for amplifying the electric power of the up-converted transmission signal, and the like (all being not shown). The wireless transmission unit 106 performs the wireless transmission processing of a packet signal at a predetermined transmission rate.

The wireless reception unit 110 is composed of a low noise amplifier (LNA) for performing the voltage amplification of a signal received from another station through the antenna 109, a down-converter for down-converting the received signal, which has received the voltage amplification, by frequency conversion, an automatic gain controller (AGC), an A/D converter for performing the digital conversion of the analog received signal, a demodulator for performing synchronization processing for acquiring synchronization and demodulation processing by a demodulating method such as channel estimation and OFDM, and the like (all being not shown).

The antenna 109 wirelessly transmits signals to another wireless communication apparatus on a predetermined frequency channel, or collects signals transmitted from another wireless communication apparatus. The present embodiment is configured to have a single antenna and not to perform transmission and reception in parallel.

The timing control unit 107 controls timing for transmitting and receiving wireless signals. For example, the timing control unit 107 performs the control of its own packet transmission timing and the transmission timing of each packet (such as RTS, CTS, data, ACK and the like) in accordance with the RTS/CTS system (or the setting of a frame interval IFS from the reception the packet immediately before to the transmission of a packet of the local station, the setting of backoff at the time of a contention transmission, and the like), and the timing control such as the setting of a NAV at the time of the reception of a packet addressed to another station, the transmission and the reception of a beacon, and the like.

The reception data analyzing unit 112 analyzes a packet signal (including the analysis of a RTS signal and a CTS signal) and a beacon signal which could be received from another station.

The information storage unit 113 stores an execution procedure command program such as a series of access control operations and the like to be executed by the central control unit 103, the information obtained from an analysis result of a received packet and a beacon, and the like. For example, the neighboring apparatus information (such as NBOI (which will be described later)) obtained by the analysis of a beacon is stored in the information storage unit 113, and the information is suitably utilized for the control of communication operations such as transmission/reception operation timing, and for beacon generation processing.

<B. Establishment of Self-Organized Distribution Type Network Based on Beacon Information Exchange>

In the self-organized distribution type network according to the present embodiment, each communication station notifies beacon information at a predetermined time interval on a predetermined channel to let another communication station in the neighbor (i.e., in a communication range) know the existence of the local communication station, and informs of a network configuration. The present specification defines a transmission frame period for transmitting a beacon as a "super frame", and supposes that it is, for example, 80 milliseconds.

A newly entering communication station can detect that it entered a communication range, while listening to a beacon signal from a neighboring station by scan operation, and can know the network configuration thereof by decoding the information written in the beacon. Then, while loosely synchronizing with the reception timing of the beacon, the newly entering communication station sets the beacon transmission timing of the local station at the timing at which no beacons from the neighboring stations are transmitted.

A beacon transmission procedure at each communication station according to the present embodiment will be described with reference to FIG. 2.

Each communication station synchronizes loosely while listening to a beacon transmitted in a neighboring area. When a new communication station appears, the new communication station sets its own beacon transmission timing so as not to collide with the beacon transmission timing of already existing communication stations.

In a case where there are no communication stations in a neighboring area, a communication station 01 can start transmitting a beacon at a proper timing. A beacon transmission interval is 80 ms. In an example of the uppermost stage shown in FIG. 2, B01 indicates the beacon transmitted from the communication station 01.

Every communication station newly entering the communication range thereafter sets its own beacon transmission timing so as not to collide with the arrangement of already existing beacons.

Figure 2:
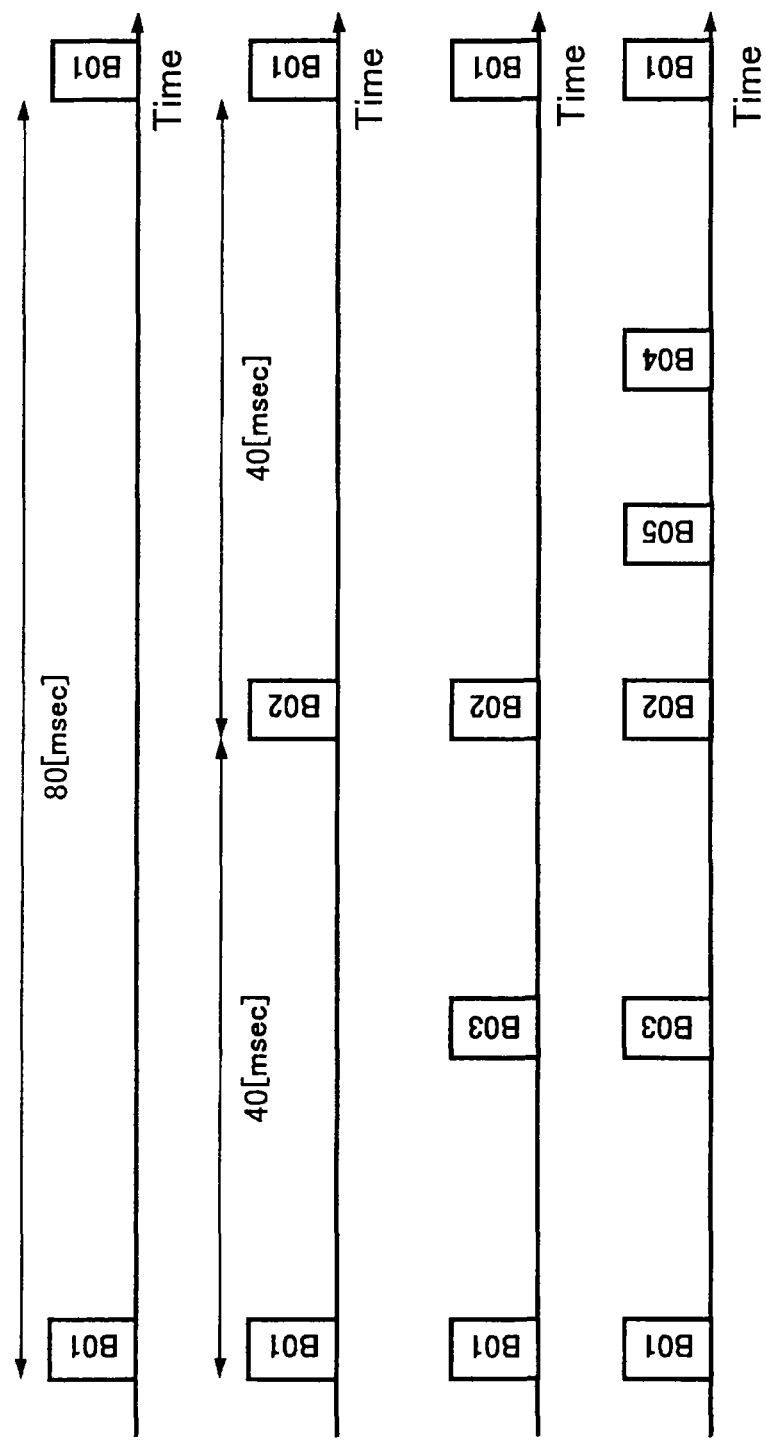
FIG. 2 is a view for explaining a beacon transmission/reception procedure for each communication station in a self-organized distribution type network.

It is assumed for example that a new communication station 02 appears on a channel in which only the communication station 01 exists as shown in the uppermost stage of FIG. 2. In this case, the communication station 02 receives the beacons from the communication station 01 to recognize its existence and beacon positions, and as shown at the second stage of FIG. 2, sets its own beacon transmission timing generally at the middle of the beacon interval of the communication station 01 to start beacon transmission.

It is also assumed that another new communication station 03 appears. In this case, the communication station 03 receives at least one of the beacons transmitted from the communication station 01 and the communication station 02 to recognize the existence of these already existing communication stations. As shown at the third stage of FIG. 2, the communication station 03 starts transmission generally at the timing of the middle of the interval of beacons transmitted from the communication station 01 and the communication station 02.

Subsequently, each time a new communication station enters an area in the neighbor in accordance with the similar algorithm, the beacon intervals are narrowed. For example, as shown at the lowermost stage of FIG. 2, a communication station 04 appearing next sets its beacon transmission timing at generally the middle of the beacon interval set by the communication station 02 and the communication station 01, and a communication station 05 appearing second next sets its beacon transmission timing at generally the middle of the beacon interval set by the communication station 02 and the communication station 04.

A minimum beacon interval Bmin is defined so that the bandwidth (super frame period) is not get flooded with beacons. Two or more beacon transmission timings are not permitted to be set in Bmin. For example, in a case where the minimum beacon interval Bmin is defined to be 5 ms in the super frame period of 80 ms, sixteen communication stations can be accommodated to the maximum in the range where radio waves can reach.

At the time of arranging a new beacon in the super frame, because each communication station acquires a prioritized utilization region (TPP) just after a beacon transmission (which will be described later), it is preferable for transmission efficiency that on one channel the beacon transmission timing of each communication station is uniformly dispersed in the super frame period rather than being crowded. Consequently, in the present embodiment, as shown in FIG. 2, transmission of a beacon is basically set to be started at an approximately the middle in the time zone in which the beacon interval is longest within a range in which a communication station can listen by its own.

It is noted that there is another using method in which each piece of beacon transmission timing of each communication station is arranged to be concentrated and reception operation is stopped in the residual super frame period to decrease the power consumption of apparatus. Alternatively, there is also a using method by which beacon transmission timing is set the transmission data capacity peculiar to a communication station. In the latter case, the communication station sets the beacon transmission timing of the local station to a time (slot) such that the interval to the next beacon is long when the transmission data quantity is large, but the communication station can set the beacon transmission timing to the time such that the interval to the next beacon is short when the transmission data quantity is small. Thereby, a plurality of communication station operating autonomously can effectively use a super frame mutually.

Figure 3:
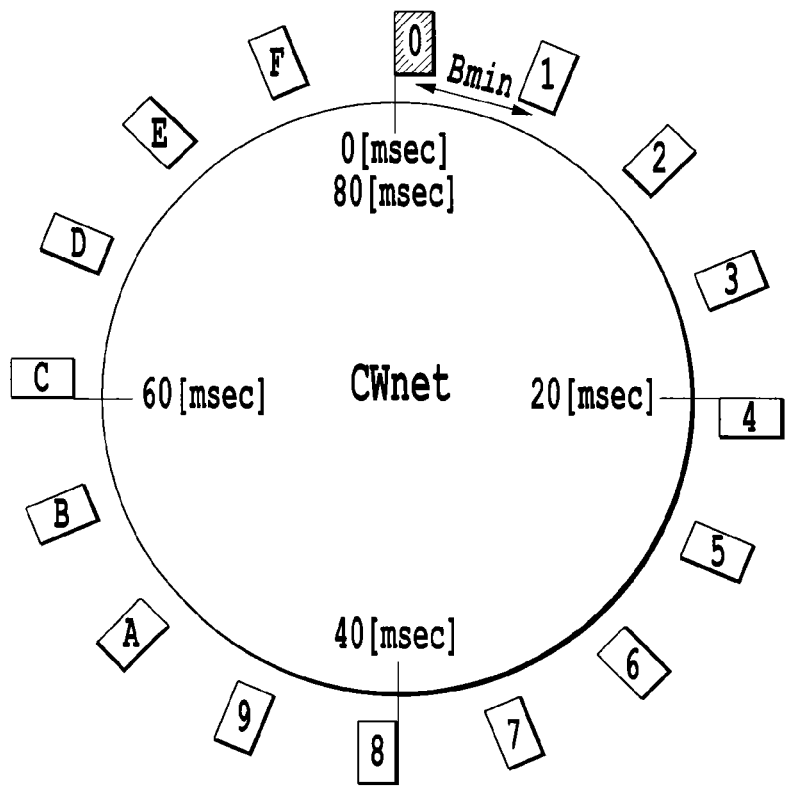
FIG. 3 is a view showing a structural example of beacon transmission timings (TBTT) arrangeable within a super frame period.

FIG. 3 shows an example of the configuration of beacon transmission timing arrangeable in a super frame period. In this example shown in FIG. 3, a lapse of time in the super frame period of 80 ms is drawn as a clock whose hour hand moves on a ring in a clockwise direction.

In the example shown in FIG. 3, sixteen positions 0 to F constitute times at which beacon transmission can be performed, namely as slots where beacon transmission timing can be arranged. As described with reference to FIG. 2, it is assumed that beacons are disposed in accordance with the algorithm that beacon transmission timing of newly entering stations is sequentially set generally at the middle of a beacon interval set by already existing communication stations. If Bmin is set to 5 ms, beacons can be arranged in one super frame up to 16 to the most. That is to say, 16 or more communication stations cannot enter the network.

Although it is not clearly shown in FIGS. 2 and 3, each beacon is transmitted at a time including an intentional offset by a short time from a target beacon transmission time (TBTT), which is the transmission time of each beacon. The offset is called "TBTT offset". In the present embodiment, the value of the TBTT offset is determined by using pseudorandom numbers. The pseudorandom numbers are determined by a uniquely determined pseudo-random sequence TOIS (TBTT offset indication sequence), and the TOIS is updated every super frame period.

Figure 4:
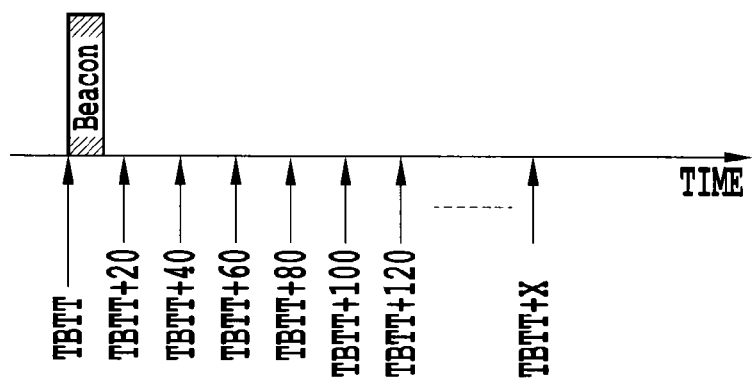
FIG. 4 is a view showing TBTT and actual beacon transmission times.

FIG. 4 shows TBTTs and actual beacon transmission times. As shown in the drawing, in a case where TBTT offsets are defined to be any one of times of TBTT, TBTT+20 microseconds, TBTT+40 microseconds, TBTT+60 microseconds, TBTT+80 microseconds, TBTT+100 microseconds and TBTT+120 microseconds, a TBTT offset at which transmission is performed is determined to every super frame period, and the TOIS is updated. Moreover, in a case where a transmission cannot performed at the time at which the transmission station has intended to perform the transmission, all zeros or the like are stored in the TOIS.

By providing the TBTT offset, actual beacon transmission times can be shifted from each other even in a case where two communication stations arrange their beacon transmission timing in the same slot on a super frame. Even if beacons collide with each other in a certain super frame period, each communication station can listen to mutual beacons (or neighboring communication stations can listen to the beacons of both of them) in another super frame period. The communication stations notify the neighboring stations of the beacon information including TOIS set every super frame period (notification will be described later).

Moreover, in the present embodiment, when each communication station does not perform the transmission and reception of data, each communication station has the obligation of performing a reception operation before and after a beacon which the local station transmits. Moreover, even if each communication station does not perform the transmission and reception of data, each communication station also has an obligation of operating its receiver continuously for one super frame once for several seconds to perform a scanning operation, and thereby of ascertaining whether the existence of the peripheral beacons has changed or not, or whether the TBTT of each peripheral station has shifted or not. Then, when each communication station ascertains a shift in the TBTT, each communication station defines TBTTs defined within a range of −B min/2 milliseconds on the basis of the TBTT group recognized by the local station as "being advanced", and TBTTs defined within a range of +B min/2 milliseconds as "being retarded". Then, time is modified according to the most retarded TBTT.

<C. Accessing Procedure in Self-Organized Distribution Type Network>

The wireless communication apparatus 100 operating as a communication station performs transmission control using a transmission channel effectively by means of a transmission (MAC: medium access control) frame having a loose time division multiple access structure, or communication operation such as random access based on CSMA/CA in a communication environment in which no specific controlling stations are disposed.

Figure 5:
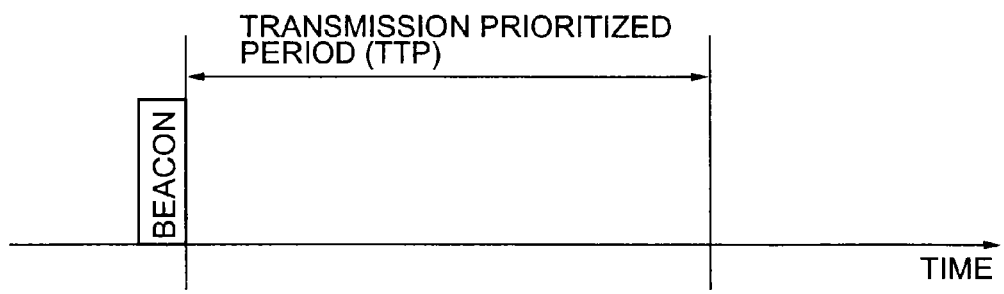
FIG. 5 a view showing a state in which priority is given to a beacon transmitting station.

Although each communication station transmits beacons at a constant interval in the present embodiment, the station having transmitted the beacon is assigned transmission priority during some period after the beacon was transmitted. Thereby, comings and goings of signals are managed to be distributed in a self-organized manner for securing a communication bandwidth (QoS). FIG. 5 shows how the priority is assigned to the station having transmitted a beacon. This prioritized section is defined as a transmission prioritized period (TPP) in the present specification.

Figure 6:
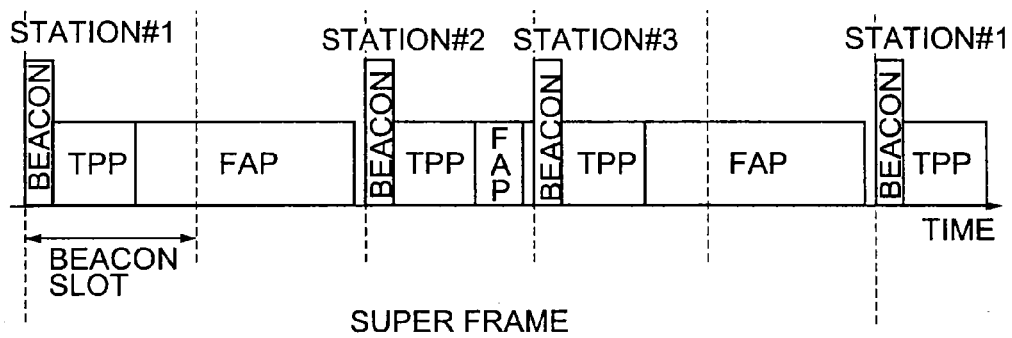
FIG. 6 is a view showing a structural example of the super frame (T_SF) in a case of giving a transmission prioritized period (TPP) to the beacon transmitting station.

FIG. 6 shows an example of the structure of a super frame period (T_SF) in a case where the transmission prioritized period (TPP) is given to the station transmitting a beacon. As shown in FIG. 5, after each communication station has transmitted a beacon, a TPP is assigned to the communication station having transmitted the beacon. A section succeeding to the TPP is defined as a fairly access period (FAP), and communication is performed between communication stations by the ordinary CSMA/CA system. Then, the FAP ends at the timing of transmitting of a beacon from the next communication station, and after that, TPPs and FAPs of beacon transmission stations similarly continue.

Each communication station basically transmits a beacon once in every super frame period. But, according to circumstances, each communication station is permitted to transmit a plurality of beacons or signals similar to beacons, and can acquire a TPP every transmission of a beacon. In other words, each communication station can secure resources for prioritized transmission according to the number of beacons transmitted every super frame period. Hereupon, a beacon which a communication station transmits without fail at the head of a super frame period is called "normal beacon", and the second and following beacons transmitted at the other timing for TPP acquirement or with another object are called "sub beacons (surplus beacons)".

Figure 7:
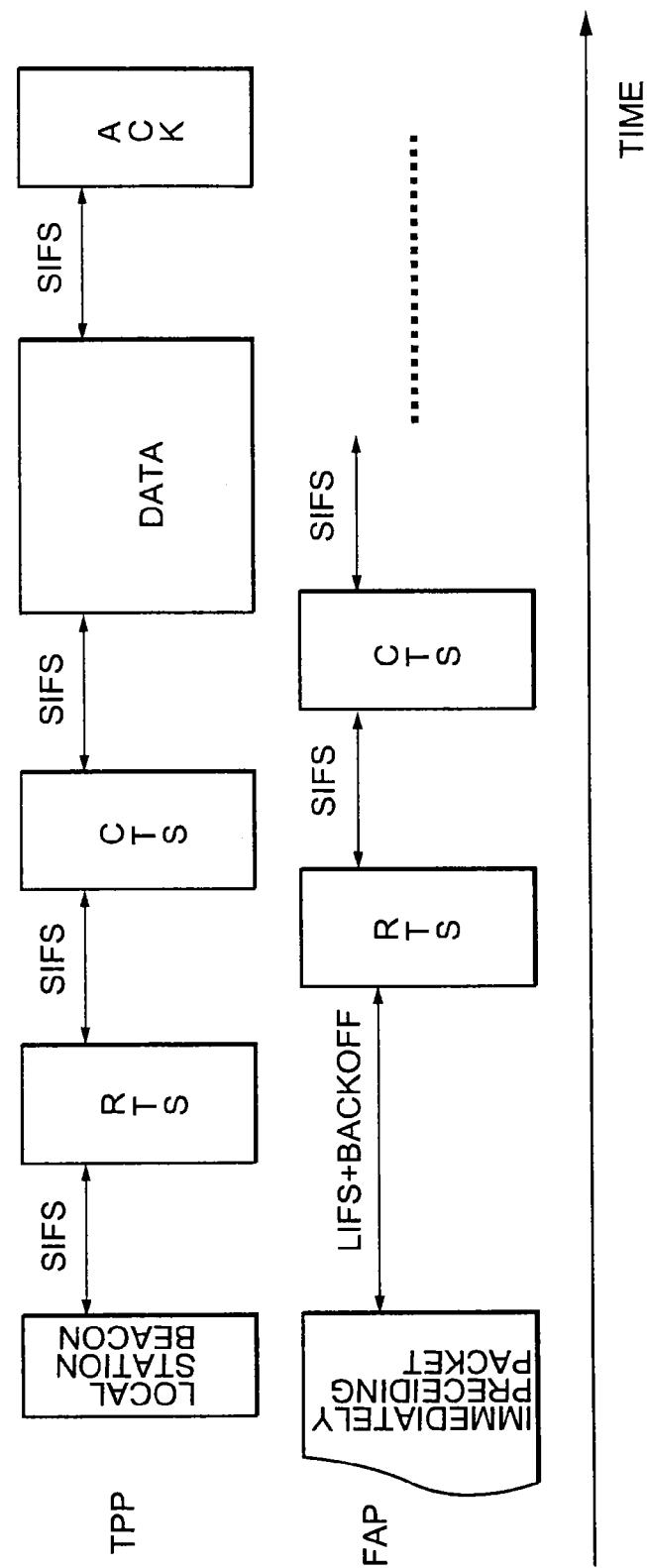
FIG. 7 is a view for explaining an operation in which a communication station starts transmission in the TPP period and an FAP period, respectively.

FIG. 7 illustrates operation of a communication station for starting transmission in a TPP and a FAP respectively.

In the TPP, after the communication station has transmitted a beacon of the local station, the communication station can start its transmission after a shorter packet interval SIFS. In the shown example, the beacon transmission station transmits an RTS packet after the SIFS. Then, also after that, each of the transmitted packets CTS, data and ACK is transmitted with the packet interval SIFS similarly. Thereby, a series of communication procedures can be executed without being hindered by any neighboring stations.

On the other hand, in the FAP, the beacon transmission station starts its transmission after waiting for LIFS+random backoff similarly to the other neighboring stations. In other words, transmission right is uniformly given to all of the communication stations due to the random backoff. In the shown example, after a beacon of another station has been transmitted, first the medium state is monitored only for the LIFS. In a case where the medium is in a clear condition, that is, no transmission signals exist, during this period, random backoff is performed. Furthermore, in a case where no transmission signals exist also in this period, the RTS packet is transmitted. The series of the packets CTS, data, ACK and the like, which are transmitted by being caused by the RTS signal, are transmitted with the packet interval SIFS. Thereby, the series of communication procedures can be executed without being hindered by the neighboring stations.

According to the signal traffic management method described above, a communication station having high priority sets a shorter frame interval, and thereby the communication station can acquire a prioritized transmission right.

However, the transmission prioritized period TPP is fixed to a fixed period equal to the minimum beacon interval or decided in a time unit defined in another way. After that, the communication system shifts to a period called as the FAP, in which all of the communication stations obtain a communication right in an even condition including common IFSs and random backoff. Consequently, in a case where a communication station becomes in need of a communication band exceeding the transmission prioritized period TPP obtained by a time of beacon transmission every super frame in conformity with a request from an upper layer, for example, the communication station is adapted to be able to transmit a sub beacon besides a normal beacon and further acquire a TPP.

Figure 8:
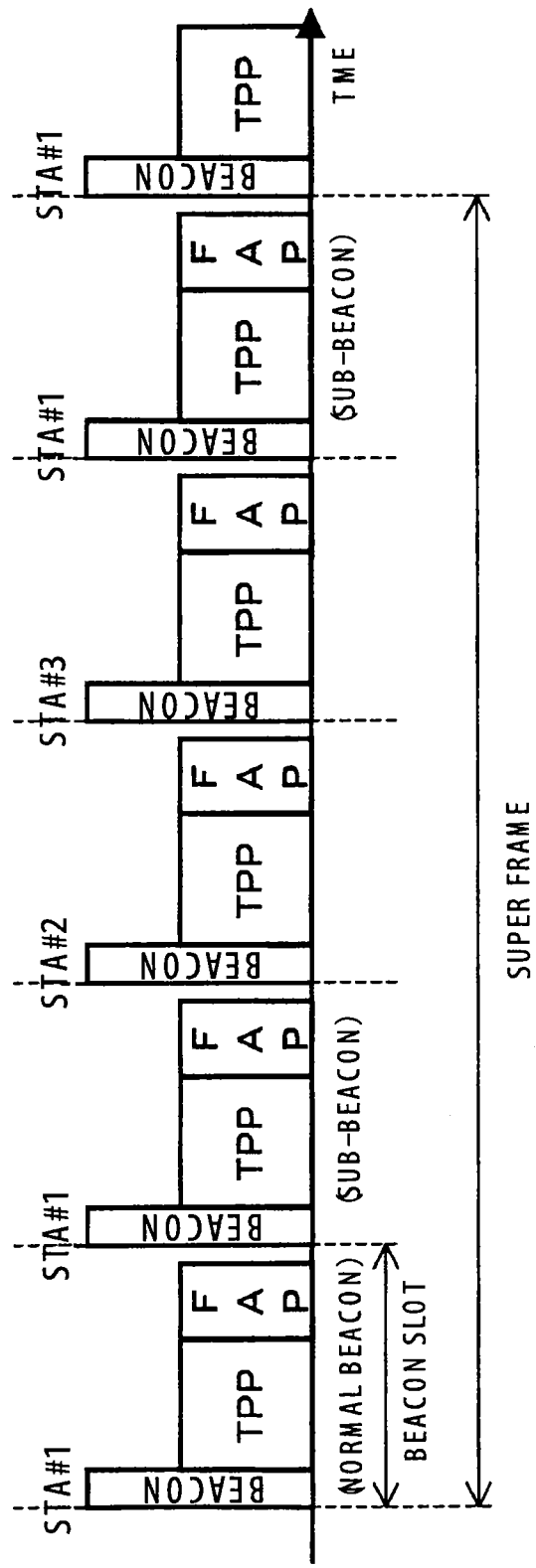
FIG. 8 is a view showing a situation that the communication station transmits a plurality of virtual beacons, i.e., sub beacons (surplus beacons) to increase a prioritized utilizing period.

FIG. 8 shows a state in which a communication station transmits a plurality of virtual beacons called as sub beacons to increase the prioritized utilization periods. In the shown example, the communication station #1 finds a vacant beacon slot in a super frame for securing a communication band requested by an upper layer, and obtains a plurality of TPPs in one super frame by locating the sub beacons of the local station. Because in a system building super frames in a self-organized distributed manner by exchanges of NBOI information, vacant beacon slots can be searched for also in view of a hidden terminal problem, an acquisition method of the bandwidths using the sub beacons is easy.

Moreover, because the sub beacons are transmitted with an object different from that of the beacons in a normal situation aiming notification of network information and the like, the sub beacons are not always required to include the information same as that included in the beacons in a normal situation, and it is sufficient as the sub beacons to be signals recording that "they are frames having the priority different from that of the ordinary frames". Furthermore, the frames are not even required to be beacons, only the description in a control signal frame including RTS, ACK, or the like and a data frame indicating that "the packets has the priority different from that of an ordinary packet" sufficiently satisfies the object. The information and the frame configuration of the beacons in a normal situation will be described later.

Figure 9:
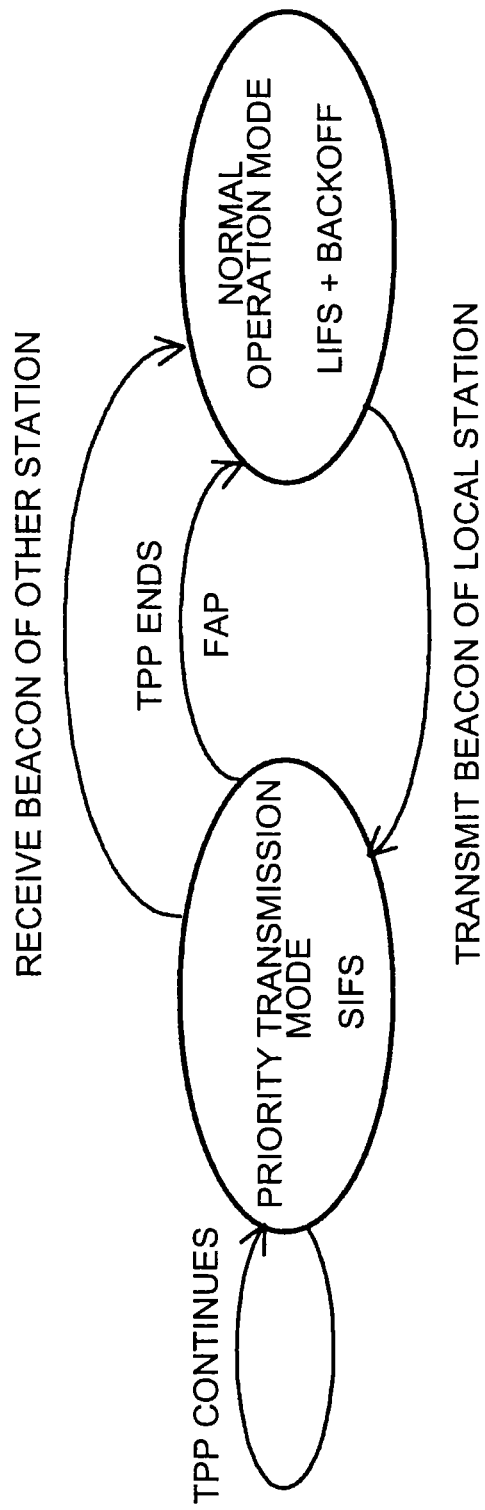
FIG. 9 is a view showing condition transition of the wireless communication apparatus operating as the communication station.

FIG. 9 shows a state transition diagram of the wireless communication apparatus operating as communication stations in the present embodiment. In the shown example, two states are defined. One of the states is a "prioritized transmission mode" equivalent to a TPP period during which the local station acquires a prioritized transmission right. The other of the states is an "ordinary transmission mode" equivalent to an FAP period in which all of the communication stations do not obtain any prioritized transmission right.

In the ordinary operation mode, a communication station begins a transmission after waiting for LIFS+random backoff.

Now, after a beacon transmission timing TBTT of the local station has arrived and a communication station has transmitted a beacon, the communication station transits to the prioritized transmission mode, and acquires the transmission prioritized period TPP.

In the prioritized transmission mode, by performing a transmission with the frame interval SIFS, a communication station can acquire a transmission right without being hindered by any neighboring stations.

The communication station continues the prioritized transmission mode during the transmission prioritized period TPP having a length equivalent to a bandwidth quantity requested by the upper layer.

Then, when the TPP has ended and the communication station enters the FAP, or when the communication station receives a beacon of another station, the communication station returns from the prioritized transmission mode to the ordinary operation mode.

Figure 10:
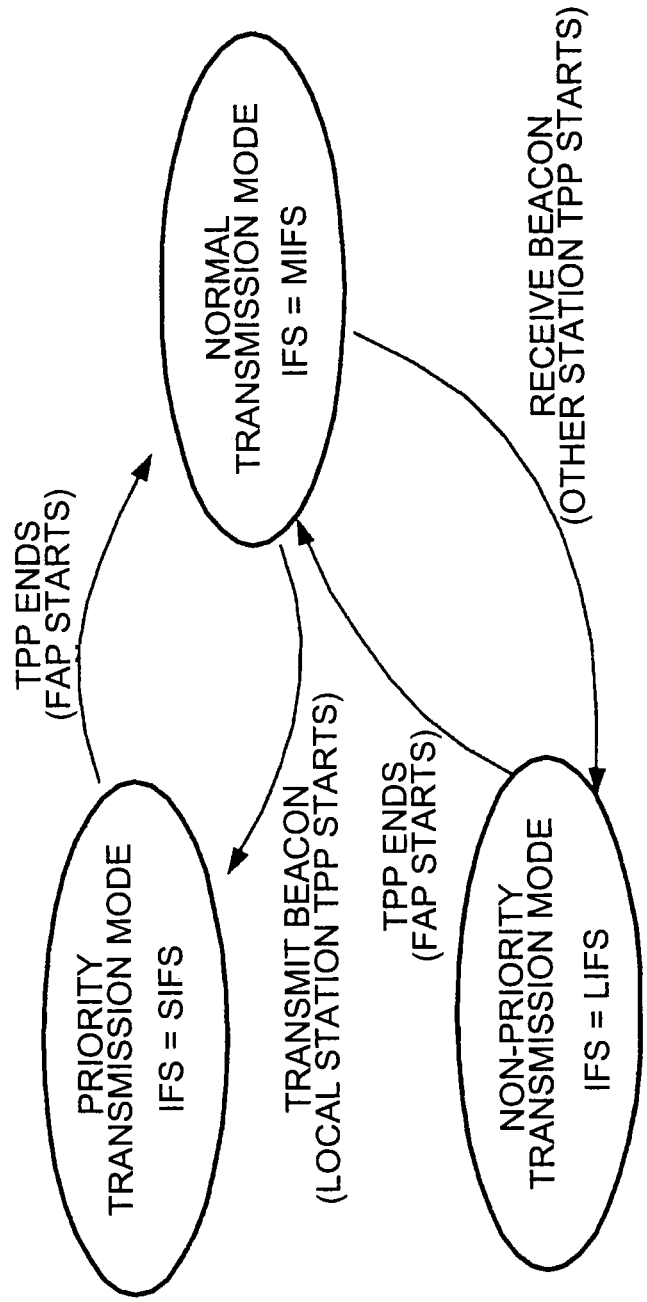
FIG. 10 is a view showing condition transition of the wireless communication apparatus operating as the communication station.

Moreover, FIG. 10 shows another example of the state transition diagram of a wireless communication apparatus operating as a communication station. In the shown example, a state is defined which is called as a "prioritized transmission mode" equivalent to the transmission prioritized period TPP of the another station in addition to the "prioritized transmission mode" equivalent to the TPP period during which the local station acquires a prioritized transmission right and the "ordinary transmission mode" equivalent to the FAP period during which all communication stations do not obtain any prioritized transmission rights.

In the ordinary operation mode, the communication station waits for a period equal to the summation of the ordinary frame interval MIFS and random backoff before beginning a transmission. During the FAP period, all of the communication stations in the system perform transmissions with the interval of MIFS+backoff.

Now, after the arrival of the beacon transmission timing TBTT of the local station and the transmission of a beacon, the communication station transits to the prioritized transmission mode, and acquires the transmission prioritized period TPP.

In the prioritized transmission mode, by the transmission after only the waiting time of the frame interval SIFS shorter than the MIFS, the communication station can acquire a transmission right without being hindered by any neighboring stations. The communication station continues the prioritized transmission mode for the transmission prioritized period TPP having a length equivalent to the bandwidth quantity requested from the upper layer. Then, when the TPP has ended and the communication station enters the FAP, the communication station returns to the ordinary transmission mode.

Moreover, when the communication station receives a beacon from another station and the communication station rushes into the transmission prioritized period of the other communication station, the communication station transits to its non-prioritized transmission mode. In the non-prioritized transmission mode, the communication station waits for a period equal to the summation of a frame interval LIFS, which is further longer than the frame interval MIFS at the time of the ordinary transmission mode, and random backoff before beginning a transmission.

Then, when the TPP of the other station has ended and the communication station entered the FAP, the communication station returns to the ordinary transmission mode.

D. Frame Format of Beacon

Figure 11:
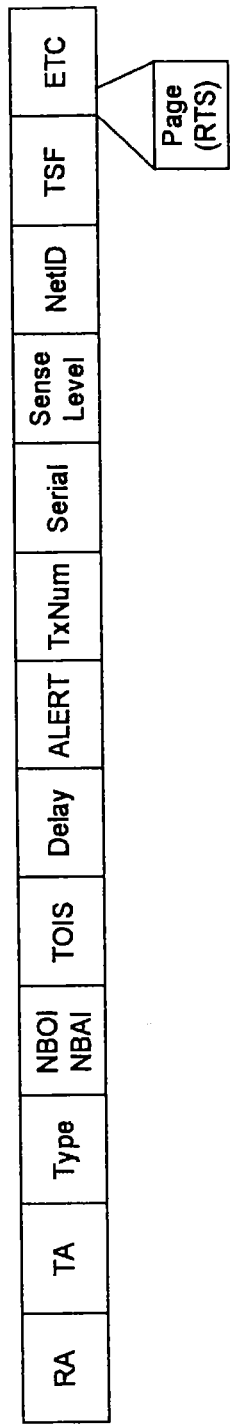
FIG. 11 is a view showing a structural example of a beacon frame format.

FIG. 11 shows an example of the configuration of the format of a beacon frame which is transmitted in a wireless communication system according to the present embodiment.

A beacon includes a Receiver Address (RA) field being an address uniquely indicating a reception object station, a Transmitter Address (TA) field being an address uniquely indicating a source station, a Type field indicating the kind of the beacon, a Neighboring Beacon Activity Information/Neighboring Beacon Offset Information (NBAI/NBOI) field being the information of the reception time of the beacon which can be received from peripheral stations, a TBTT Offset Indication Sequence (TOIS) field being the information indicating the TBTT offset value (described above), an ALERT field storing various kinds of information which are to be transmitted such as a change of the TBTT and so forth, a TxNum field indicating the quantity of the resources with priority secured by the station, a Serial field in which each beacon transmitted in the super frame is exclusively and uniquely numbered as the serial number of the beacon, a Sense Level field indicating the signal detection ability level of the station, a NetID field indicating the logical network to which the station belongs, a Timing Synchronization Function (TSF) field notifying of the time information which the station contains therein independent of the access control, and the like.

Moreover, although there are also fields notifying of the other information in the beacon frame, these frames have no direct connection with the subject matter of the present invention, and accordingly they are described as ETC fields. In the ETC fields, the information such as paging information for a specific station having a schedule of data transmission immediately after the beacon transmission is sometimes included.

In the Receiver Address (RA) field, because a beacon is ordinarily notifying information, a broadcast address is stored. However, in a case where a beacon is transmitted as a sub beacon with an object of bandwidth securing, the RA field sometimes indicates a reception destination station uniquely.

In the Transmitter Address (TA) field, an address uniquely indicating the local station is stored.

In the Type field, the kind of the beacon is stored, and is shown the information for identifying whether the beacon is a normal beacon, which each communication station once transmits during each super frame or whether the beacon is a sub beacon transmitted for obtaining a prioritized transmission right. Moreover, in a case of the sub beacon, the priority of the traffic provided by the sub beacon is mapped. For example, in a case where values are assigned in a way in which a value 255 indicates a normal beacon and values 0-254 are mapped as the priority values of a sub beacon, the normal beacon is recognized as the maximum priority.

Figure 12:
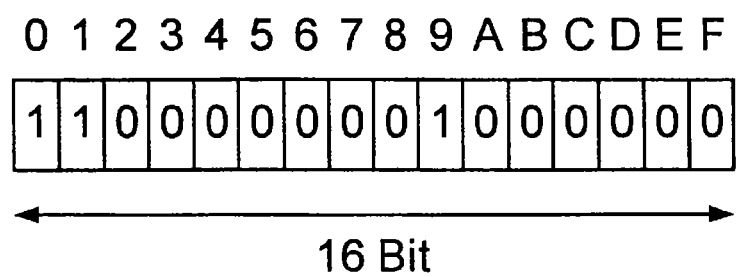
FIG. 12 is a view showing a description example of an NBOI.

In the NBOI field, there is described the positions (reception times) of beacons where the local station can receive the beacons as relative positions from the transmission time of the normal beacon of the local station in the form of a bitmap. For example, as shown in FIG. 12, stations are accommodated up to 16 in one super frame, the NBOI field is composed of 16 bits. Moreover, in the NBAI field, there is described the information specifying a "beacon by which the local station actually performs reception processing" in a format similar to that in the NBOI field.

FIG. 12 shows a description example of the NBOI. In NBOI, each of the communication stations 0-F sets TBTT in each slot capable of containing 16 stations at maximum, composed of 16 bits equivalent to the number of beacons arrangeable in a super frame. In the example shown in the figure, the communication station 0 produces an NBOI field of "1100,0000,0100,0000". This indicates that the communication station 0 shown in FIG. 3 notifies that "the beacons from the communication stations 1 and 9 can be received" in the communication environment. That is to say, in a case where a beacon can be received related to each bit of the NBOI corresponding to the relative position of a received beacon, a mark is allotted, and in a case where the beacon is not received, a space is allotted. Moreover, the reason why the MSB is 1 is that the local station transmits a beacon, and the place corresponding to the time when the local station transmits the beacon is also marked.

When each communication station receives mutual beacon signals on a certain channel, the communication channel can avoid the collisions of beacons on a channel while arranging its own beacon transmission timing, or while detecting the receiving timing of a beacon from a neighboring station on the basis of the description of NBOI included in the beacon signals.

In the TOIS field, a pseudo-random sequence for determining the TBTT offset is stored, and the pseudo-random sequence indicates the quantity of the TBTT offset with which the beacon is transmitted. In the relationship between the TBTT and the actual beacon transmission time, for example as shown in FIG. 4, in a case where an actual beacon transmission time is defined as any one of the times of TBTT, TBTT+20 microseconds, TBTT+40 microseconds, TBTT+60 microseconds, TBTT+80 microseconds, TBTT+100 microseconds and TBTT+120 microseconds, each communication station selects the shift quantity from the TBTT at the time of the transmission of this time before the beacon transmission by updating the TOIS, and determines an actual beacon transmission time. Moreover, in a case where the transmission station cannot perform the transmission at an intended time, the transmission station stores all zero or the like in the TOIS, and transmits to a beacon reception station the information indicating that the beacon transmission timing at this time was not performing at an intended time.

In the Delay field, in a case where the beacon is transmitted with a delay from a scheduled transmission time owing to some cause, a value indicating how much the beacon was delayed from the TBTT to be transmitted (Delay value) is stored. As the causes of the delay of the transmission time of a beacon, there are considerable a cause of the necessity of detecting transmission signals of the other stations for evading collisions, and the other external causes. The communication station which has received the beacon can know the TBTT in which the beacon is accommodated in a normal situation by referring to the Delay field even in a case where the beacon was not transmitted at the scheduled time on the basis of the TBTT and the TBTT offset.

It is noted that, by writing the Delay value into the TOIS field, the frame length of a beacon can be saved. For example, the Delay field is expressed by a flag of one bit, and the TOIS field is defined such that, in a case where the Delay flag is 0, an ordinary TOIS is recorded in the TOIS field, and that, in a case where the Delay flag is 1, a Delay value is recorded in the TOIS field.

In the ALERT field, information which is to be transmitted to neighboring stations in an abnormal state is stored. In specific, in a case where a change of the TBTT of the normal beacon of the local station is scheduled, the schedule is described. Moreover, in a case where the stop of the transmission of sub beacons is requested to the neighboring stations, the request is described.

In the TxNum field, there is described a value equivalent to an hour rate at which the station secures the resources with priority by other means to perform a transmission. To put it concretely, the number of the sub beacons which the station transmits for securing the resources with priority is described.

In the Serial field, as the serial number of the beacon, an exclusive number unique to each of the beacons transmitted in the super frame is described. The information indicating the order of the TBTT in which the beacon is transmitted on the basis of the normal beacon of the local station is described.

In the Sense Level field, the information indicating the level of a received signal (received SINR) to which the station detects as the received signal is stored. There is a case where a communication station lowers the detection accuracy of the preamble in its receiver not to receive the signals received at a low SINR as received signals intentionally with an object of controlling the area in which the local station can perform communication. The field notifies of such a control situation in the communication station. On the side of a beacon reception station, the beacon reception station can adjust the data rate addressed to the beacon source station and can make its own detection accuracy of the preamble by referring to the field.

The Network Identifier (NetID) field is an identifier indicating an owner of the beacon transmitting station or the like. A reception station can recognize whether the local station and the station belong to the logically same network or not by referring to the field.

The Timing Synchronization Function (TSF) field is a field for notifying of the time information contained in the beacon transmission station. The time is used chiefly in an object of synchronization of an application in the application different from medium access. Independent of the correction of a clock for changing the transmission time of a beacon and for preserving the TDMA structure, or of the access control of TBTT offset, the TSF field transmission station shows the transmission time of the signal calculated by free-running faithfully to the clock equipped by the transmission station. On the side of the reception station of the beacon, the value is sometimes provided to the upper layer of the communication protocol together with the reception time, and is preserved as the time information on the basis of the information transmitted from the station.

Moreover, Paging information which may possibly be included in the ETC fields is sometimes equivalent to the information equivalent to the RTS shown with respect to the related art of the CSMA. Moreover, not every time the Paging information exists to the beacons, and there is a case where a beacon and the RTS information clearly showing the object destination communication station are multiplexed in the same PSDU.

<E. Setting TBTT of Beacon>

After the throwing in of the power source, the communication station first tries to perform a scan operation, namely tries to perform to receive a signal continuously for a super frame length or longer, and performs the existence confirmation of a beacon transmitted from a neighboring station. When no beacons have been received from neighboring stations in this process, the communication station sets suitable timing as the TBTT.

On the other hand, in a case where the communication station has received a beacon transmitted from a neighboring station, the communication station shifts the NBOI field of each beacon received from the neighboring station according to the reception time of the beacon while obtaining a logical sum (OR) of them, and refers. Thereby, the communication station extracts beacon transmission timing in the timing corresponding to bit positions which have not been marked, finally. A series of 0/1 obtained by referring to the NBOI field of each beacon received from peripheral communication stations in the way of OR while shifting according to the reception time of the beacon is called as a received NBOI table (Rx NBOI Table).

Because a communication station basically acquires a prioritized utilization region (TPP) immediately after a beacon transmission, it is preferable that the beacon transmission timing of each communication station is even dispersed in a super frame period in view of transmission efficiency. Accordingly, the center of a period in which the run length of a space becomes longest as a result of obtaining OR of NBOI obtained from the beacon received from the neighboring stations is determined as the beacon transmission timing.

However, in a case where the TBTT interval at which the run length becomes the longest is smaller than the TBTT interval at which the run length becomes shortest (i.e. a case of being equal to or less than Bmin), a novel communication station cannot enter this system.

Figure 13:
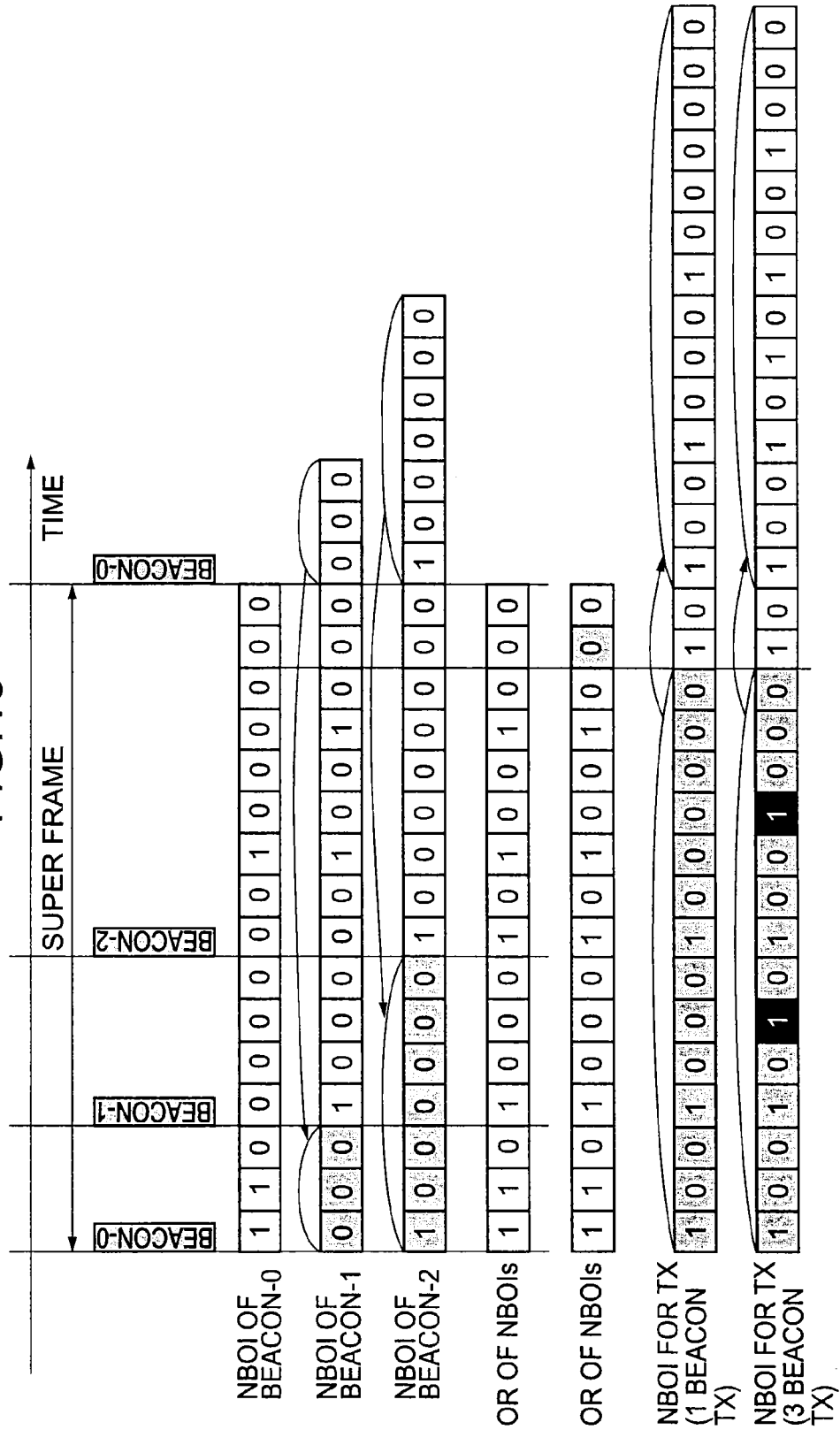
FIG. 13 is a view showing a situation in which a newly entered communication station sets TBTT of the local station on the basis of NBOI of each beacon obtained from a beacon received from a peripheral station.

FIG. 13 shows a state in which a newly entering communication station sets the TBTT of the local station on the basis of the NBOI of each beacon obtained from the beacons received from the neighboring stations. The NBOI is formed of 16 bits equivalent to the number of beacons capable of being located in a super frame.

In the example shown in FIG. 13, a newly appeared communication station A is noticed, and a communication environment in which there are communication stations 0, 1 and 2 around the communication station A is supposed. Then, it is supposed that the communication station A could receive beacons from the three stations 0 to 2 in a super frame by scan operation.

The NBOI field describes the receiving times of beacons from the neighboring stations as relative positions to the normal beacon of the local station in a bit map format (as described above). Accordingly, the communication station A shifts the NBOI fields of the three beacons which could be received from the neighboring stations according to the reception time of each beacon to align the corresponding positions of bits on a time axis, and the communication station A obtains OR of the NBOI bits at each timing to refer.

A series obtained as a result of consolidating the NBOI fields of the neighboring stations to refer is "1101,0001, 0100,1000" shown by being indicated as "OR of NBOIs" in FIG. 13. In the series, 1 denotes a relative position at the timing at which the TBTT has been already set in the super frame, and 0 denotes a relative position at the timing at which the TBTT is not set. In this series, the longest run length of a space (zero) is three, and there are two positions of candidates. In the example shown in FIG. 13, the communication station A sets the fifteenth bit in the series as the TBTT of the normal beacon of the local station.

The communication station A sets the time of the fifteenth bit as the TBTT of the normal beacon of the local station (namely, the head of the super frame of the local station), and starts to transmit a beacon. The NBOI field transmitted by the communication station A at this time is one describing each reception time of the beacons of the communication stations 0 to 2 capable of receiving a beacon in the bit map format in which the bit position corresponding to the relative position from the transmission time of the normal beacon of the local station is marked. This NBOI field is the one shown in FIG. 13 as "NBOI for TX (1 Beacon TX)".

It is noted that, when the communication station A transmits a sub beacon with the object of obtaining a prioritized transmission right or the like, the communication station A, further after this, searches the longest run length of the space (zero) of the series shown as "OR of NBOIs" consolidating the NBOI fields of the neighboring stations, and sets the transmission time of the sub beacon at the place of the searched out space. In the example shown in FIG. 13, a case where two sub beacons are transmitted is supposed, and the transmission timing of the sub beacons is set at the times of the spaces at the sixth bit and the eleventh bit of "OR of NBOIs". In this case, the NBOI field transmitted by the communication station A has marks also at the place where the local station performs beacon transmission (a relative position to the normal beacon) in addition to the relative positions from the normal beacon of the local station and the received beacons from the neighboring stations, and is in the state shown in "NBOI for TX (3 Beacon TX)".

In a case where each communication station sets the beacon transmission timing TBTT of the local station by the above-mentioned processing procedure and transmits a beacon, the collisions of the beacons can be avoided in the condition in which each of the communication stations stand still and the arrival ranges of radio waves do not change. Moreover, by transmitting sub beacons (or a signal similar to a plurality of beacons) in a super frame according to the priority of transmission data, it is possible to assign resources with priority to provide QoS (quality of service) communication. On assigning a prioritized utilization region, it is possible to evade collision of the prioritized utilization regions in the same manner. Moreover, by referring to the number of beacons (NBOI fields) received from peripheral regions, each communication station can autonomously grasp the degree of saturation of the system. Consequently, it becomes possible to perform the containing of a prioritized traffic while including the degree of saturation of the system in every communication station, though the system is a disperse control system. Moreover, because beacon transmission times are arranged in order not to collide with each other by the reference of the NBOI fields of the beacons received by each communication station, the situation in which collisions frequently occur can be avoided even if a plurality of communication stations contains prioritized traffics.

F. Transmission-Disallowed Period (Setting and Referring of NBAI)

In a wireless network according to the present embodiment, an NBAI field is set in the frame format of a beacon with an object of reducing the hidden terminals of beacon reception. The NBAI field is in a format similar to that of the NBOI field. In the NBAI field, bits are arranged on the basis of the transmission time of the normal beacon of the local station, and the information for specifying the TBTT at which the local station actually performs reception processing is described in a bitmap format.

Each communication station in its sleep mode state does not receive any beacons of the other stations. Accordingly, in the sleep mode state, a beacon is transmitted in a state in which all zero is set in the NBAI bits (however, except for the time when the local station performs a beacon transmission). On the other hand, when a communication station enters a communication state with another station, the communication station performs the operation of receiving the normal beacons of the neighboring station. In this case, the beacon is transmitted in a state in which 1 is set in the bits corresponding to the reception times (TBTTs) of the normal beacons of the neighboring station in the NBAI bits.

Incidentally, in a case where the neighboring station uses one or more prioritized utilization regions because of the transmission of sub beacons, 1 is set in the NBAI bits corresponding to the reception times (TBTTs) of the received sub beacons only in a case where it is judged that transmission with priority in the prioritized utilization region is performed to the local station. Whether the prioritized transmission in the prioritized utilization region is performed to the local station or not is judged on the basis of a fact of being in a communication state with the communication station transmitting the sub beacons or a result of an advanced negotiation.

Moreover, in a further case where the destination of the data to be transmitted is assigned to every period defined by transmission of a sub beacon by some means, 1 is set in the NBAI bit corresponding to the reception time (TBTT) of the only sub beacon which is judged to be one accompanied by the TPP having the data addressed to the local station. That is to say, a communication station judges whether the communication station sets 1 to an NBAI bit or not on the basis of whether the sub beacon to be transmitted in the time zone and the signal transmitted by another station using the TPP are transmitted to the local station or not (or whether the local station is required to receive the signal or not).

On the other hand, on the side of the station which has received the beacon, OR operation is performed while shifting the NBAI bits in the received beacon according to the beacon reception time by the procedure (described above) similar to the procedure when the Rx NBOI Table is produced, and thereby whether a transmission-disallowed processing is performed or not in each TBTT set in the super frame is judged.

In a case where the result of the OR operation of the NBAI bit at the corresponding time is 1, the communication station considers lest the beacon reception of the other stations should be hindered by setting the transmission-disallowed state over a fixed period defined from the time of the TBTT, or from a time shortly preceding to the time, to the maximum length of the TBTT offset+the length of the beacon. However, in a case where the TBTT is the beacon transmission time of the local station, the transmission-disallowed processing is not performed, but a frame including the beacon information is transmitted.

Incidentally, the transmission-disallowed state is canceled by performing a beacon transmission or a beacon reception, and the state is changed to the state of the ordinary transmission and reception processing state.

G. Illustration of Case in which Problem Occurs

Figure 14:
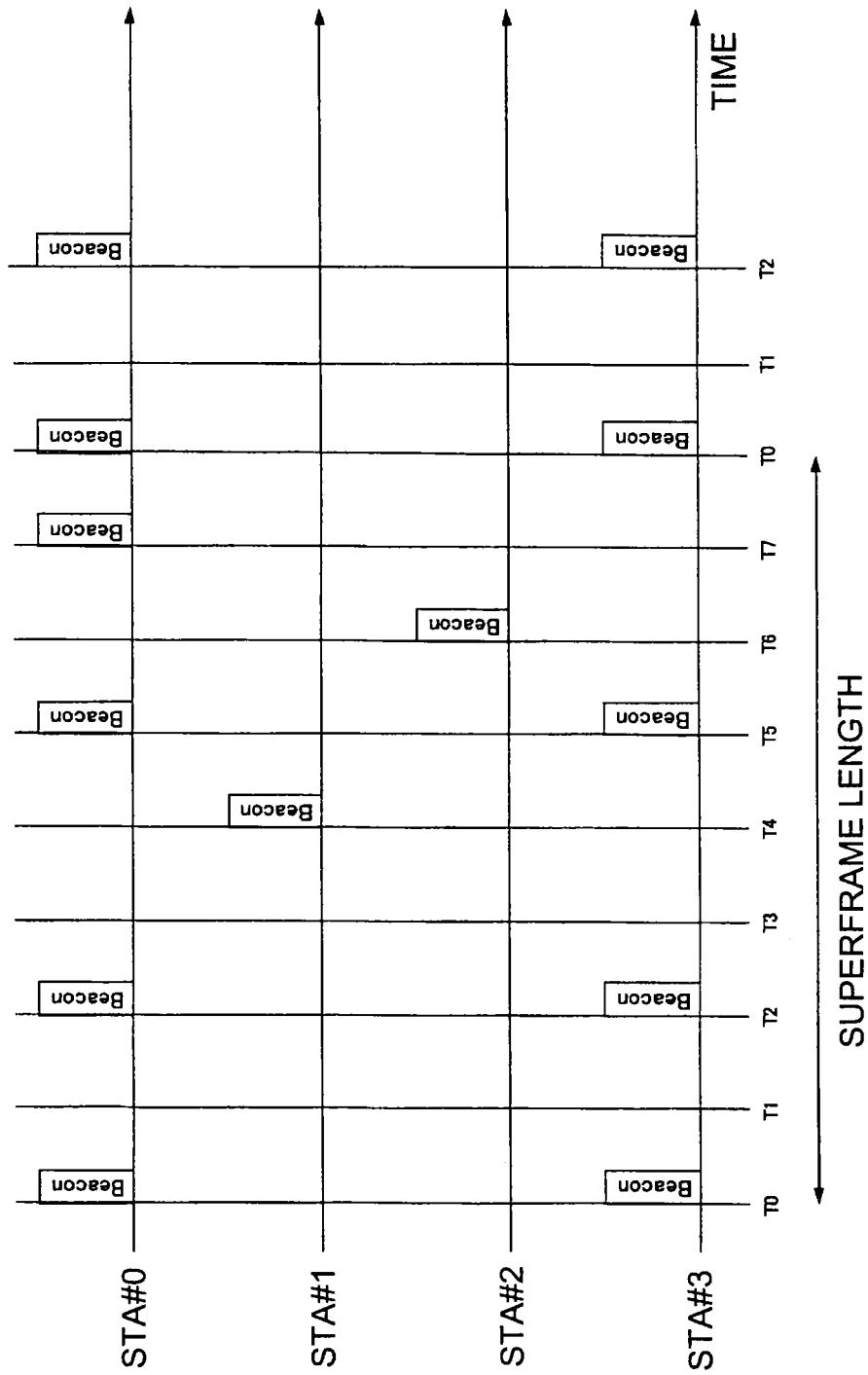
FIG. 14 is a view showing an example of TBTT set by each communication station.
Figure 34:
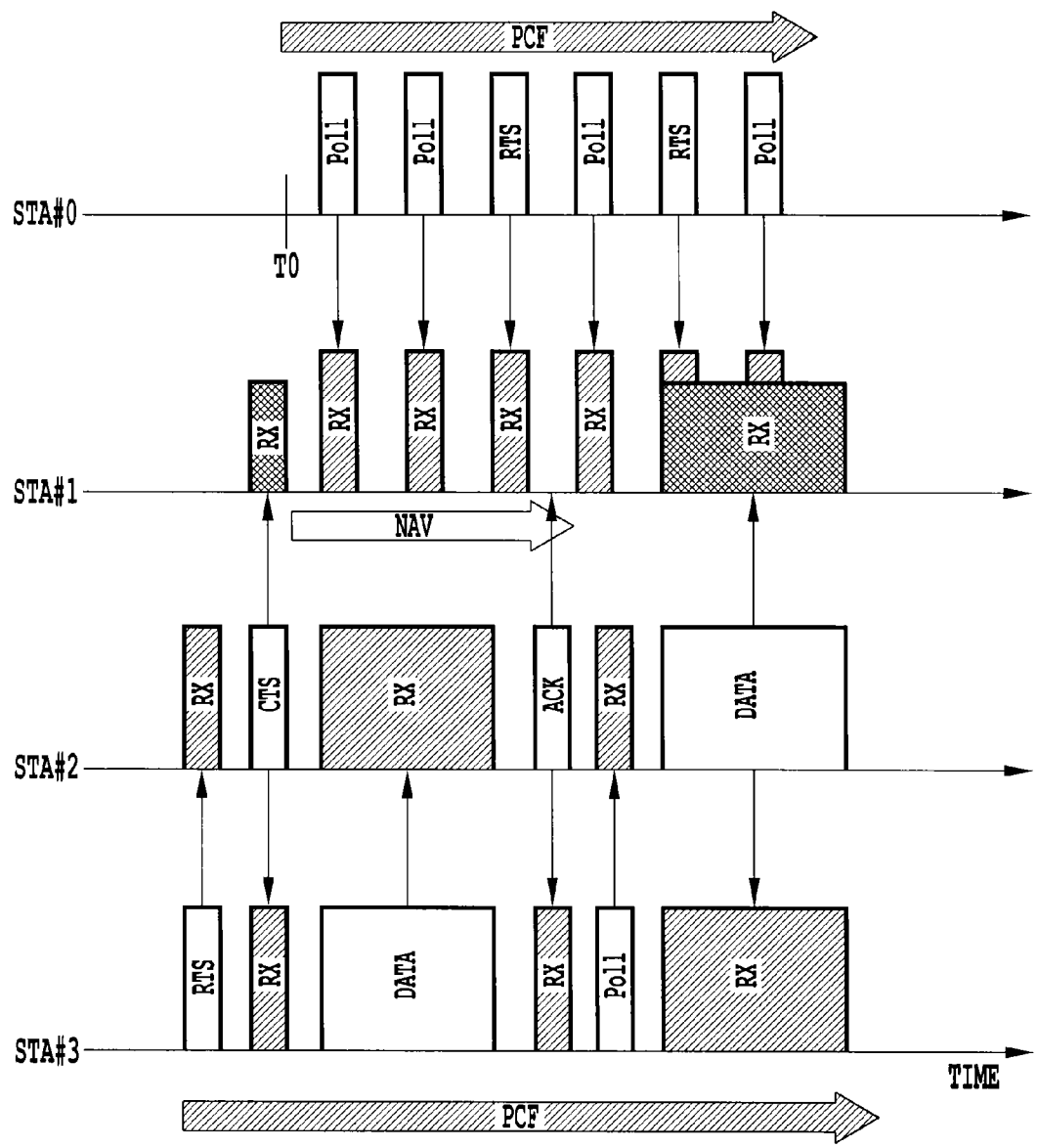
FIG. 34 is a view for explaining a problem in a case of providing a periodical or quasi-periodical transmission prioritized period.

Now, a case where four communication stations are located in the situation shown in FIG. 34 is supposed. In this case, when each communication station transmits beacons in accordance with the procedure described above, there is a case where the beacons of each station are transmitted as shown in FIG. 14, for example. Incidentally, a case where TBTTs at eight positions can be set in one super frame is supposed.

In the shown example, a case where a communication station #0 transmits four beacons in total in a communication application addressed to a communication station #1 and a communication station #3 transmits three beacons in a communication application addressed to a communication station #2 is supposed. Among the beacons, the communication station #0 and the communication station #3 severally select the same TBTT at the times T0, T2 and T5.

Figure 15:
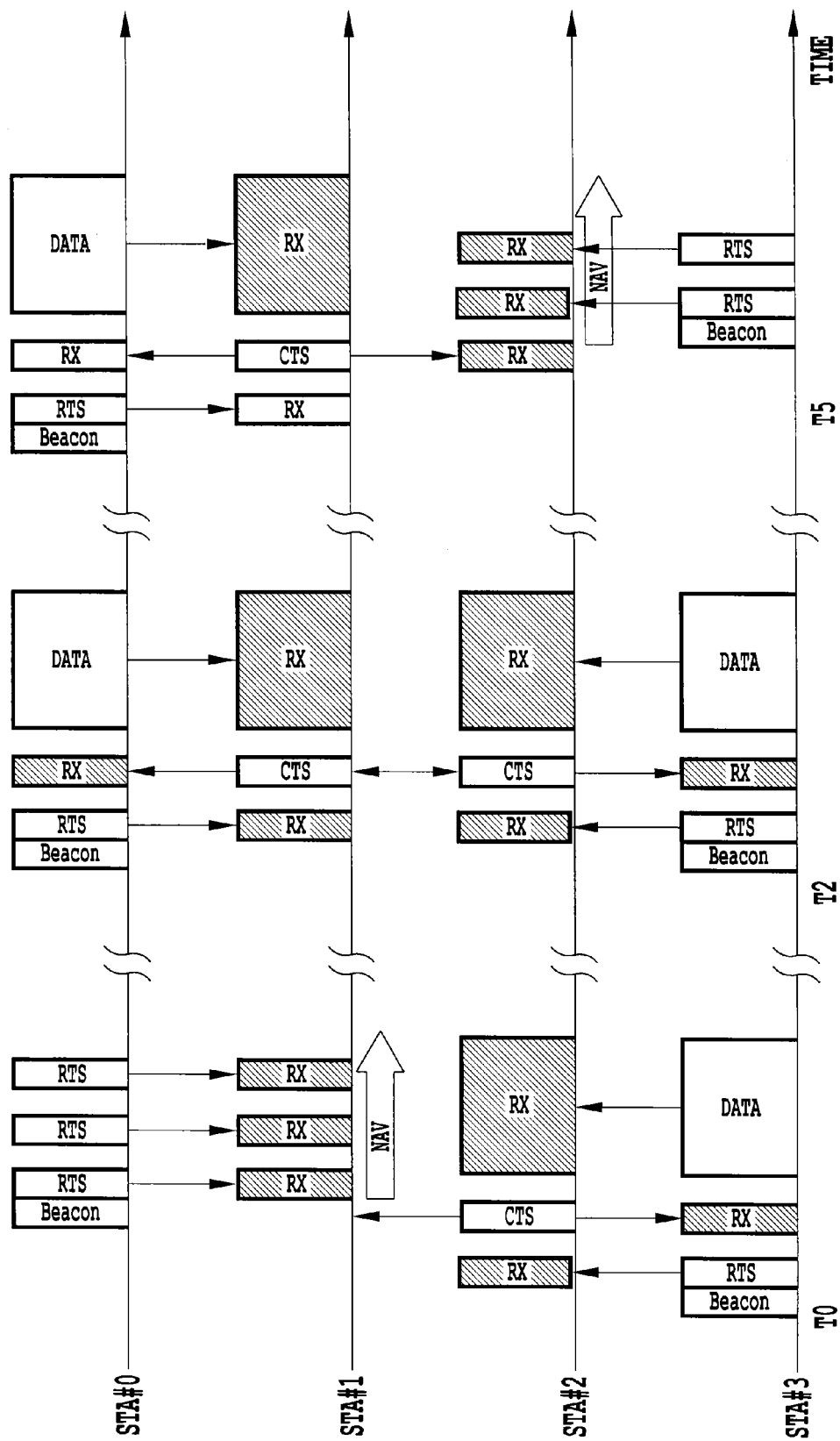
FIG. 15 is a view for explaining a case where the transmission prioritized period cannot be effectively utilized when each station sets TBTT as in FIG. 14.

In this case, there may be a case where the transmission prioritized periods TPP set with an object of performing a transmission with priority cannot be effectively used. The state is illustrated in FIG. 15. In FIG. 15, each portion of the times T0, T2 and T5 in FIG. 14 is shown in enlarged scales.

In a sequence beginning from a time T0, because a TBTT offset of the communication station #3 is shorter than a TBTT offset of the communication station #0, the communication station #3 first transmits a signal including a beacon and an RTS. In response to the signal, the communication station #2 sends back a CTS to the communication station #3. Because the CTS is also received by the communication station #1, the communication station #1 sets a NAV over a Duration period instructed in the CTS, and sets a transmission-disallowed period in accordance with the CSMA/CA procedure.

After that, a signal including a beacon and an RTS addressed to the communication station #1, and a signal including RTS information are transmitted from the communication station #0. Even if the communication station #1 can receive the signals, the communication station #1 is in the transmission-disallowed state, and consequently the communication station #1 cannot send back any CTSs. Consequently, this situation leads to a state in which the transmission prioritized period TPP acquired by the communication station #0 by the performance of the local station's beacon transmission does not work effectively. The state is based on a fact that the communication station #0 cannot be concerned in the communication stations preceding to the communication station #0 by two hops or more in the management method of the neighboring stations by means of the NBOI described above.

Moreover, at a time T2, because the TBTT offsets of the communication stations #0 and #3 coincide with each other, the data transmission from the communication station #0 to the communication station #1 and the data transmission from the communication station #3 to the communication station #2 are simultaneously performed in parallel with each other. In this case, to each of the communication stations #0 and #3, the transmission prioritized periods TPP acquired by the beacon transmission of each of them effectively work.

On the other hand, at a time T5, because the TBTT offset of the communication station #0 is shorter than the TBTT offset of the communication station #3, a phenomenon similar to one at the time T0 is produced. That is to say, at this time, the communication station #2 cannot send back any CTS, and the transmission prioritized period TPP of the communication station #3 does not work effectively.

H. Coping with Problem (First Solution)

Figure 16:
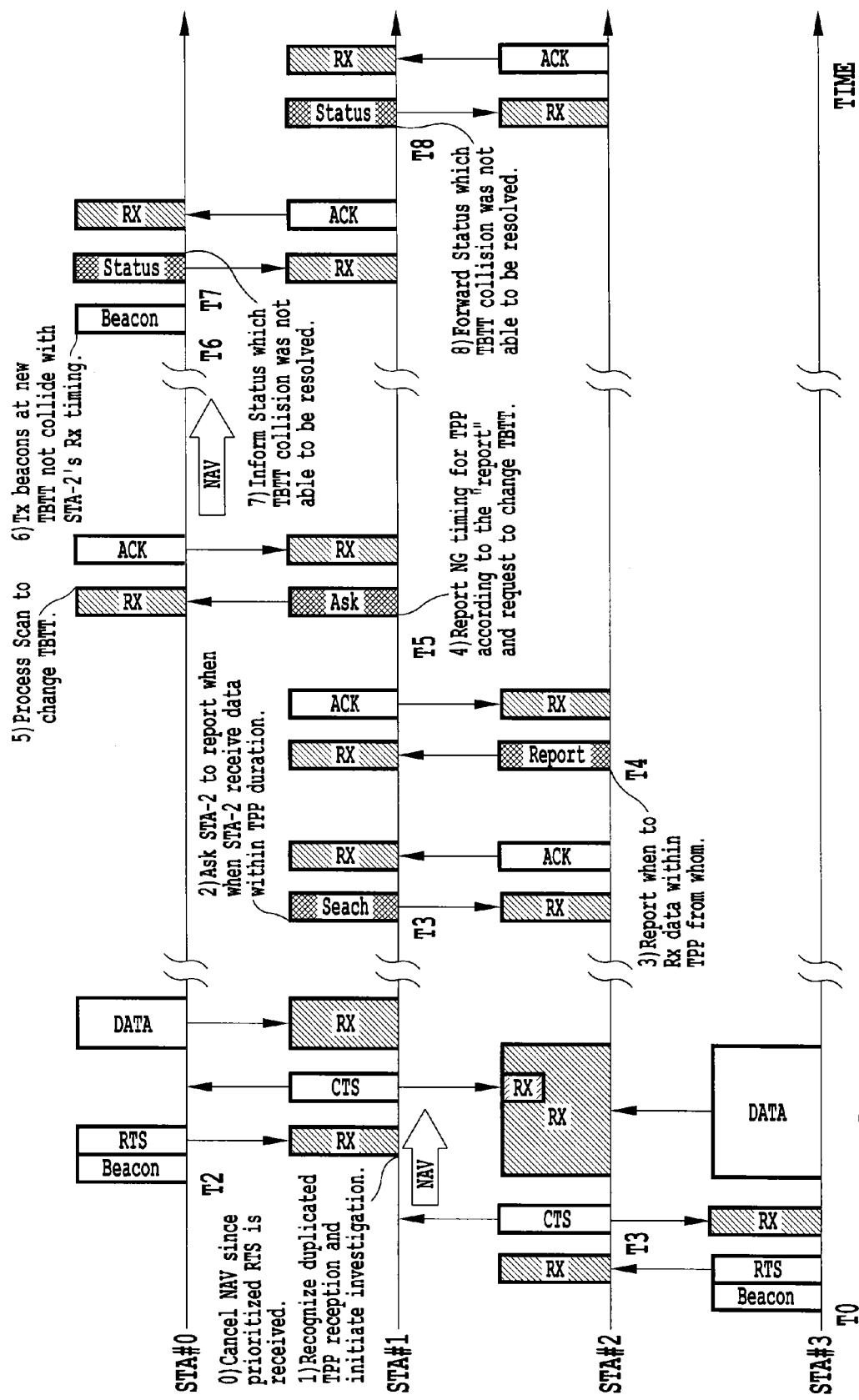
FIG. 16 is a view showing an example of a procedure for causing the transmission prioritized period effectively utilized when each station sets TBTT.

In this item, a description is given to a first solution for growing out of the situation with the best effort in which situation the transmission prioritized period TPP of a communication station does not work effectively as shown in FIG. 15. FIG. 16 shows an example of an operation procedure in this case. Incidentally, reference points such as a time T0 shown in FIG. 16 have nothing to do with those shown in FIG. 14 or the like.

H-1. Activation of Search Procedure

The time T0 is a time of TBTTs of the communication stations #0 and #3. Because the value of the TBTT offset at the TBTT of the communication station #3 is 0, the communication station #3 performs the transmission of a beacon including RTS (Paging information) to the communication station #2 at the TBTT. At a time T1, the communication station #2 sends back a CTS in response to the RTS from the communication station #3.

The CTS from the communication station #2 is also received by the communication station #1. In an ordinary CSMA operation, the communication station #1 sets a NAV by means of the value of Duration shown by the CTS, and enters its transmission-disallowed state. Because the communication station #1 recognizes that the time T0 is the TBTT of a transmission beacon of the communication station #0, and because the communication station #1 has not received any beacons from the communication station #0 yet, the communication station #1 is in its transmission-disallowed state except for the time of receiving an emergent signal.

In the present embodiment, in a case where the communication station #1 receives the CTS which interferes a prioritized utilization region starting at the transmission beacon time from the communication station #0 and requests the setting of a NAV over a long period, the communication station #1 stores the address of the source communication station of the CTS as a "communication station which should be marked". Moreover, the communication station #1 stores the time when the CTS was received as a "marked time" at the same time.

After that, when a TBTT offset has passed from the TBTT, at a time T2 the communication station #0 performs the transmission of a beacon including RTS (Paging information) to the communication station #1, and the communication station #1 receives the beacon.

At this point, the communication station #1 is in its transmission disallowance state owing to the reception of the CTS from the communication station #2. But, because the received signal includes both elements of a beacon and the RTS addressed to the local station, it is found that the signal is transmitted from a communication station holding the prioritized utilization region. In this way, the communication station #1 judges that the signal transmitted from the communication station holding the prioritized utilization region should be processed with priority. That is to say, when the communication station #1 receives the RTS which should be processed with priority, the communication station cancels the transmission disallowance state which is presently set, and performs the send back of CTS.

Moreover, when the communication station #1 ascertains the existence of a communication station registered as a "communication station which should be marked" and the "marked time" is not distant from the present time more than T_Bmin in a case where the communication station #1 canceled the transmission-disallowed state, the communication station #1 judges that there is the possibility that some problem has been produced in a time zone in which prioritized reception can be performed, and determines to begin a Search procedure. Through the search procedure, the communication station executes the processing of evading the duplication of transmission prioritized periods, and this respect will be described in detail later.

Incidentally, by the communication station #1's transmission of the CTS, a part of the signal received by the communication station #2 receives interference, and it can be produced that a part of the data is damaged. But, because the length of the CTS signal is short, not all of the signal is damaged.

H-2. Processing Flow until Activation of Search Procedure

Figure 17:
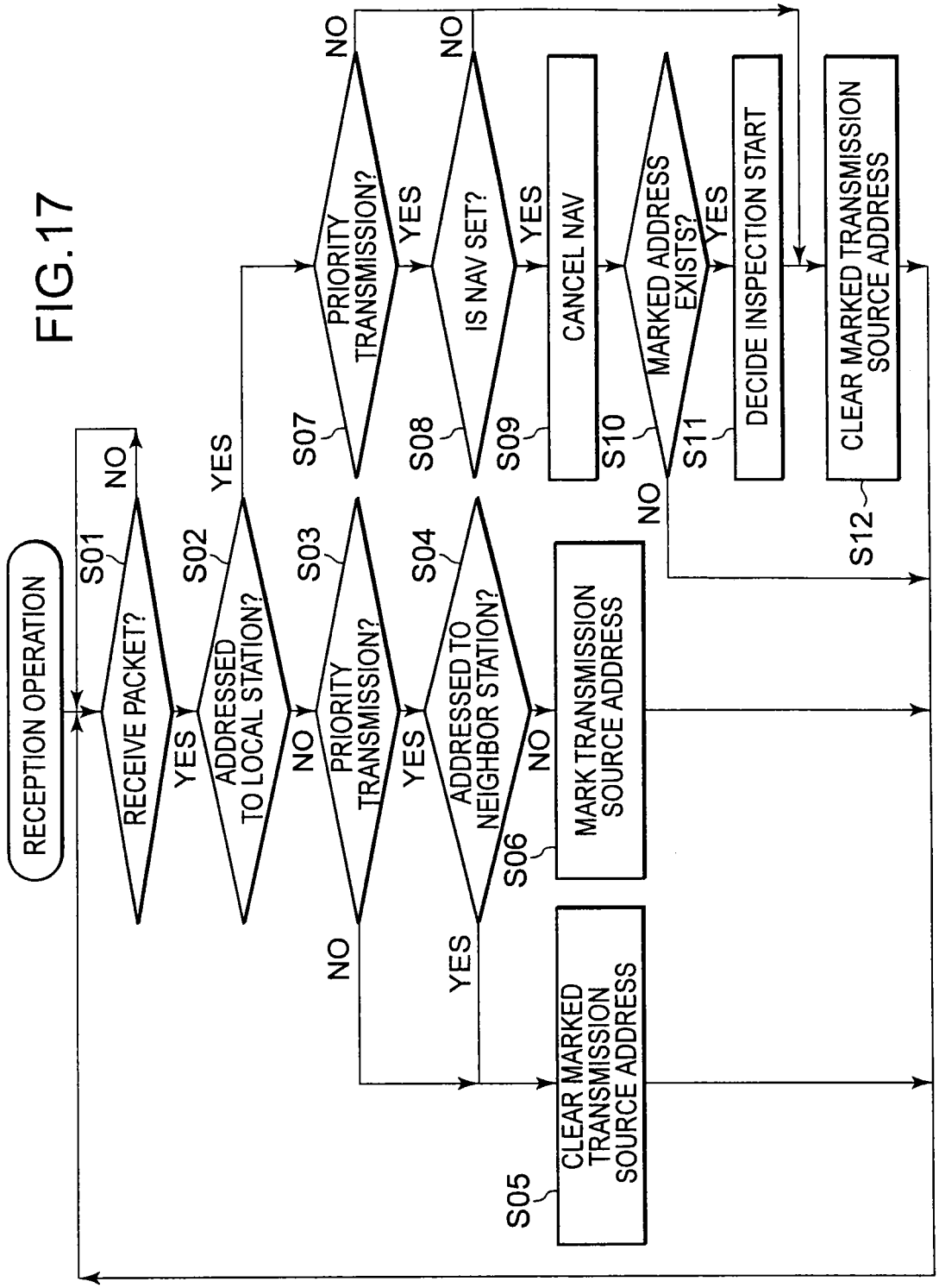
FIG. 17 is a flowchart showing an operational procedure for canceling a condition of transmission-disallowed by receiving an RTS packet to be processed with priority under a condition that the communication station is in transmission-disallowed due to a carrier detection.

FIG. 17 shows an operation procedure in the form of a flowchart for canceling the transmission-disallowed state by the reception of an RTS packet which should be processed with priority when a communication station is in its transmission-disallowed state owing to a carrier detection. The operation procedure shown in the same drawing is actually implemented in the form of the execution of a predetermined run command program by the central control unit 103 in the wireless communication apparatus 100 operating as a communication station.

When a communication station receives a signal (step S01), the communication station first judges whether the signal is addressed to the local station or not (step S02). When the received signal is judged not to be addressed to the local station, the communication station performs the following processing.

First, the communication station judges whether the received signal has been transmitted with priority or not (step S03). Then, in a case of not with priority, the communication station clears the information preserved as the "communication station which should be marked" (step S05) before the communication station changes to the ordinary reception state. In the example described above, whether the received signal has been transmitted with priority or not is judged on the basis of whether the received signal has been received in the local station's transmission-disallowed state or not.

Moreover, in a case where the received signal is judged to be one which has been transmitted with priority (step S03), the communication station successively judges whether the destination of the received signal is a neighboring station of the local station or not (step S04). Now, when the destination of the received signal is judged to be the neighboring station, the communication station clear the information preserved as the "communication station which should be marked" (step S05) before changes into the ordinary reception state.

On the other hand, when the destination of the received signal is judged not to be any neighboring stations (step S04), the communication station stores the transmission source station of the received signal as the "communication station which should be marked" (step S06).

On the other hand, in a case where the received signal is judged to be addressed to the local station at the step S02, the following processing is performed.

First, whether the received signal has been transmitted with priority or not is judged (step S07). Then, in a case of not with priority, the communication station clears the information preserved as the "communication station which should be marked" (step S12) before the communication station changes into the ordinary reception state. In the example described above, the received signal is judged to be with priority by ascertaining that RTS accompanies the beacon.

Moreover, in a case where the received signal is judged to be one which has transmitted with priority, whether a NAV is presently set in the local station or not is further judged (step S08). Here, when the NAV is not set, the communication station clear the information preserved as the "communication station which should be marked" (step S12) before the communication station changes into the ordinary reception state.

On the other hand, in a case where the NAV is set in the local station (YES is step S09), the communication station cancels the NAV (step S09). Successively, the communication station judges whether the communication station holds the information of the "communication station which should be marked" or not (step S10). Now, in a case where the information of the "communication station which should be marked" is not preserved, the communication station changes into the ordinary reception state. But in a case where the information of the "communication station which should be marked" has been already preserved, the communication station determines to begin the search procedure (step S11), and the communication station clears the "communication station which should be marked" (step S12).

H-3. Details of Search Procedure (First Example)

After the communication station #1 has determined to begin a search procedure by the processing shown in FIG. 17, the communication station #1 exchanges messages between another communication station to execute the processing of evading the duplication in the transmission prioritized period.

Transmission of First Message

The communication station #1, which has determined to begin the search procedure, transmits a request to the communication station #2 registered as the "communication station which should be marked" of reporting a reception situation in the transmission prioritized period TPP of the communication station #2 as a first message. In the example shown in FIG. 16, a Search as the first message is transmitted at the time T3.

Incidentally, because the communication station #1 has activated the search procedures with regard to the communication station #0 and the communication station #2, the communication station #1 activates a timer. Then, it is set that the communication station #1 does not activate a novel search procedure from the local station for a while after that, and that the communication station #1 further discards the messages pertaining to the examination procedure from the stations other than the object station of the search procedure (the communication station #0 and the communication station #2).

Transmission of Second Message

The communication station #2, which has received the first message, makes the information of one record composed of the TBTT of the communication station with which the communication station #2 is presently in a transmission-reception state by using the transmission prioritized period TPP, and the address of the communication station. By indicating the TBTT by a relative time from the time of the ordinary beacon of the communication station #2, time can be informed even if the clock managing the whole system does not exist. Moreover, the communication station #2 sends back the made information to the communication station #1 as the second message. In the example shown in FIG. 16, the Report as the second message is transmitted at a time T4.

Incidentally, the communication station #2, which has received the first message, recognizes that the search procedure has begun in the neighboring communication station, and activates a timer. Then, it is set that the communication station #1 does not activate a novel search procedure from the local station for a while after that, and that the communication station #2 further discards the messages pertaining to the search procedure from the other stations.

Transmission of Third Message

The communication station #1, which has received the second message, extracts the records pertaining to the stations which the local station does not recognize (hidden terminals to the local station or next neighboring stations) among the information group stored in the second message, and makes a third message including the TBTT information of the extracted records. By indicating the TBTT by a relative time from the time of the ordinary beacon of the communication station #1, time can be informed even if the clock managing the whole system does not exist. Moreover, the communication station #1 transmits the made third message to the communication station #0. In the example shown in FIG. 16, the Ask as the third message is transmitted at a time T5.

The third message indicates that "there is the possibility that the communication station #1 collides with the reception of the communication station #2 in the transmission prioritized period TPP in the TBTT included in the message". In other words, the third message indicates to the communication station #0 that there is the possibility that a signal addressed to the communication station #1 cannot always be received with priority in the TBTT.

Scanning and Change of TBTT

When the communication station #0, which has received the third message, recognizes that there is a problem with regard to the reception in the transmission prioritized period TPP of the communication station #1, the communication station #0 activates the change processing of the TBTT for changing the transmission time in the TPP addressed to the communication station #1.

In the TBTT changing processing, the communication station #0 performs the scanning processing for the super frame, and searches a vacant TBTT in the time zone which is not recorded in the third message. Then, the communication station #0 tries to change the time zone for performing a transmission having a high priority addressed to the communication station #1.

Moreover, at the same time when the communication station #0 determined to perform the scanning processing, the communication station #0 informs the periphery of a schedule of changing the TBTT of the local station in the ALERT field of the transmission beacon.

Then, the communication station #0 activates the scanning processing as shown in FIG. 16. When the scanning processing has ended, the communication station #0 searches the vacant TBTT by the procedure described above in the consideration of the time zone recorded in the third message as an NG time zone (which respect will be described later), and replaces the TBTT of the beacon performing a transmission in the NG time zone at the present time. In the example shown in FIG. 16, the TBTT of the communication station #0 is replaced with the time T6.

Transmission of Fourth Message

When sufficient vacant TBTTs exist, the communication station #0 returns to a state in which the transmission prioritized period TPP can be effectively used by the processing described above. However, in a case where insufficient vacant TBTTs exist, there is the possibility that the communication station #0 cannot deal with the request of the communication station #1 sufficiently. In a case where the communication station #0 performs communication also to another station, the communication station #0 schedules the transmission control in order that transmissions may be performed to the communication stations other than the communication station #1 at the time reported as NG by the communication station #1. Alternatively, there is also a case where the transmission of a sub beacon at the time is stopped.

With an object of informing the communication station #1 of such a situation, the communication station #0 reports the existence of the TBTTs which could not be changed to the communication station #1. It is desirable to report that all of the TBTTs have been changed as the request to the communication station #1 even in a case where the communication station #0 could deal with the request of the communication station #1. The communication station #0 transmits the information to the communication station #1 as the fourth message. In the fourth message, the NG time at which beacons have still been transmitted, though which time has been reported as the NG time in the third message, is clearly described. In the example shown in FIG. 16, Status as the fourth message is transmitted at the time T7.

Transmission of Fifth Message

The communication station #1, which has received the fourth message, grasps how much the communication station #0 has responded the request. In the example shown in FIG. 16, the communication station #1 preserves the time zone (TBTT) reported as one in which communication station #0 could not responded the request by the communication station #0 as an "unsolved time zone", and takes notice lest the communication station #1 should be initiated a search procedure on the basis of a phenomenon produced in the time zone. Furthermore, the communication station #1 transfers the "unsolved time zone" information to the communication station #2 as a fifth message for owning the "unsolved time zone" information commonly with the communication station #2, which is in the similar state. In the example shown in FIG. 16, Status as the fifth message is transmitted at the time T8.

Reception of Fifth Message

The communication station #2, which has received the fifth message, similarly to the communication station #1, preserves the reported time zone (TBTT) as the "unsolved time zone", and takes notice lest the search procedure should be initiated owing to the phenomenon generated in the time zone.

H-4. Details of Search Procedure (Second Example)

In the procedure described above with reference to FIG. 16, the communication station #1 activates the procedure, and performs examination of the communication station #2 by a Search message. After that, the communication station #1 transmits a TBTT changing request to the communication station #0 by an Ask message. On the other hand, the object of the present invention of eliminating the situation in which transmission prioritized periods collide with each other can be achieved by a procedure in which the communication station #1 activates the procedure and the communication station #1 itself notifies the communication station #2 of the examination result to make the communication station #3 perform the TBTT changing request. The procedure in this case is described in the following with reference to FIG. 18.

Transmission of Second Message

The communication station #1, which has determined to begin the search procedure by the processing shown in FIG. 17, makes the information of one record composed of the TBTT of the communication station with which the communication station #1 is presently in a transmission-reception state by using the transmission prioritized period TPP, and the address of the communication station. By indicating the TBTT by a relative time from the time of the ordinary beacon of the communication station #1, time can be informed even if the clock managing the whole system does not exist. Moreover, the communication station #1 transmits the made information to the communication station #2 as the second message. In the example shown in FIG. 18, the Report as the second message is transmitted at a time T4. Incidentally, the communication station #1, which has transmitted the second message, and the communication station #2, which has received the second message, recognize that the search procedure has begun in the neighboring communication station, and activate a timer. Then, it is set that the communication stations #1 and #2 do not activate a novel search procedure from the respective local stations for a while after that, and that the communication stations #1 and #2 further discard the messages pertaining to the search procedure from the other stations.

Transmission of Third Message

The communication station #2, which has received the second message, recognizes that the time zone at which the local station performs prioritized reception coincides with the time zone at which an adjacent station performs prioritized reception. Then, the communication station #2 determines to request the change of the TBTT to the partner station performing the prioritized reception in the time zone included in the second message received from the communication station #1. In the example shown in FIG. 18, as a partner station performing the prioritized reception in the time zone included in the second message, the communication station #3 is extracted.

The communication station #2 extracts only the records pertaining to the stations which the local station does not recognize (hidden terminals to the local station or the next neighboring station) among the information group stored in the second message, and makes a third message including the TBTT information of the extracted records. By indicating the TBTT by a relative time from the time of the ordinary beacon of the communication station #2, time can be informed even if the clock managing the whole system does not exist. Moreover, the communication station #2 transmits the made third message to the communication station #3. In the example shown in FIG. 18, the Ask as the third message is transmitted at a time T5.

The third message indicates that "there is the possibility that the communication station #2 collides with the reception of the communication station #1 in the transmission prioritized period TPP in the TBTT included in the message". In other words, the third message indicates to the communication station #3 that there is the possibility that a signal addressed to the communication station #2 cannot always be received with priority in the TBTT.

Scanning and Change of TBTT

When the communication station #3, which has received the third message, recognizes that there is a problem with regard to the reception in the transmission prioritized period TPP of the communication station #2, the communication station #3 activates the change processing of the TBTT for changing the transmission time in the TPP addressed to the communication station #2.

In the TBTT changing processing, the communication station #3 performs the scanning processing for the super frame, and searches a vacant TBTT in the time zone which is not described in the third message. Then, the communication station #3 tries to change the time zone for performing a transmission having a high priority addressed to the communication station #2.

Moreover, at the same time when the communication station #3 determines to perform the scanning processing, the communication station #3 informs the periphery of a schedule of changing the TBTT of the local station in the ALERT field of the transmission beacon.

Figure 18:
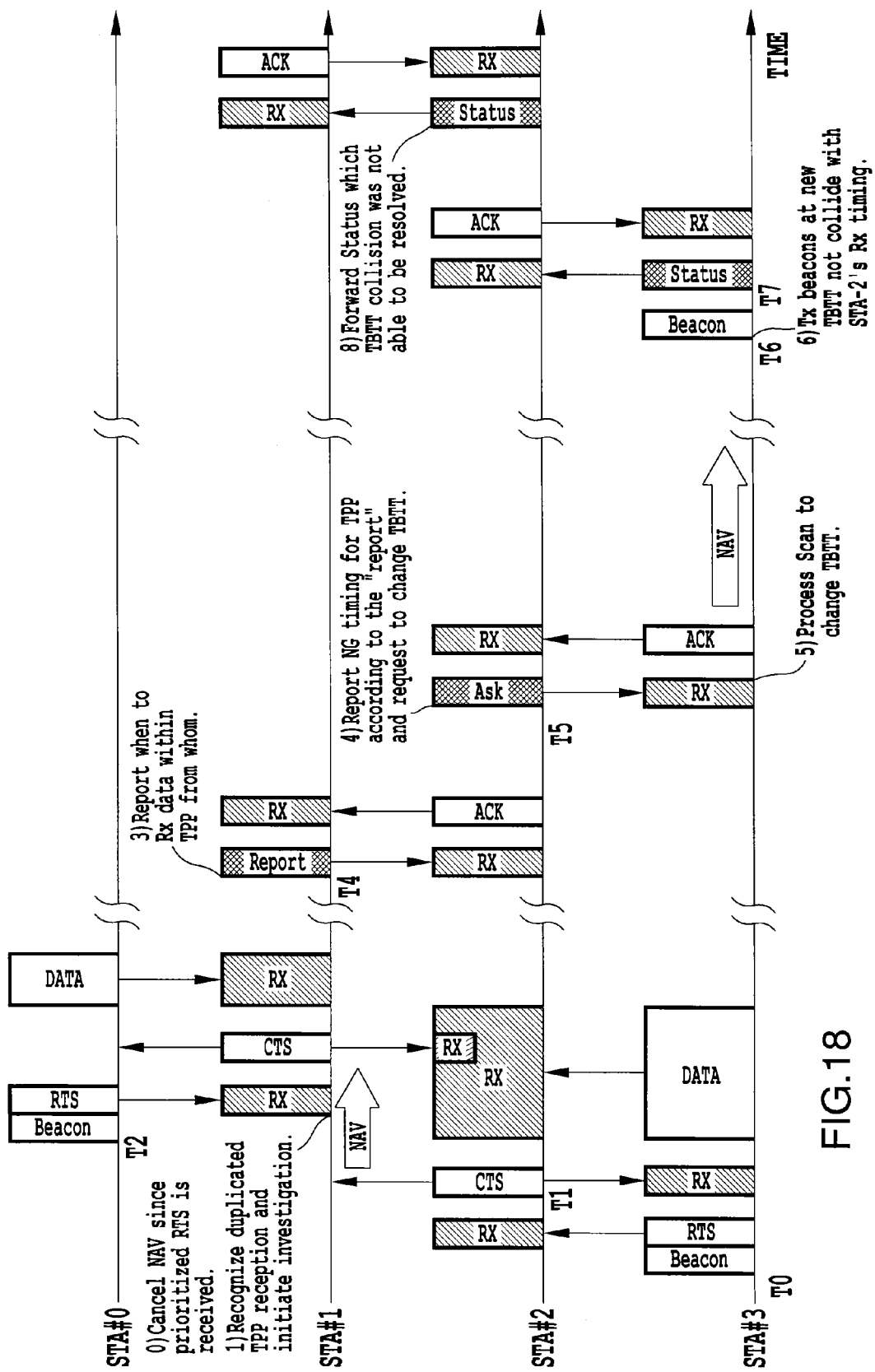
FIG. 18 is a view showing an example of a procedure for causing the transmission prioritized period effectively utilized when each station sets TBTT.

Then, the communication station #3 activates the scanning processing as shown in FIG. 18. When the scanning processing has ended, the communication station #3 searches the vacant TBTT by the procedure described above in the consideration of the time zone recorded in the third message as an NG time zone (which respect will be described later), and replaces the TBTT of the beacon performing a transmission in the NG time zone at the present time. In the example shown in FIG. 18, the TBTT of the communication station #3 is replaced with the time T6.

Transmission of Fourth Message

When sufficient vacant TBTTs exist, the communication station #3 returns to a state in which the transmission prioritized period TPP can be effectively used by the processing described above. However, in a case of no sufficient vacant TBTT existing, there is a possibility that the communication station #3 cannot deal with the request of the communication station #2 sufficiently. In a case where the communication station #3 performs communication also to another station, the communication station #3 schedules the transmission control in order that transmissions may be performed to the communication stations other than the communication station #2 at the time reported as NG by the communication station #2. Alternatively, there is also a case where the transmission of a sub beacon at the time is stopped.

With an object of informing the communication station #2 of such a situation, the communication station #3 reports the existence of the TBTTs which could not be changed to the communication station #2. It is desirable to report that all of the TBTTs have been changed as the request to the communication station #2 even in the case where the communication station #3 could deal with the request of the communication station #2. The communication station #3 transmits the information to the communication station #2 as the fourth message. In the fourth message, the NG time at which beacons have still been transmitted, though which time has been reported as the NG time in the third message, is clearly described. In the example shown in FIG. 18, Status as the fourth message is transmitted at the time T7.

Transmission of Fifth Message

The communication station #2, which has received the fourth message, grasps how much the communication station #3 has responded the request, and the communication station #2 preserves the time zone (TBTT) reported as one in which communication station #3 could not respond the request by the communication station #3 as an "unsolved time zone" to take notice lest the communication station #2 should be initiated a search procedure on the basis of a phenomenon produced in the time zone. Furthermore, the communication station #2 transfers the "unsolved time zone" information to the communication station #1 as a fifth message for owning the "unsolved time zone" information commonly with the communication station #1, which is in the similar state. In the example shown in FIG. 18, Status as the fifth message is transmitted at the time T8.

Reception of Fifth Message

The communication station #1, which has received the fifth message, similarly to the communication station #2, preserves the reported time zone (TBTT) as the "unsolved time zone", and takes notice lest the search procedure should be initiated owing to the phenomenon generated in the time zone.

H-5. Search Processing of Vacant TBTT in Consideration of NG Time Zone

As described above, it is necessary for the communication station which has received the Ask as the third message to set the beacon transmission timing TBTT for acquiring a transmission prioritized period TPP in consideration of the state of a reception station pertaining to the transmission in the TPP of the local station. The search processing of a vacant TBTT performed in this case is described in the following with reference to FIG. 19.

Figure 19:
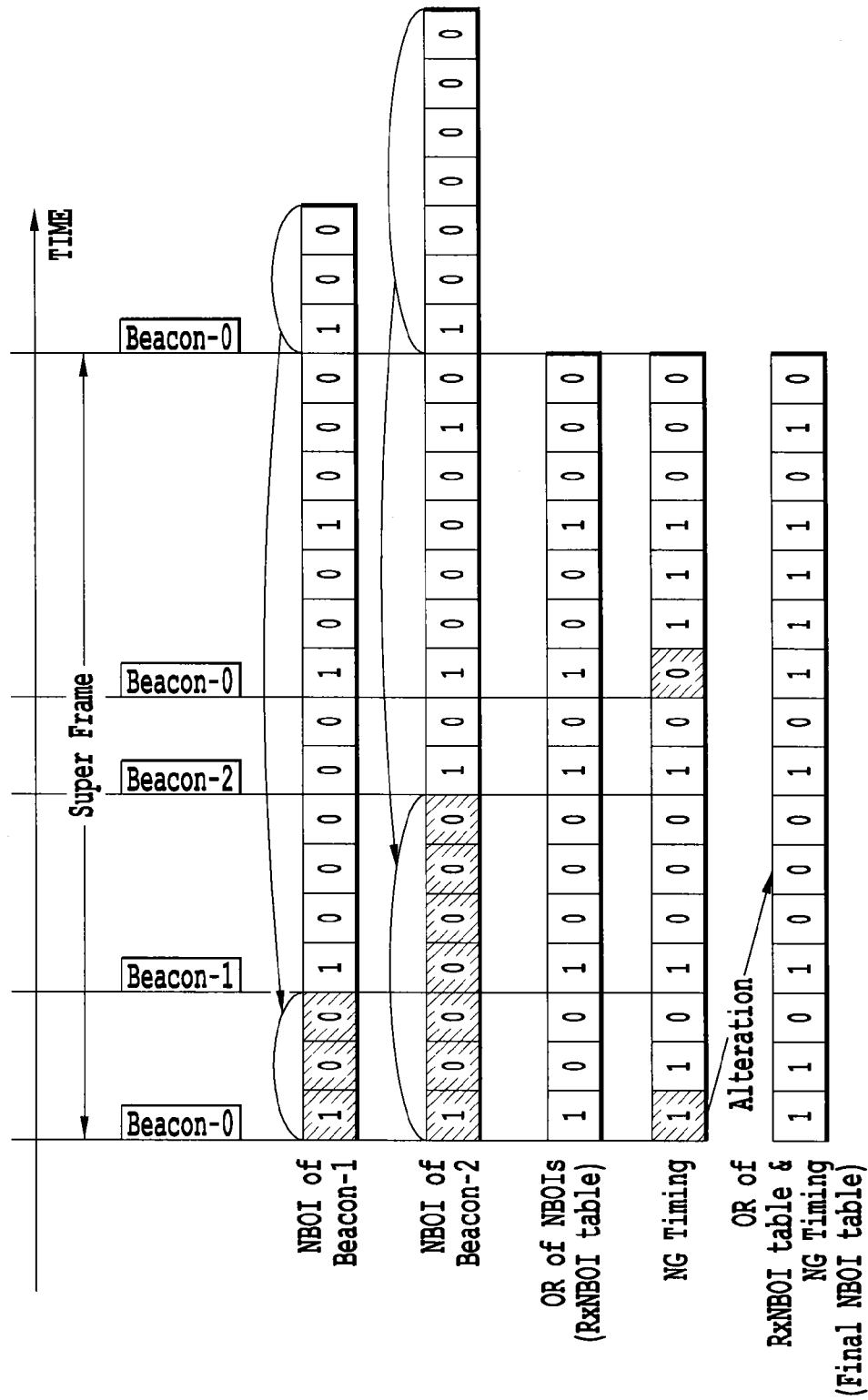
FIG. 19 is a view for explaining a searching processing of an open TBTT.

In FIG. 19, it is supposed that the communication station #0 transmitting Beacon-0 receives the third message, and FIG. 19 shows an example of a case where the communication station #0 performs the search processing of a vacant TBTT.

The communication station #0 setting a TBTT also in consideration of the state of the reception station performs the scanning processing of one super frame. Thereby, it is supposed that beacons are received from the neighboring communication stations #1 and #2. In a case where the NBOIs included in the beacons are "NBOI of Beacon-1" and "NBOI of Beacon-2", respectively, in FIG. 19, an Rx NBOI Table is made up by shifting the NBOIs and performing an OR operation in accordance with a procedure similar to the case described with reference to FIG. 13. The Rx NBOI Table becomes the shown "OR of NBOIs (Rx NBOI Table)".

Moreover, the communication station #0 makes up an NG Table in which 1 is set in bits corresponding to the recording times included in the third message on the basis of the time zone information received as the third message. Then, an OR operation of the Rx NBOI Table and the NG Table is performed to make up a final NBOI Table. This is equivalent to the Final NBOI Table in FIG. 19.

Now, the communication station #0 transmits two beacons in a super frame, and ascertains the existence of a beacon transmitted in the time zone about which 1 is set in the NG Table. In the example shown in FIG. 19, the timing on the leftmost side on the paper surface is equivalent to that beacon, and the communication station #0 determines to change the beacon transmission time.

A new beacon transmission time is selected from time zones which are not marked in the final NBOI Table made up in the way described above. In the example shown in FIG. 19, a state in which a novel TBTT is set at the sixth timing from the left end is shown. The communication station #0 marks the final NBOI Table at the time, and changes the leftmost TBTT to the sixth TBTT from the left end.

Incidentally, in a case where there is a plurality of beacons performing a transmission in the time zone at which 1 is set in the NG Table, the processing described above is repeatedly performed until all of the TBTTs are changed or until the final NBOI Table is all marked. Thereby the communication station #0 tries re-setting of the TBTT as many times as possible.

H-6. Supplementary

It is noted that it is necessary that the search procedure and the TBTT changing procedure are activated only in the time zones in which the appearance of the beacons of neighboring stations does not greatly change for an object of avoiding the confusion caused by the activation of the search procedure and the TBTT changing procedure at the time of a change of a network topology or at the time of being activated unnecessarily.

To put it concretely, activation of the search procedure and decoding of the message are performed after ascertaining the continuation of the state over several super frames in which state the existence of the reception of beacons from the neighboring stations and the existence of TBTTs are not changed and further NBAI/NBOI, ALERT, TxNum, Sense Level and the like informed in the beacons are not changed as a result of scanning processing.

Moreover, in a case where the existence of periphery beacons is changed owing to a change of the network topology or the like, there is a case where the "unsolved time zone" is cleared.

H-7. State after Procedure Activation

Figure 20:
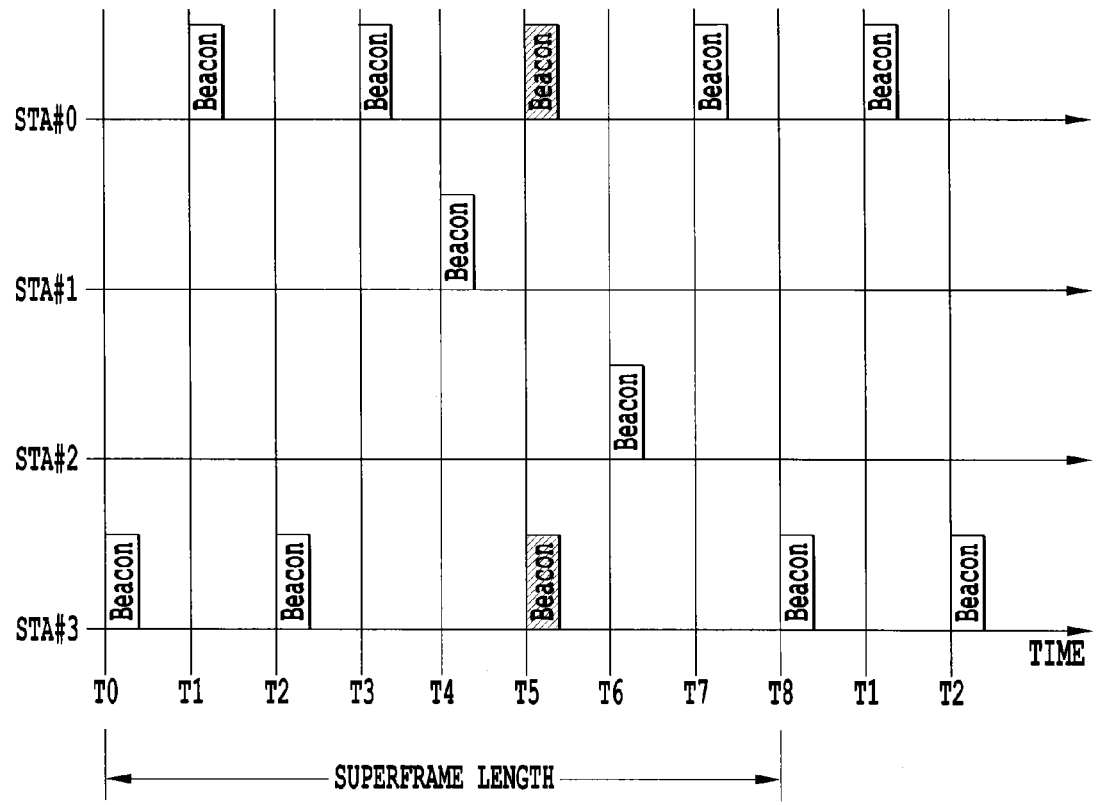
FIG. 20 is a view showing a finally decided beacon arrangement example after carrying out a checking processing and a TBTT changing processing on the beacon arrangement example shown in FIG. 14.

By following the procedure described above, the beacons of each station shown in FIG. 14 are finally located, for example, as shown in FIG. 20. As shown in the drawing, the coincidence of the communication station #3 and the TBTTs which does not need the communication station #3 is evaded.

However, because the number of the beacons which the communication stations existing in the system transmit exceeds 8 which is the number of TBTTs capable of being defined in a super frame, not all of the beacons can be assigned in different TBTTs. In the example shown in FIG. 20, the communication station #3 and the beacon of the communication station #3 are still transmitted in the same TBTT at the time T5.

In such a case, when a communication station judges that the communication station cannot provide a desired bandwidth to an application, there is a case where the communication station reports that it is impossible to provide a bandwidth suitable for a request to the application.

Moreover, in such a case, when the communication station judges that the communication station cannot provide a desired bandwidth to the application, there is a case where a procedure for reducing the transmission and reception range of the communication station to suppress the reception of interference or the like is activated. In the example shown in FIG. 20, it is possible to reduce the problem by narrowing the transmission and reception range of the communication station #1 to drive the communication station #2 out of the range. However, the changing method of the transmission and reception range of a communication station is not related to the subject matter of the present invention directly, and accordingly the further description is not given here.

I. Dealing with Problem (Second Solution)

In the previous item H, the procedure for settling a problem after the generation of the problem is described. But, in the present item, the contents of processing of adding processing previously lest a problem should be generated are described.

I-1. Frame Format

Figure 21:
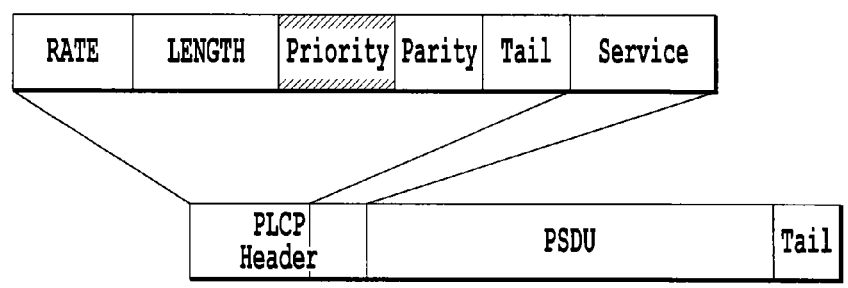
FIG. 21 is a view showing a structural example of a frame format.
Figure 26:
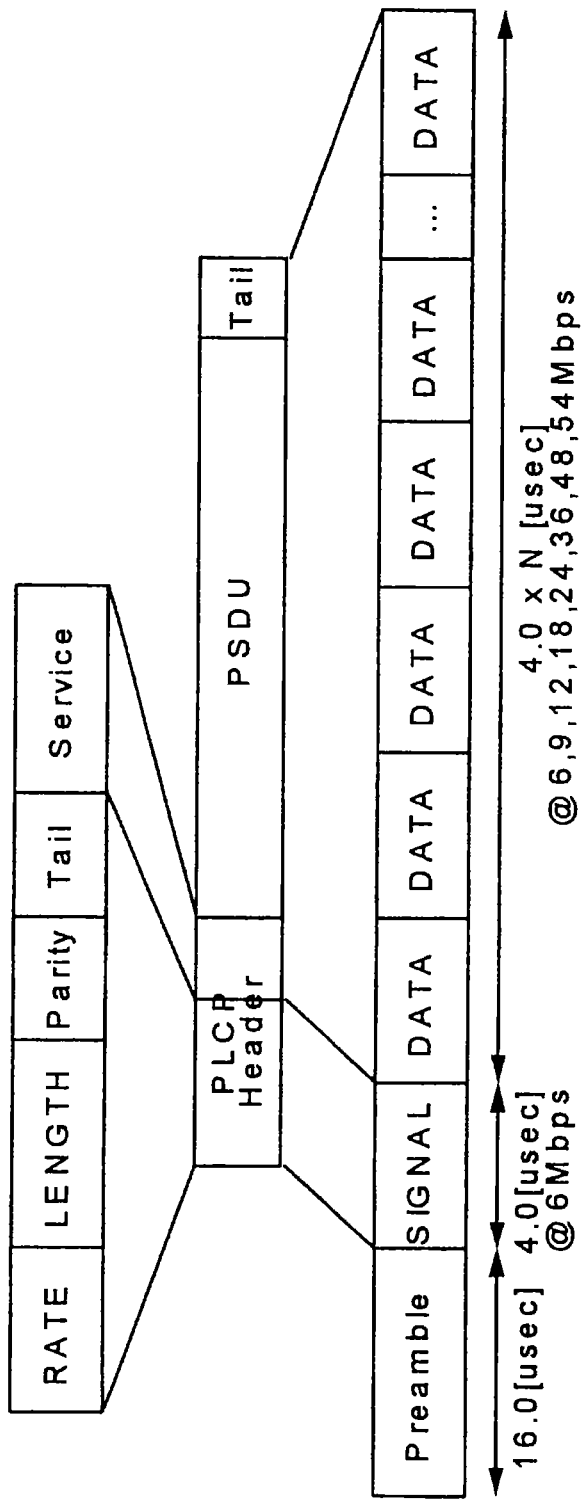
Figure 28:
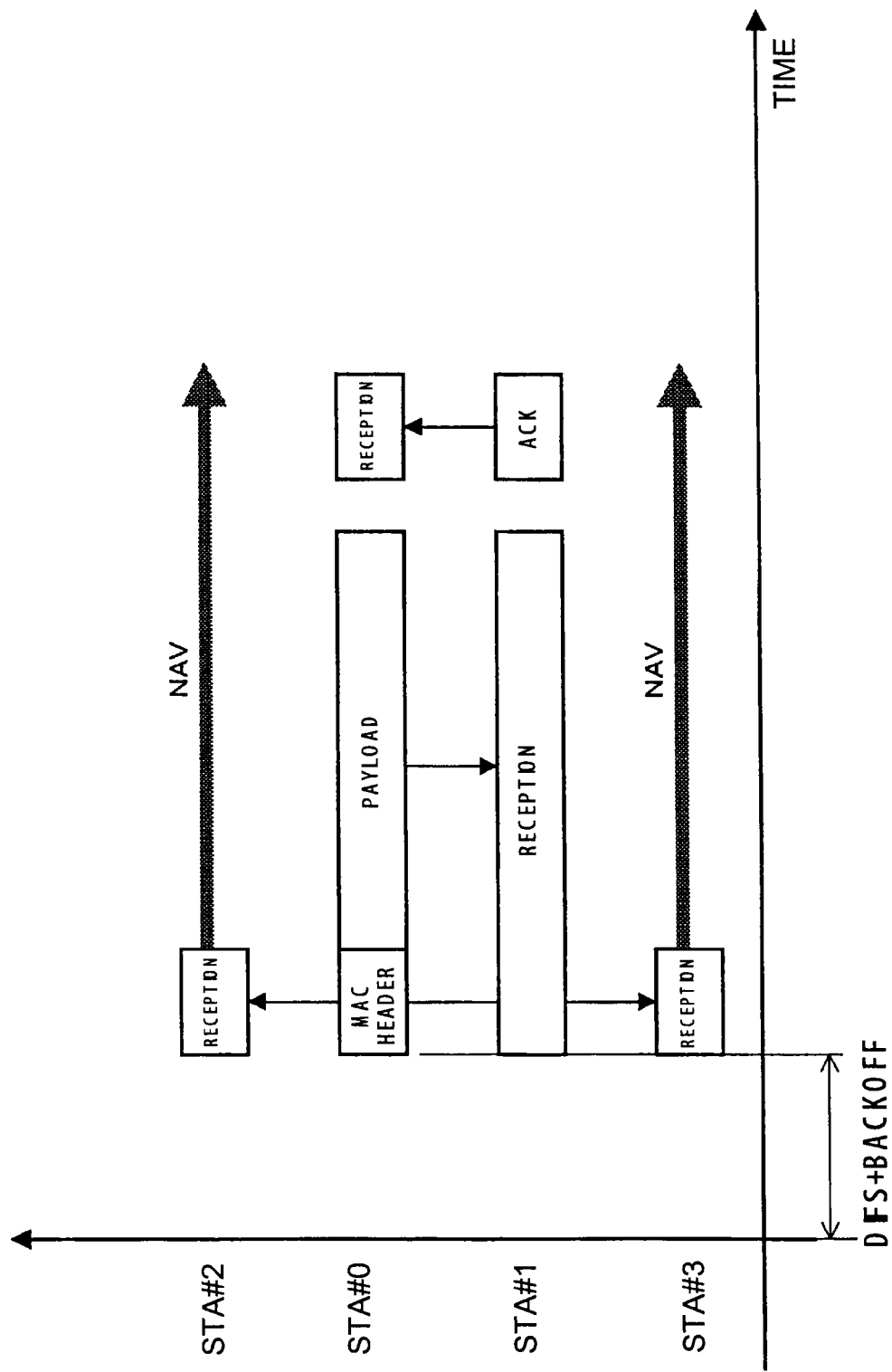
FIG. 28 is a view for explaining a communication procedure according to CSMA/CA (related art)
Figure 29:
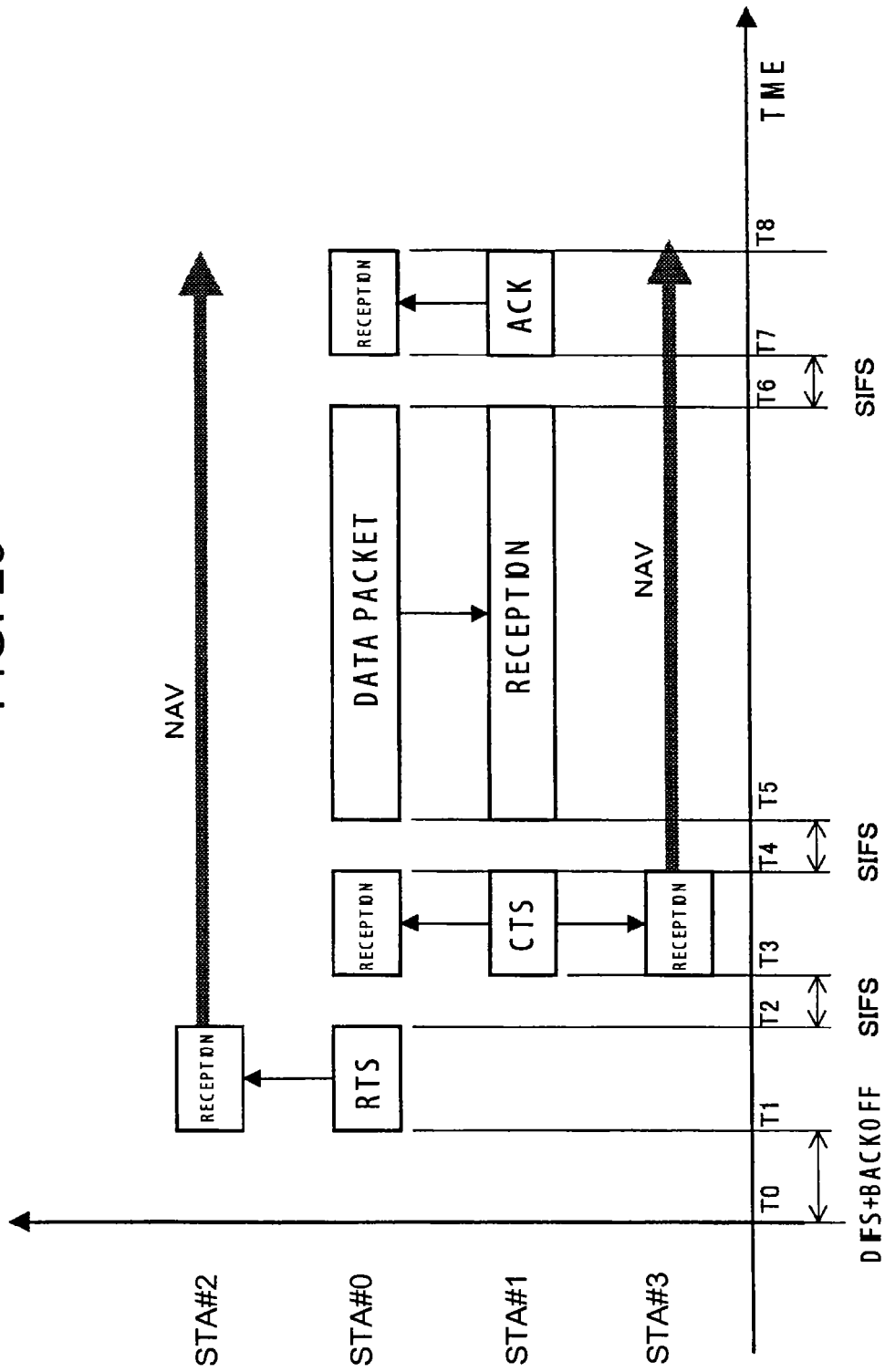
FIG. 29 is a view for a medium access procedure according to an RTS/CTS (related art)
Figure 30:
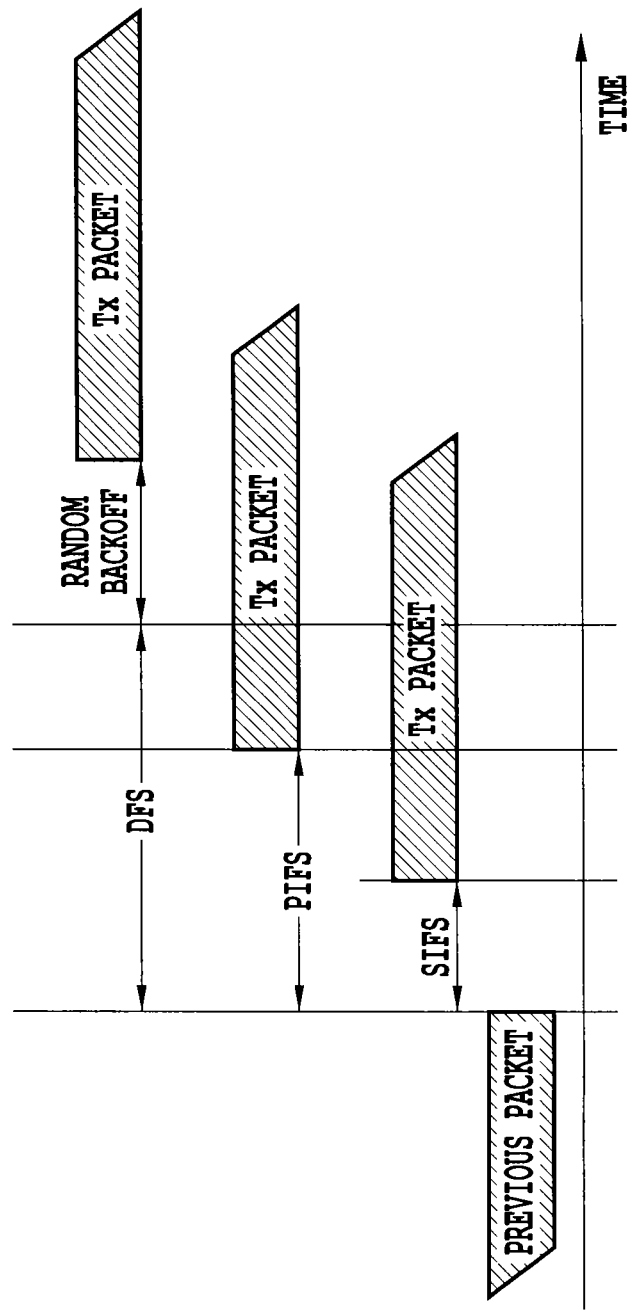
FIG. 30 is a view showing a packet interval IFS defined in IEEE 802.11.
Figure 31:
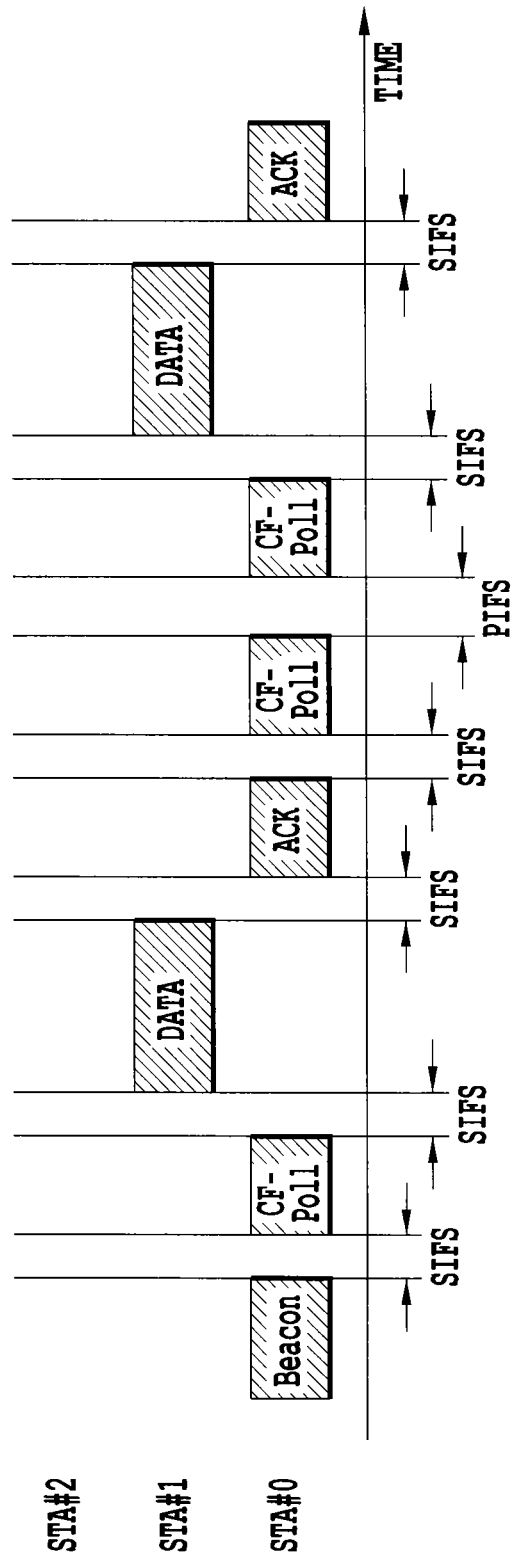
FIG. 31 is a view showing an operational example (related art) in which the communication station sets a prioritized transmission time zone in a transmission frame to perform bandwidth reservation transmission in IEEE 802.11.
Figure 32:
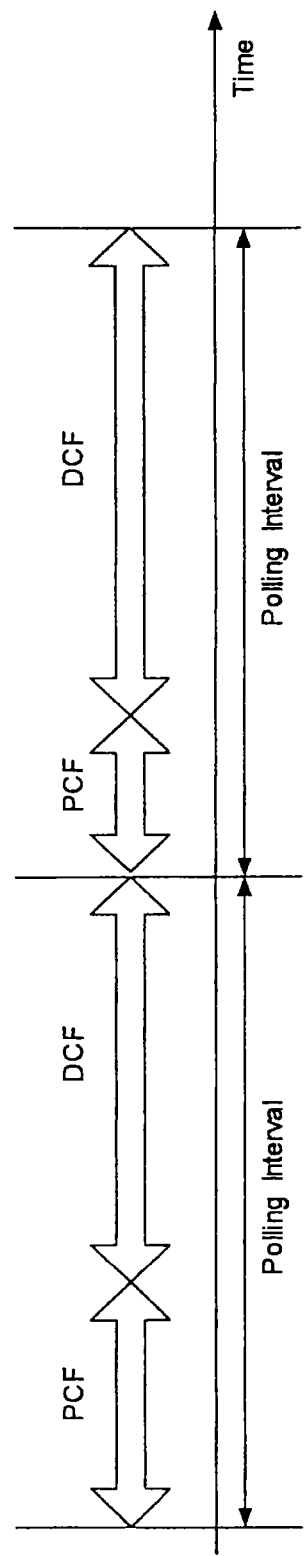
FIG. 32 is a view showing an operational example (related art) of PCF.
Figure 33:
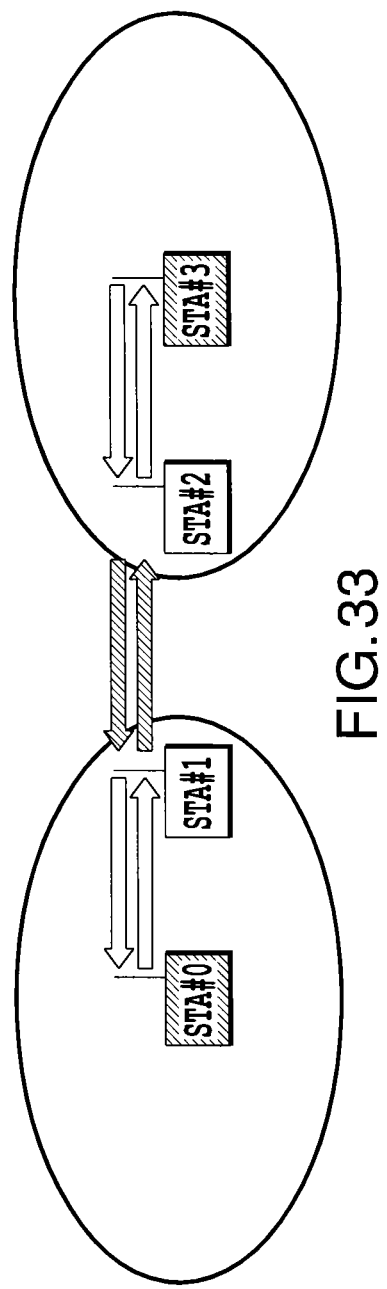
FIG. 33 is a view for explaining a problem in a case of providing a periodical or quasi-periodical transmission prioritized period.

FIG. 21 shows an example of the configuration of a frame format used in the present embodiment. The example shown in the drawing is different from the related art frame format shown in FIG. 26 in that a priority field indicating whether the signal is transmitted by prioritized communication or not is added. In the shown example, a case where the priority field is formed in the PLCP header is exemplified. But, the subject matter of the present invention is not limited to the example. For example, the priority field may be formed in a MAC header.

The communication station sets 1 in the priority field to a signal transmitted in the transmission prioritized period TPP of the local station, and set 0 in the priority field to a signal transmitted in the other periods. Moreover, in a frame transmitted owing to the reception of a certain signal such as the CTS transmitted in response to the RTS, the DATA transmitted in response to the CTS, and the like, the priority field set in the signal received immediately before is copied into the priority field of the frame to be transmitted. That is to say, the value of the priority field at the point of time of beginning a certain transmission transaction is succeeded until the end of the transmission transaction.

However, the priority field is not limited to the binary information of 0 and 1, but there is a case where a plurality of steps of priority is shown. For example, in a case when 8 bytes is allotted as the priority field, 256 steps of the priority can be set. In this case, the 256 steps of priority can be set according to the importance of the application of a signal to be transmitted or received, the inequality of transmission chances owing to the existing positions of communication stations, and the like. That is to say, a high priority value is set to an application having a high priority, or a high priority value is set also in a case where a communication station hardly obtain any transmission chances because of avoiding the collisions with the transmission signals of peripheral communication stations.

As described above, because sub beacons are transmitted with an object different from that of normal beacons, the sub beacons do not necessarily include the information of the beacons in a normal situation, and it is sufficient that a fact that they are "packets accompanied by the priority different from that of the ordinary packets" is described. In the present embodiment, the sub beacons may be defined by the existence of the priority field and by the storage of a value indicating the highness of the priority into the priority field.

Incidentally, the expression of "being transmitted in prioritized communication" in this section is concretely based on an assumption of a case where a certain communication station performs a transmission in the transmission prioritized period TPP of the local station. That is to say, the communication station sets 1 in the priority field in a frame which performs a prioritized transmission in the TPP (or which is trying to perform the prioritized transmission in the TPP).

I-2. Mark Procedure of Transmission-Reception Dangerous Zone

A communication station operates while keeping the TDMA structure as shown in FIG. 3, and manages one super frame as a plurality of time slots obtained by dividing the super frame by TBTTs.

The communication station receives a signal, and decodes the PLCP header thereof to refer to the priority field thereof. Thereby, the communication station judges whether the packet has been transmitted with a prioritized transmission right or not. Here, in a case where it becomes clear that the packet has been transmitted in the prioritized transmission, the fact is recorded. Moreover, when the decoding of the packet until the MAC header has ended, the transmission source station and the reception destination station of the packet becomes clear. The communication station refers to these pieces of information to ascertain that the reception destination station of the packet is not the local station and that the packet does not located in a "range in which the local station can receive" the packet. When the fact is ascertained, the communication station ascertains the priority field recorded in advance. Moreover, the communication station may sometimes ascertain the priority field after only ascertaining that the reception destination station of the packet is not the local station. Hereupon, in a case where it becomes clear that the packet has been transmitted with the prioritized right, the communication station marks the time slot corresponding to the time, and preserves the information as a "transmission-reception dangerous zone".

Figure 22:
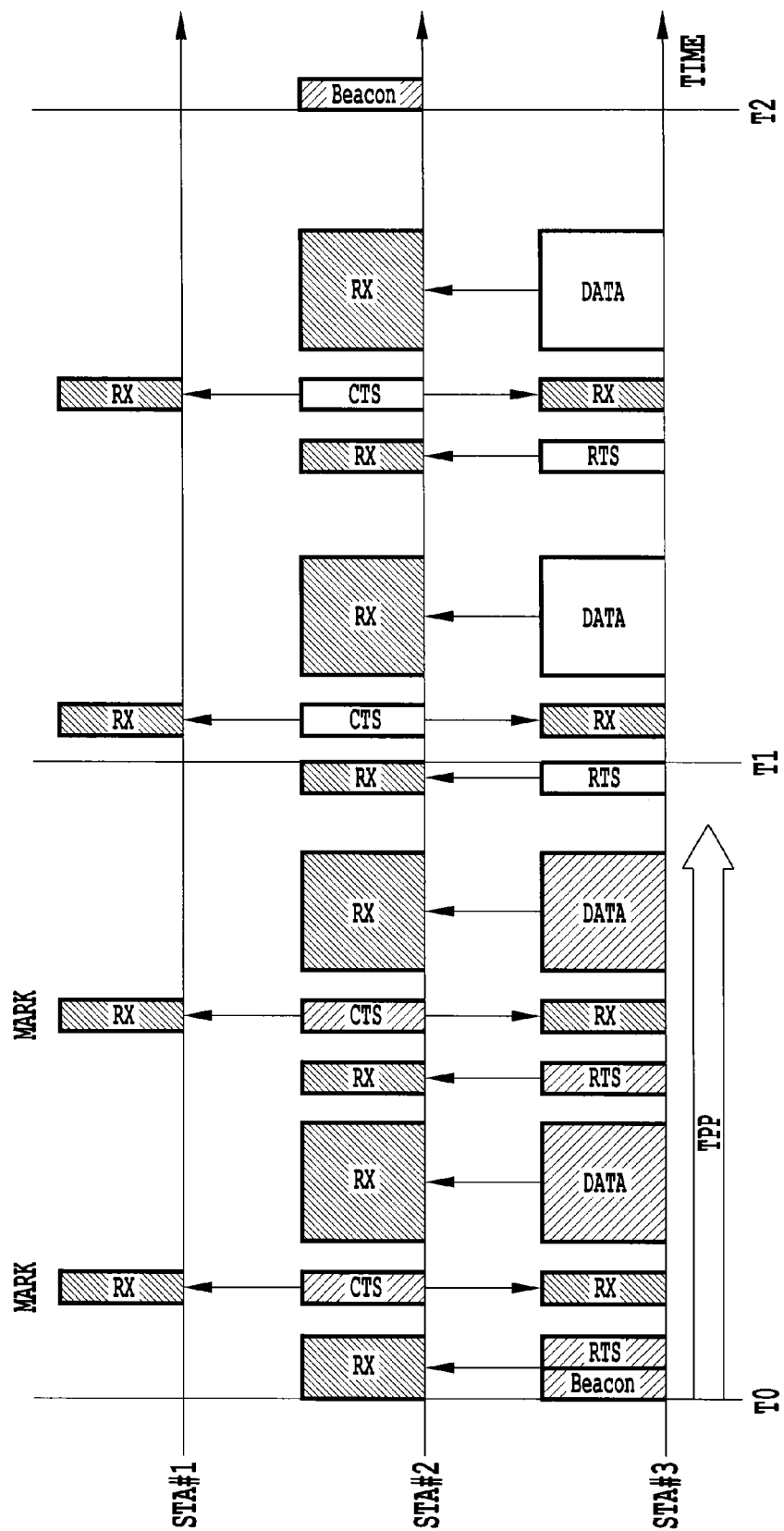
FIG. 22 is a view for explaining processing steps for marking a transmission/reception danger zone.

FIG. 22 shows a processing procedure for making the transmission-reception dangerous zone. In the drawing, a time T0 is a TBTT of the communication station #3, and the communication station #3 obtains the transmission prioritized period TPP by a fixed procedure such as an sub beacon transmission. Consequently, values equal to or more than 1 are set in the priority fields of signals to be transmitted from the communication station #3 after the obtainment of the TPP till the expiration of the TPP (for the convenience of the description, it is supposed that a value 1 is set in the following). Moreover, in response to the transmission signal from the communication station #3, a value 1 is also set in the priority fields of the signals transmitted from the communication station #2. Consequently, in FIG. 22, in the priority fields of the signals with hatching, the value 1 is set.

It is supposed that the communication station #1 can receive the signals from the communication station #2 but the signals from the communication station #3 exist at positions where the communication station 1 cannot receive the signals. In this case, the communication station #1 marks the CTS signal received from the communication station #2 in the TPP of the communication station #3 generating from the time T0, and preserves the time slot of the time T0 as the "transmission-reception dangerous zone".

Incidentally, 0 is set in the priority fields of signals transmitted after the expiration of the TPP and signals transmitted in response to the former signals. Consequently, because 0 is set in the priority field of the CTS signal transmitted from the communication station #2 in the next time slot beginning from the time T1, the communication station #1 does not judge the time slot as the "transmission-reception dangerous zone".

I-3. Mark Processing Flow of Transmission-Reception Dangerous Zone

Figure 23:
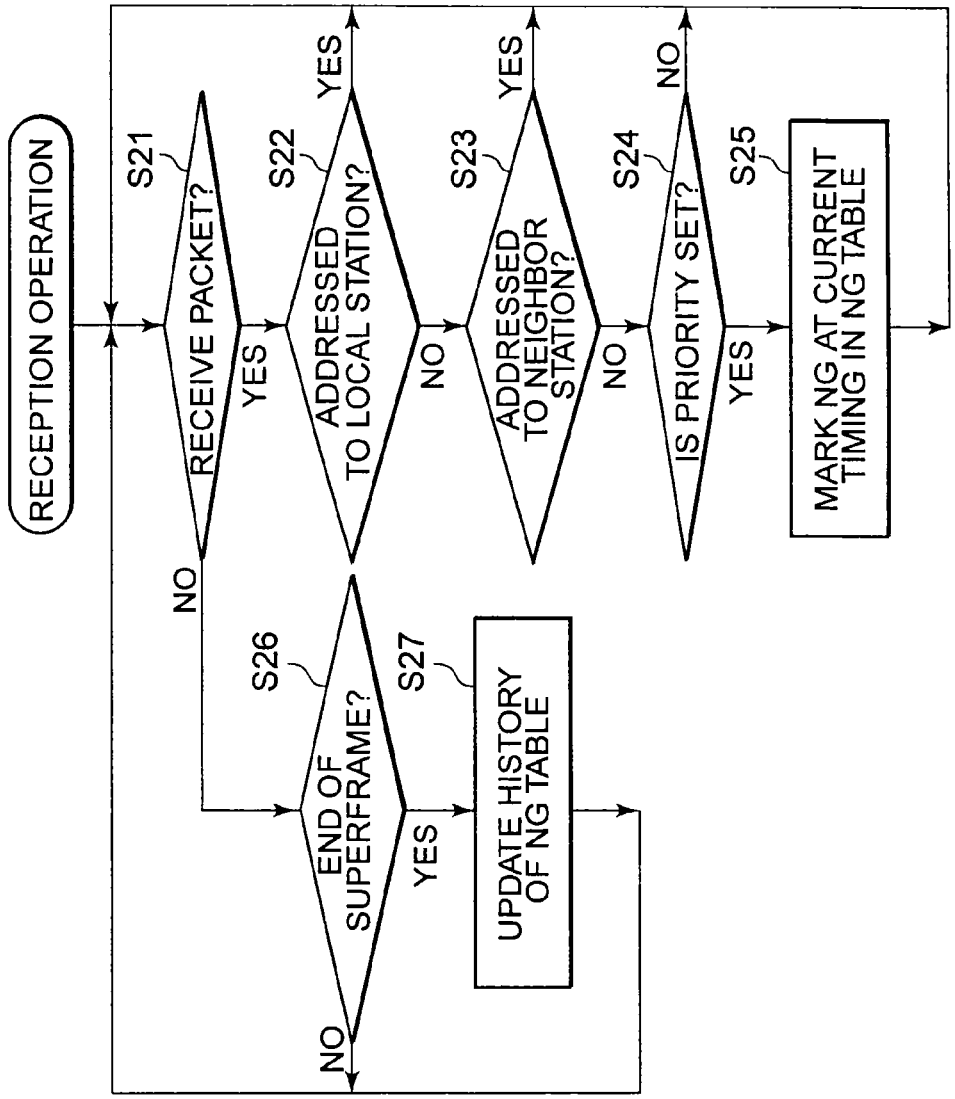
FIG. 23 is a flowchart showing the processing steps for marking a transmission/reception danger zone.

FIG. 23 shows the processing procedure for marking the transmission-reception dangerous zone in the shape of a flowchart. In the shown processing procedure, the processing which is partially different from the above description is shown. But even if either processing is performed, the desired advantages of the present invention can be realized.

When a communication station receives a signal (step S21), the communication station judges whether the destination of the received signal is the local station or not (step S22). Then, in a case where the received signal is addressed to the local station, the communication station does not perform the "mark processing of transmission-reception dangerous zone".

On the other hand, in a case where the received signal is addressed to another station, the communication station judges whether the destination of the received signal is an adjacent station of the local station or not (step S23). In a case where the destination of the received signal is a neighboring station, the communication terminal does not perform the "mark processing of transmission-reception dangerous zone". The judgment is not performed sometimes. The reason is that the mark of the transmission-reception dangerous zone should be performed independent of being a neighboring station or not.

On the other hand, in a case where the received signal is not addressed to any neighboring stations (step S23), the communication station further examines the priority of the received signal (step S24). Here, in a case where the priority of the received signal is judged to be low, the processing of marking the transmission-reception dangerous zone is not performed. On the other hand, in a case where the priority of the received signal is judged to be high, the time zone corresponding to the present time is marked as the "transmission-reception dangerous zone", and the NG Table preserving the "transmission-reception dangerous zone" information is updated (step S25).

Moreover, the communication station also monitors the lapse of time, and includes a function of judging whether a unit time such as a gap of super frames has lapsed or not. The communication station judges whether the unit time has lapsed or not by the monitoring (step S26). Then, in a case where it is recognized that the unit time equivalent to the super frame has lapsed, the communication station performs the updating such as deleting a part of the history of the NG Table being the "transmission-reception dangerous zone" information preserved until now (step S27). Thereby, the processing of clearing the past "transmission-reception dangerous zone" is executed, and the keeping of the latest "transmission-reception dangerous zone" can be performed.

I-4. Prioritized Transmission Procedure Part 1

Figure 24:
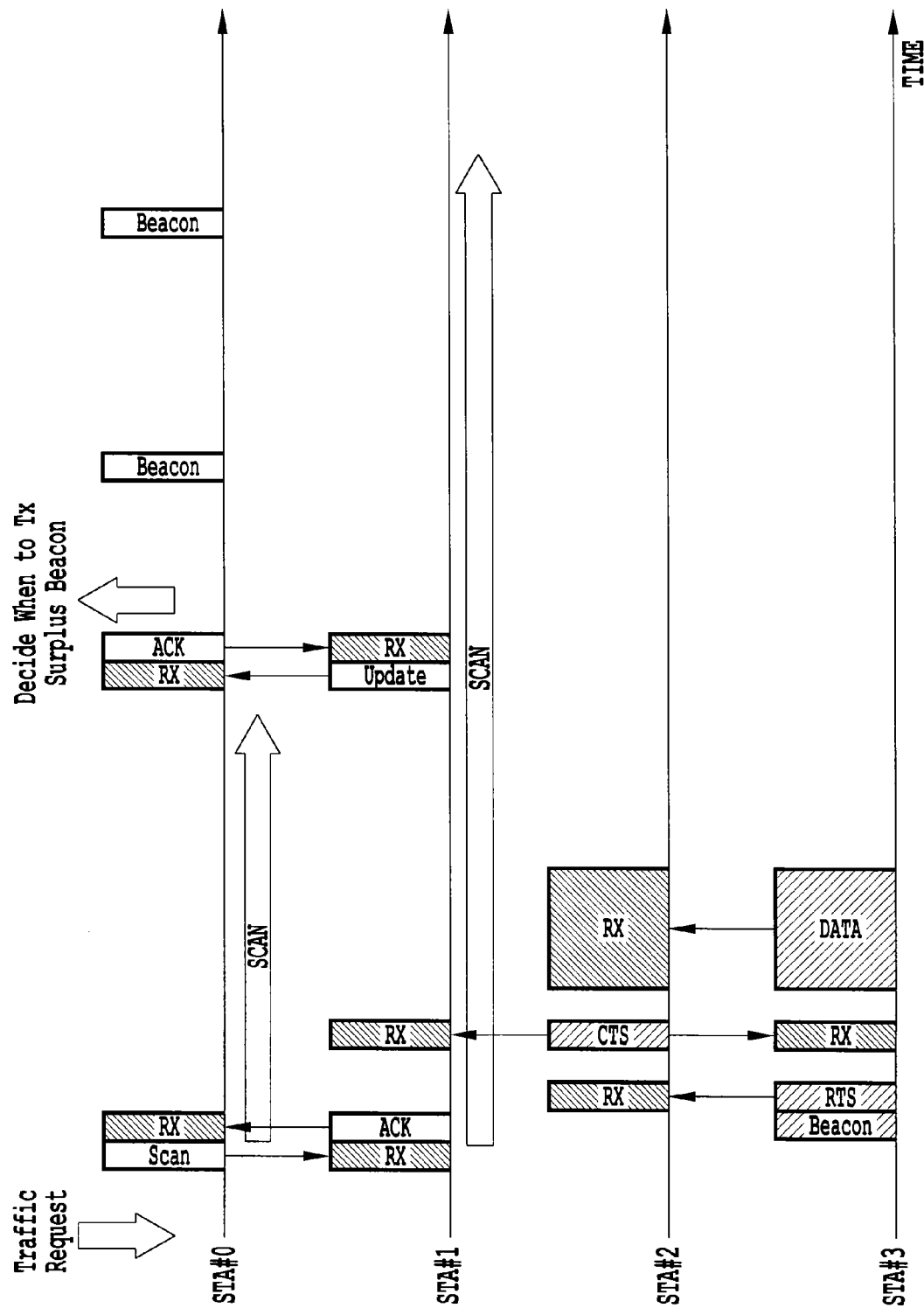
FIG. 24 is a view for explaining processing steps for a case of transmitting prioritized traffic using sub beacons.
Figure 25:
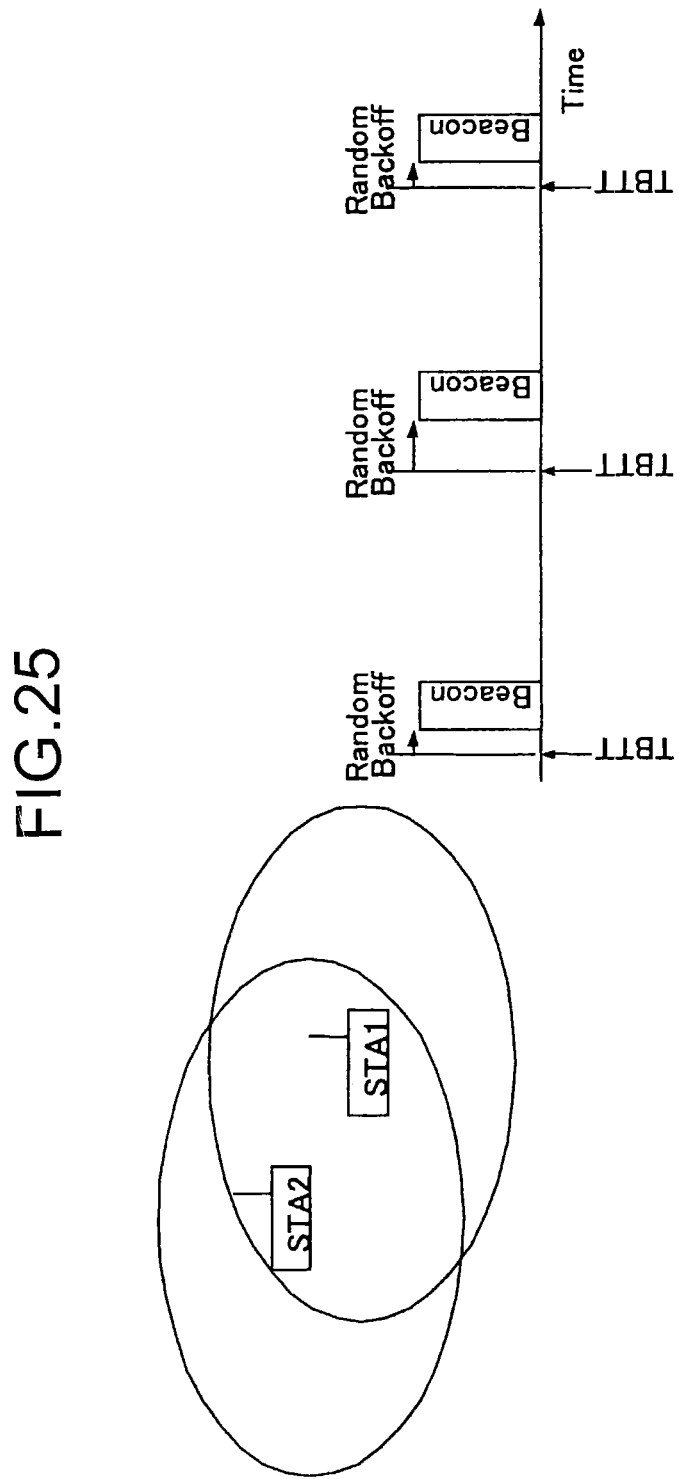
FIG. 25 is a view for explaining an operation of IEEE 802.11 in ad-hoc mode.

For example, the procedure of a case where the transmission of prioritized traffic is performed by using a sub beacon jointly is described in the following with reference to FIG. 24. However, in the example shown in the drawing, similarly to the case shown in FIG. 16, it is supposed that only the mutually adjacent communication stations are located within an electric wave arriving range. In the shown example, a case where the communication station #0 performs the transmission of the prioritized traffic to the communication station #1 is supposed.

When the communication station #0 is given a transmission request of prioritized traffic from an upper layer of the communication protocol, the communication station #0 transmits a message (the message shown as Scan in the drawing) to the communication station #1 being the destination of the traffic which message notifies of the intension of requesting a report of "transmission-reception dangerous zone" owing to the intension of the transmission of prioritized traffic.

The communication station #1, which has received the message, performs the scanning processing for one super frame, and performs the extraction of the "transmission-reception dangerous zone" in accordance with the procedure described above. The communication station #1 sends back a message (the message shown by Update in the drawing) reporting the results of the scanning and the extraction to the communication station #0. Moreover, the communication station #0 itself performs the scanning processing for grasping the position of a vacant time zone for a prioritized traffic transmission using a sub beacon transmission jointly.

The communication station #0 receives the Update message from the communication station #1 so that the communication station #0 can grasp which time zone is the dangerous time zone for the communication station #1. By using the procedure described with reference to FIG. 19 jointly while avoiding the dangerous time zone, the communication station #0 determines the transmission time of the sub beacon for accommodating the traffic addressed to the communication station #1 therein, and begins to transmit the sub beacon.

On the other hand, the communication station #1 continues to perform the scanning processing after that. Thereby the communication station #1 receives the sub beacon from the communication station #0 to grasp at which time zone the communication station #0 determined to transmit the sub beacon. Thereby, the communication station #1 preserves the time zone as the time zone to be used for future reception.

I-5. Prioritized Transmission Procedure Part 2

A communication station performs the scanning processing at a fixed time. Then, the communication station sets the NBOI bit of a transmission beacon on the basis of the information obtained by the scanning (namely at which time zone the beacon has been received). Moreover, the communication station informs by the NBAI bit of which time zone the reception of the beacon has been performed in. If NBAI/NBOI bits are set in accordance with the rule described already, the information shown in the following table is informed.

TABLE 2

| NBAI | NBOI | SITUATION IN THE TIME ZONE |
|---|---|---|
| 0 | 0 | EXISTENCE OF BEACONS IS NOT ASCERTAINED IN THE TIME ZONE |
| 0 | 1 | EXISTENCE OF BEACONS IS GASPED IN THE TIME ZONE, BUT RECEPTION PROCESSING OF THE BEACON IS NOT PERFORMED IN THIS TIME ZONE |
| 1 | 1 | EXISTENCE OF BEACONS IS GRASPED IN THE TIME ZONE, AND RECEPTION PROCESSING OF THE BEACON IS PERFORMED IN THIS TIME ZONE |

At the time of setting the NBOI and the NBAI bit, also the notifying of the information of the "transmission-reception dangerous zone" is considered. The NBOI bit and the like are fields made up on the basis of the information obtained by the results of scanning, and the information of the "transmission-reception dangerous zone" is also the information obtained by the result of scanning. Consequently, the intermixing of these pieces of information is structurally easy. As a result, the NBAI/NBOI bits are set as follows.

TABLE 3

| NBAI | NBOI | SITUATION IN THE TIME ZONE |
|---|---|---|
| 0 | 0 | EXISTENCE OF BEACON IS NOT ASCERTAINED IN THE TIME ZONE, AND THE TIME ZONE IS NOT "TRANSMISSION-RECEPTION DANGEROUS ZONE" |
| 0 | 1 | EXISTENCE OF BEACON IS GRASPED IN THE TIME ZONE, BUT RECEPTION PROCESSING OF THE BEACON IS NOT PERFORMED IN THE TIME ZONE |
| 1 | 1 | EXISTENCE OF BEACON IS GRASPED IN THE TIME ZONE, AND RECEPTION PROCESSING OF THE BEACON IS PERFORMED IN THE TIME ZONE |
| 1 | 0 | EXISTENCE OF BEACON IS NOT GRASPED IN THE TIME ZONE, BUT THE TIME ZONE IS "TRANSMISSION-RECEPTION DANGEROUS ZONE" |

For example, when the NBAI/NBOI bits are "00", the existence of any beacons is not ascertained in the time zone (slot), and consequently it can be concluded that the time zone is not a transmission-reception dangerous zone. Moreover, because the combination of the NBAI/NBOI bits being "10" is one of the bit string being impossible in an ordinary beacon receiving operation, the present embodiment uses the combination for clearly indicating that the time zone is a transmission-reception dangerous zone.

That is to say, in a case where a communication station which has received a beacon performs a frame transmission to the beacon transmission station, the communication station can know the time zone in which reception is not guaranteed on the basis of the combination of the NBAI and NBOI of the received beacon. A convenient slot in a super frame (i.e. a slot being not a transmission-reception dangerous zone) can be discriminated. In other words, by decoding the combination of the NBAI and the NBOI of a beacon received from the frame transmission partner station, the communication station can perform transmission while avoiding the transmission-reception dangerous zone.

As described above, by introducing a structure in which communication stations inform of their transmission-reception dangerous zones to one another, the situation in which communication cannot performed owing to the circumstances of a reception station as being exemplified by the times T0 and T5 in FIG. 15 can be avoided.

In the above description, in a case of the location of the communication stations as shown in FIG. 15, for example, the communication station #2 and the communication station #3 severally perform prioritized communication. Consequently, the communication station #1 located in the neighborhood of the communication station #3 is in the state in which the communication station #1 cannot perform any transmission. In this case, the communication station #0 cannot know the transmission propriety situation of the communication station #1 independent of being prioritized communication or not. Consequently, the communication station #0 performs a transmission to the communication station #1 in vain, though the communication station #1 is in the transmission impossible state. On the contrary, the present embodiment can avoid such a situation. That is to say, the communication station #0 can know the time zone in which reception is not guaranteed on the basis of a combination of NBAI and NBOI of the beacon received from the communication station #0.

It is noted that in a case where sub beacons exist but the destination of the communication transmitted by using the transmission prioritized periods TPP obtained from the sub beacons is fixed to a specific communication station, the communication station marks the NBAI/NBOI bits of the time zone (slot) in which the sub beacon addressed to another station is received as "10", and informs the communication partner of the local station or the like of a fact that the slot is the "transmission-reception dangerous zone".

In a case where the NBAI/NBOI bits are defined as shown in Table 3, on the side of the beacon reception station, it is dangerous to use the time zone (slot) in which 1 is described as the NBAI, even if 0 is described as the NBOI. Accordingly, it is preferable to deal with a result of an OR (logical sum) operation of the mutual corresponding bits of the NBAI and the NBOI of the received beacons as the NBOI. That is to say, when a communication station which has received a beacon extracts novel beacon transmission timing, the communication station judges that all of the slots in which the NBAI/NBOI bits of the received beacon is not described as "00" severally have a description of 1 as the NBOI bit. After that, the communication station searches the vacant slot in the super frame by the procedures shown in FIGS. 13 and 19 (namely the procedures of operating the OR of each NBOI after aligning the offsets). The reason of the search is that the procedures shown in FIGS. 13 and 19 are not essentially performed according to 1/0 of the NBOI bit, and that the procedures should be performed according to whether a predetermined time zone is vacant or not.

Moreover, in a case where the NBAI/NBOI bits are defined as shown in Table 3, on the side of the beacon reception station, even if 1 is described as the NBAI, as long as the time zone (slot) in which 0 is described as the NBOI, a transmission can be judged to be possible. Accordingly, it is preferable to deal with a result of AND (logical product) operations of mutually corresponding bits of the NBAI and NBOI of the received beacon as the NBAI. That is to say, the communication station which has received a beacon sets only the time zones (slots) in which the NBAI/NBOI bits are marked as "11" as the transmission-disallowed period at the time of the setting of the transmission-disallowed period described pertaining to the section F. The reason is that in the time zones in which NBAI/NBOI bits are set as "10", though the NBAI bit is set to be 1, the transmission station of the beacon informs of the nonexistence of the signal which the local station intends to receive in the time zone, in other words, the transmission station simultaneously suggests that there is no possibility of hindering the reception of the transmission station of the beacon. As described above, the setting of the transmission-disallowed period is not essentially performed according to the bit string of 1/0 of the NBAI bits, but the setting should be performed according to whether the reception of the beacon transmission station is hindered or not.

To summarize the above, as to the NBAI/NBOI field, what meaning the upper one bit (NBAI) and the lower one bit (NBOI) in each slot have is not important, but it is important to inform the situation of each time zone (slot) in the super frame separated by every TBTT in a bit map such as the NBAI/NBOI of the peripheral communication stations.

In a case where a communication station B transmitting a sub beacon with an object of accommodating the prioritized traffic addressed to a certain specific communication station A extracts a sub beacon transmission time zone from the time zones in which at least the NBAI/NBOI bits of the beacons transmitted from the communication station A are set "00" by referring to the NBAI/NBOI bits of the communication station A, the communication by means of the transmission prioritized period TPP can be stably provided.

Moreover, a communication station can grasp the transmission-reception dangerous zone of a beacon transmission station by referring to the NBAI/NBOI bits of the beacons received from neighboring stations, and the communication station can know that the communication station is in the transmission-disallowed state in the transmission-reception dangerous time zone.

Because the possibility that no responses can be obtained even when transmission to a communication station is performed is high even in a case of not performing any prioritized transmission in a transmission-reception dangerous zone of the communication station, it also becomes possible to refrain the transmission to the communication station. Thereby, ineffectual transmissions can be reduced. In this case, the processing of giving up the transmission to the communication station for a while when no responses can be obtained after transmitting RTS to the communication station several times may be used jointly.

I-6. Supplementary Part 1

Operation examples in the other aspects in a case where the transmissions and the receptions of signals by the prioritized transmission procedure describe in the preceding section I-5 are described with reference to FIGS. 35, 36, 37,

41 and 42. In the following description, it is supposed that five communication stations of STA1, STA2, STA3, STA4 and STA5 exist.

Figure 35:
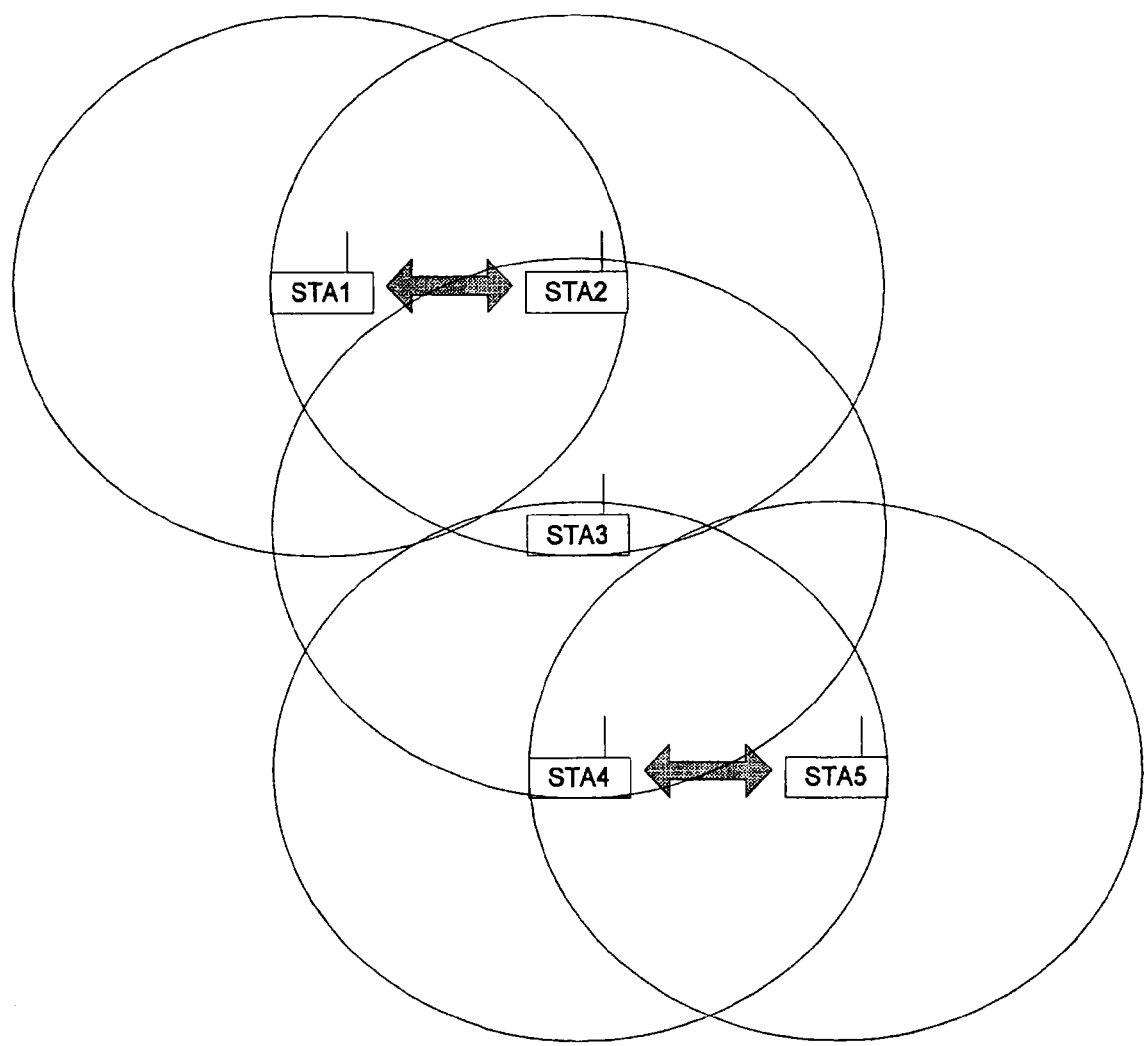
FIG. 35 is a view showing an example of network topology.

FIG. 35 schematically shows a supposed network topology. In the shown example, the STA1 is located at a position where the STA1 can communicate only with the STA2, the STA2 is located at a position where the STA2 can communicate with the STA1 and the STA3, the STA3 is located at a position where the STA3 can communicate with the STA2 and the STA4, the STA4 is located at a position where the STA4 can communicate with the STA3 and the STA5, and the STA5 is located at a position where the STA5 can communicate only with the STA4.

Figure 36:
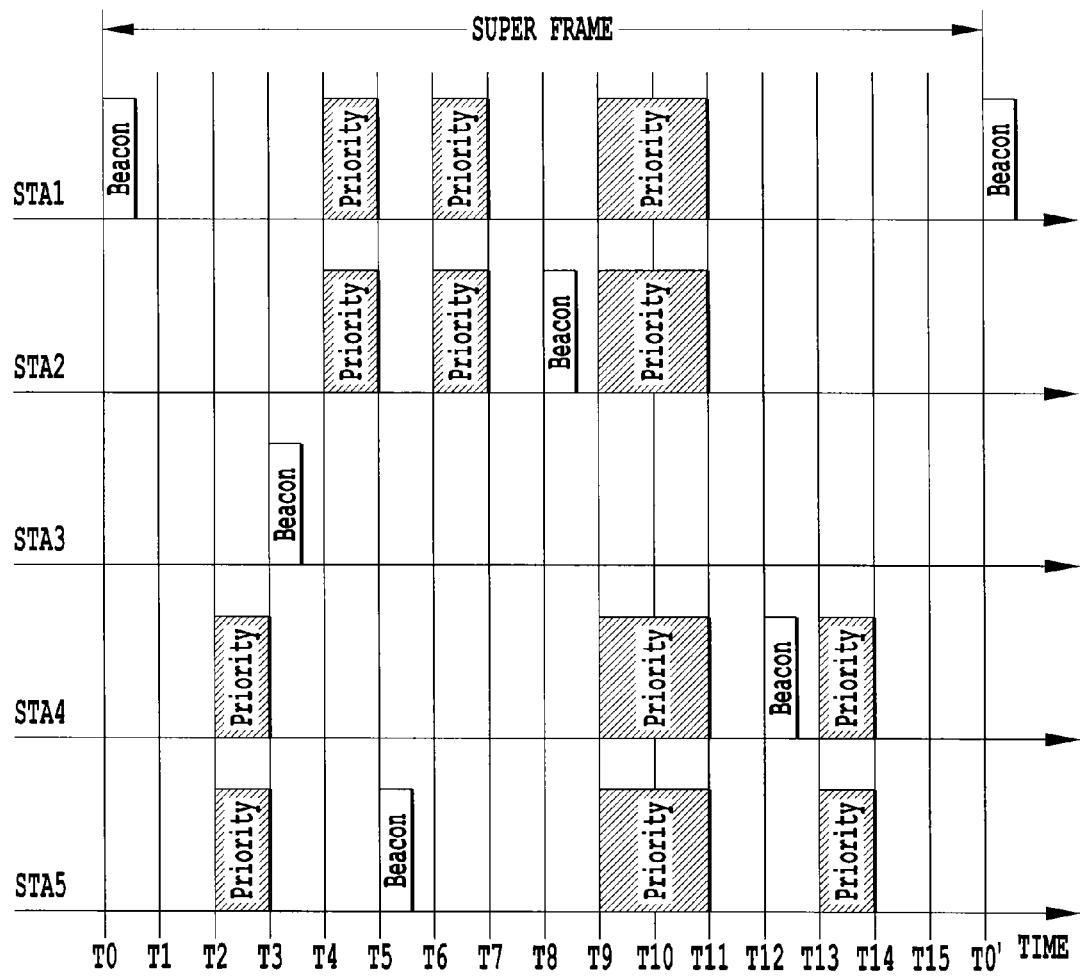
FIG. 36 is a structural example of a super frame in the network topology as shown in FIG. 35.

FIG. 36 shows an example of the configuration of a super frame in a network topology as shown in FIG. 35. In the shown example, the super frame is defined as the beacon transmission interval of the communication stations. One super frame is composed of 16 TBTTs (slots) of T0 to T15.

In the super frame, it is supposed that each of the communication stations STA1 to STA5 sets beacon transmission time zones and prioritized transmission time zones at the timing as shown in FIG. 36. That is to say, the STA1 performs a beacon transmission at a time T0, the STA2 performs a beacon transmission at a time T8, the STA3 performs a beacon transmission at a time T3, the STA4 performs a beacon transmission at a time T8, and the STA5 performs a beacon transmission at a time T5. Moreover, the STA1 and the STA2 perform prioritized communication with each other at times T4, T6 and T9 and T10, and the STA4 and the STA5 perform prioritized communication with each other at times T2, T9 and T10, and T13.

Here, an ordinary beacon transmission times do not generate any collisions between each communication station. On the other hand, among the time zones in which of each of the communication stations STA1, STA2, STA4 and STA5 performs prioritized communication, the prioritized communication are simultaneously performed at times T9 and T10, and the STA3 can simultaneously receive the prioritized communication. Consequently, collisions are generated. However, because both of the prioritized transmissions performed here are communication having nothing to do with the STA3, it is not necessary for STA3 to receive the communication.

Consequently, in this case, the STA3 has a possibility that the STA3 performs duplicate reception of sub beacons in the time zones of the same TBTT. However, the STA3 does not recognize that as a collision so that the STA3 does not activate the procedure for changing TBTT owing to the collisions of beacons. As a result, the time arrangement shown in FIG. 36 is not treated as one in which collisions are generated, and communication operations are continued.

Figure 37:
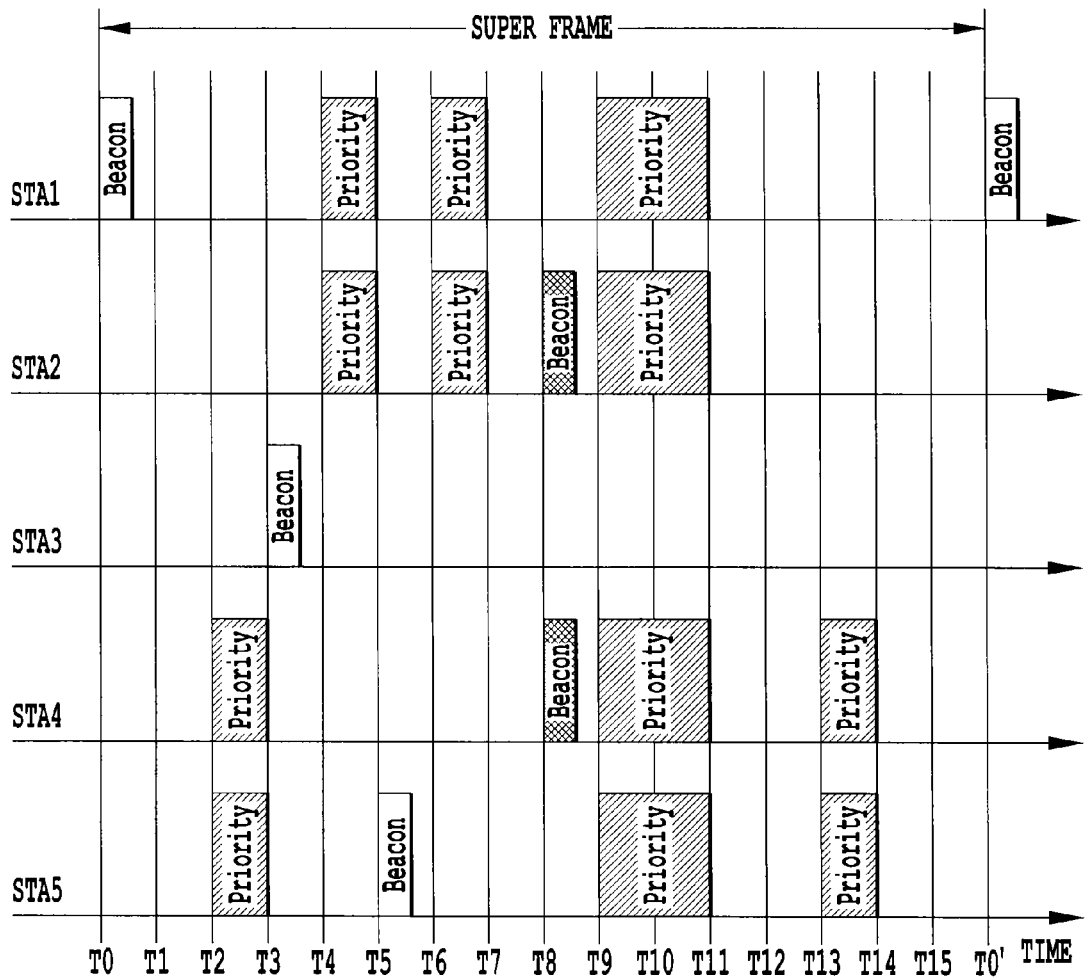
FIG. 37 is a structural example of a super frame in the network topology as shown in FIG. 35.

On the other hand, in a case where each communication station transmits a signal at the timing shown in FIG. 37 in the same network topology as shown in FIG. 35, the beacons of the STA2 and the STA4 are transmitted at the same time (time T8), and the STA3 receives the them in the same time zone. In this case, the STA3 judges that collisions of beacons are generated, and the STA3 transmits a message requesting the change of beacon transmission times to the either communication station STA2 or STA4. The communication station which has received the message performs scanning processing to find a vacant slot in the super frame similarly to the initial operation described above. Then, the communication station sets a novel TBTT to grow out of the beacon collision state.

Figure 41:
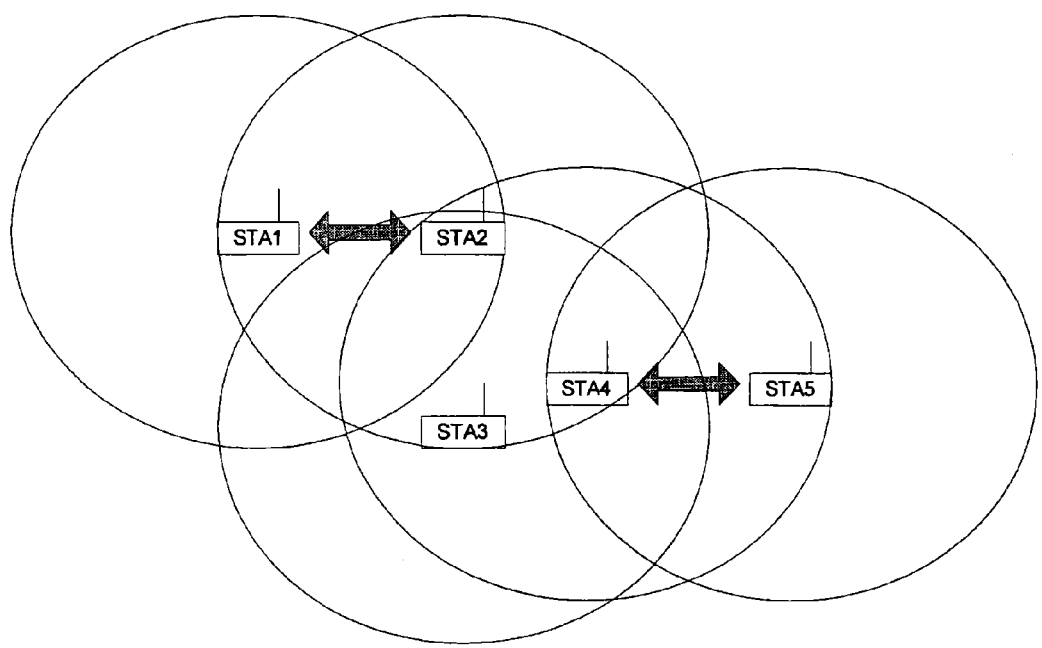
FIG. 41 is a view showing an example of network topology.
Figure 42:
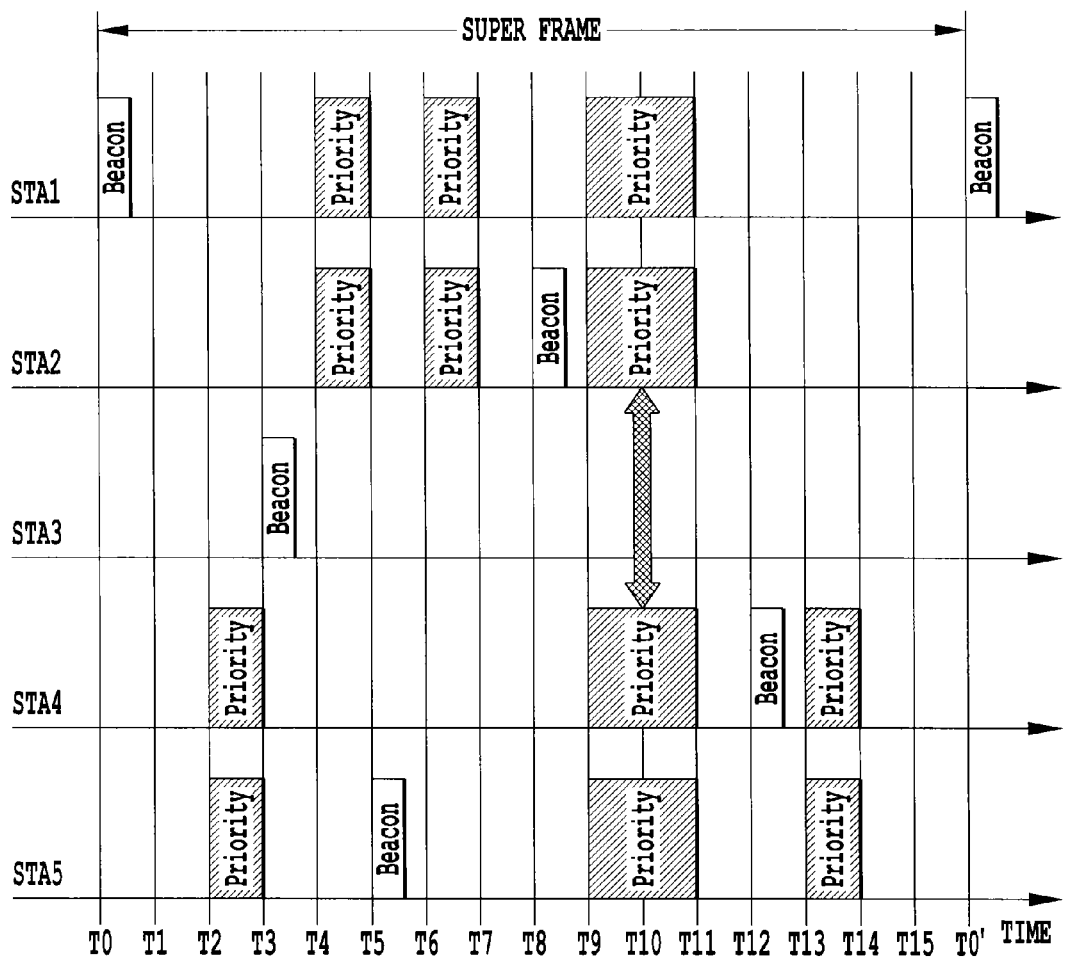
FIG. 42 is a structural example of a super frame in the network topology as shown in FIG. 41.

Next, a case where, for example, the STA4 and the STA5 moved and each communication station is arranged as shown in FIG. 41 is considered. In the example shown in the drawing, the STA2 and the STA4, which have not been located in a mutual communication area until now, have moved in a range capable of directly communicating with each other. In this case, if it is supposed that each communication station sets beacon transmission time zones and prioritized transmission time zones at the same timing as that shown in FIG. 36, the time zones at the times T9 and T10 being a part of the prioritized transmission time zones of the STA2 and the STA4 coincide with each other owing to the movements of communication stations (see FIG. 42). Consequently, the coincidence is recognized as a collision between the STA2 and the STA4. In this case, either communication station of the STA2 or the STA4 performs the scanning processing similarly to the initial operation described above, and thereby detects a vacant slot in the super frame. Then the communication station sets a novel TBTT for a prioritized communication time zone, and thereby the communication stations grow out of the collision state of the prioritized communication time zones.

I-7. Supplementary Part 2

In the section I, descriptions have been given until now on the basis of the supposition that each communication station transmits a beacon in a vacant slot (TBTT) in a super frame. According to the basic beacon transmission procedure, only one beacon is allowed to be disposed in each slot constituting the super frame.

On the other hand, in the present item, a network operation implemented without obeying the basic beacon transmission procedure described above is described with reference to FIGS. 38 to 40. There is a case where a communication station determined to perform communication only with a certain specific communication station in a network transmits a beacon at different timing exceptionally. In the shown example, the STA2 determines that the STA2 performs communication only with the STA1.

Figure 38:
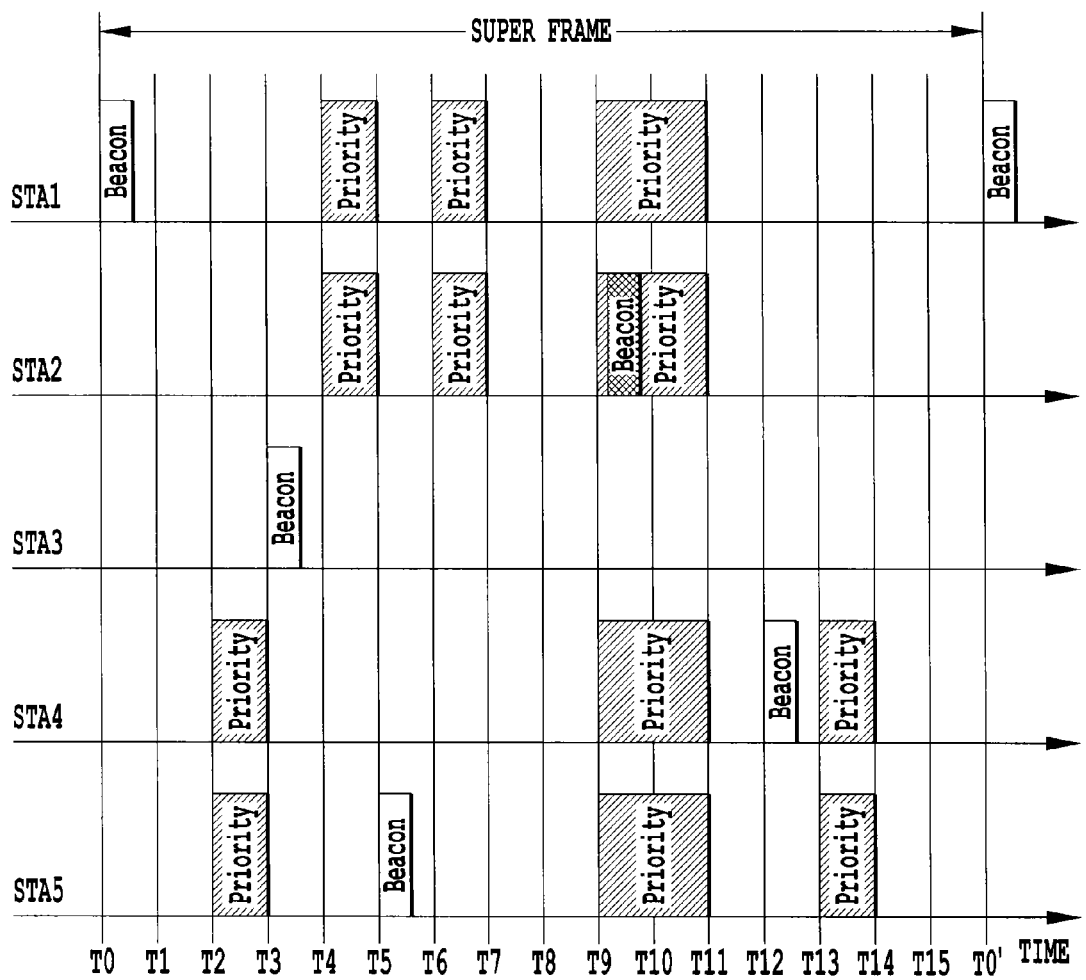
FIG. 38 is a view for explaining an operation of transmitting a beacon at an exceptional timing by the communication station.

FIG. 38 shows a situation in which the STA1 and the STA2 perform communication with each other by a prioritized transmission at the times T4, T6 and T9 and T10 similarly to the situation shown in FIG. 37. However, because it is determined that the STA2 performs communication only with the STA1 in the example shown in FIG. 38, no beacon transmission timing TBTT only for the local station is set in the super frame, and in place of it, the transmission of a beacon is performed in the prioritized communication time zone at the time T9.

Figure 39:
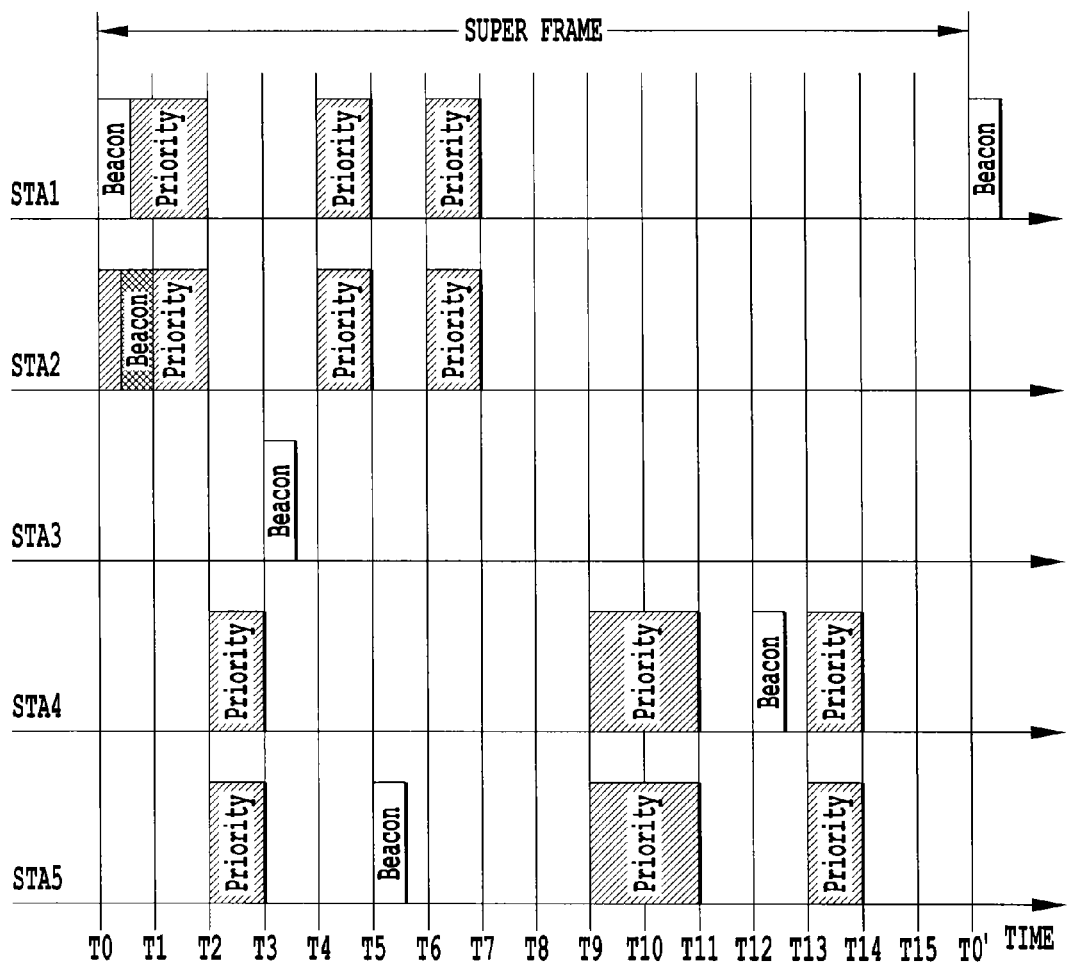
FIG. 39 is a view for explaining an operation of transmitting a beacon at an exceptional timing by the communication station.

Moreover, in the example shown in FIG. 39, with the beacon transmission by the STA1 at the time T0 as the start, prioritized communication is performed between the STA1 and STA2 in a period from the time T0 to the time T1. Because it is determined that the STA2 performs communication only with the STA1, no beacon transmission timing TBTT only for the local station is set in the super frame. In place of it, the STA2 performs a beacon transmission in the midst of the prioritized communication by using the same slot as that for the beacon transmission of the STA1 being the communication partner.

Figure 40:
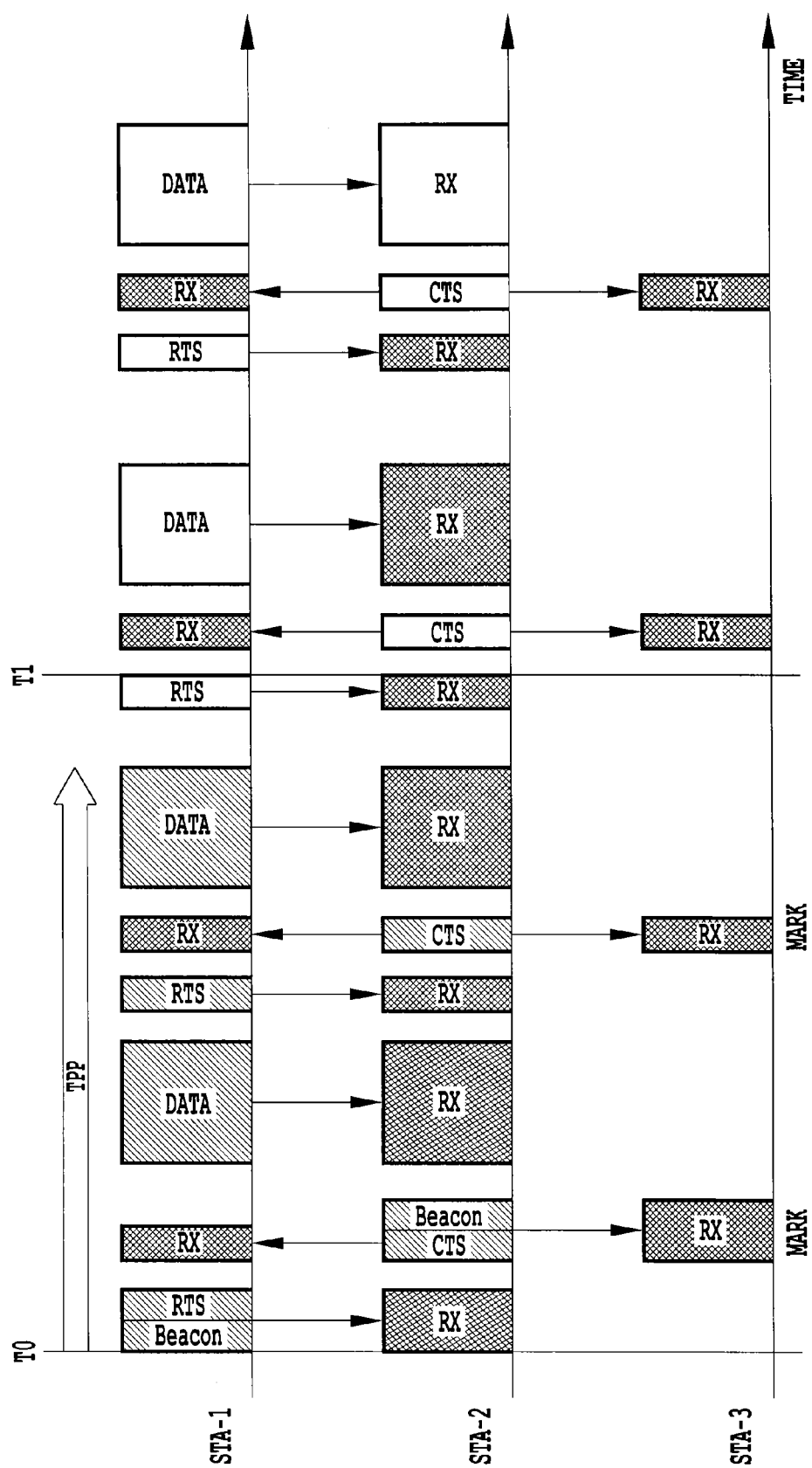
FIG. 40 is a view for explaining the beacon transmission steps of STA2 shown in FIG. 38 and FIG. 39.

The beacon transmission procedure of the STA2 in the situation shown in FIGS. 38 and 39 is drawn in FIG. 40 in detail. In FIG. 40, the time zones T0 and T1 in which the STA1 performs prioritized communication with the STA2 is shown in enlarged scales.

Because the STA1 is in the communication state with the STA2, the STA1 transmits a signal generated by multiplexing the RTS with an ordinary beacon (normal beacon) or a sub beacon to the STA2 when the STA1 enters the prioritized transmission time zone. In response to the transmitted signal, the STA2 sends back a CTS, and at this timing the STA2 multiplexes a beacon of the local station together with the CTS to transmit the multiplexed signal. The prioritized communication between the STA1 and the STA2 after that is continued according to the RTS/CTS procedure similarly to the way described above.

The procedure of the transmission of the beacon transmitted by such a way differs from the beacon transmission procedure described above in which the beacon is transmitted after setting an ordinary TBTT. That is to say, a communication station determined to perform communication only with a specific communication station transmits a beacon of the local station by the use of a period in which the prioritized communication with the specific communication station is performed. In the present specification, a beacon transmitted by the communication station having specified a communication partner, by the use of a communication operation with the specified communication partner, without using an ordinary beacon transmission procedure is defined as a "parasitic beacon". Moreover, the communication station specified as the communication partner is called as a "parasitic destination". The parasitic beacon is brought into existence between the communication stations which are in the so-called master-slave relationship. In the example shown in FIGS. 38 to 40, the STA1 operating as a master apparatus is a parasitic destination of the STA2 operating as a slave apparatus.

The frame format configuration of an ordinary beacon (normal beacon) has been already described with reference to FIG. 11. In a case of a parasitic beacon, for example, a frame is transmitted after describing a fact that it is a parasitic beacon into the Type field, and describing a value indicating how much the parasitic beacon is delayed to be transmitted into the Delay field on the basis of the TBTT of the STA1 being a parasitic destination.

Thereby, the communication station which has received the parasitic beacon recognizes that the beacon received is an exceptional beacon different from ones transmitted every super frame, and detects the TBTT of the communication station being the parasitic destination of the parasitic beacon. Thereby the communication station can perform the synchronization processing of the TBTT. Moreover, even in a case where the communication station which has received the parasitic beacon has received parasitic beacon in the time zone of the TBTT same as that of the other ordinary beacons, the communication station does not regards the situation as a collision of beacons, and does not activate the TBTT change procedure. It is needless to say that, even in a case where the communication station receives two or more parasitic beacons in a single time zone of the TBTT, the communication station does not regard the situation as the collision of beacons and does not activate the TBTT change procedure.

I-8. Supplementary Part 3

Figure 43:
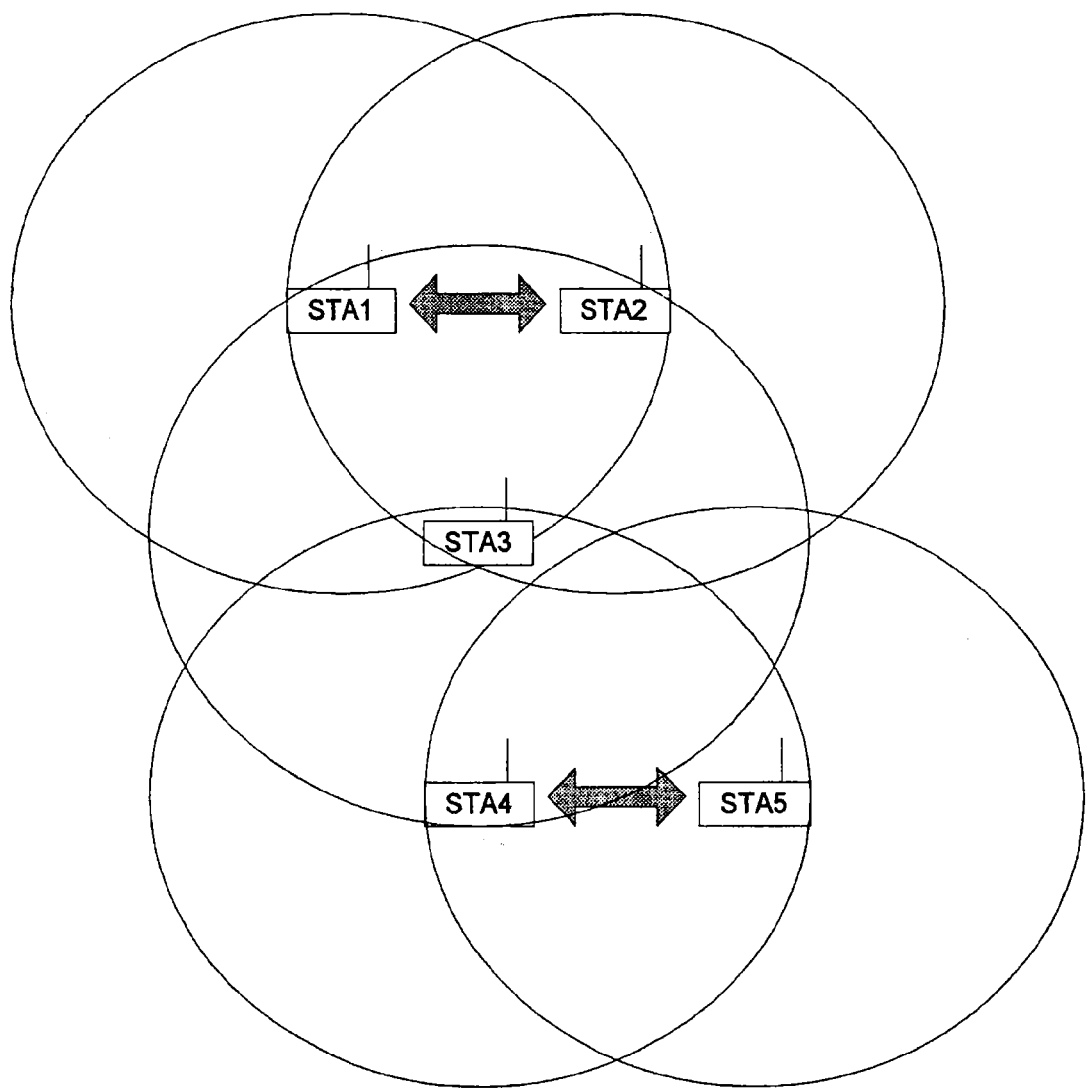
FIG. 43 is a view showing an example of network topology.
Figure 44:
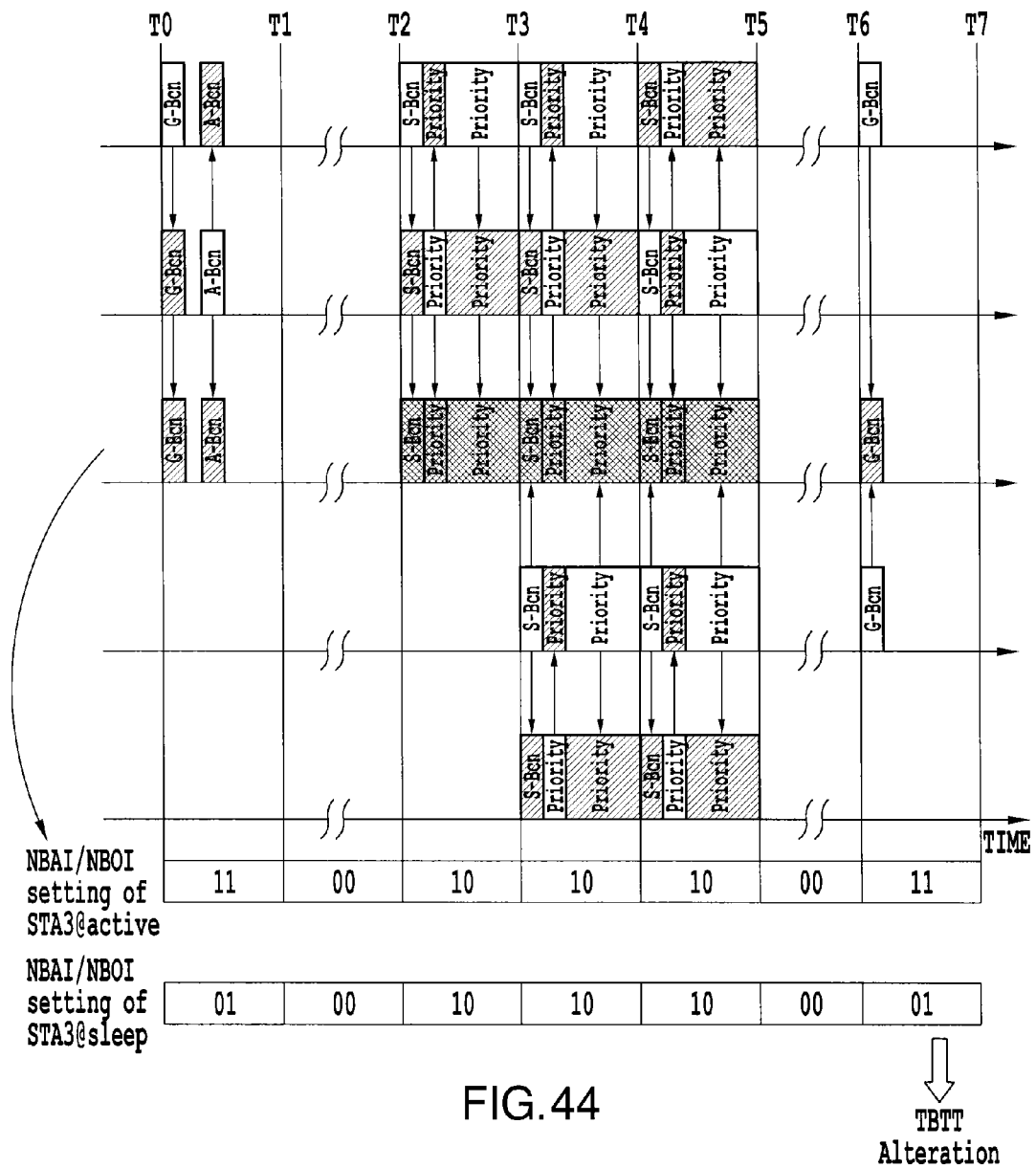
FIG. 44 is a view for explaining behaviors of STA3 in accordance with situations in the network topology shown in FIG. 43.
Figure 45:
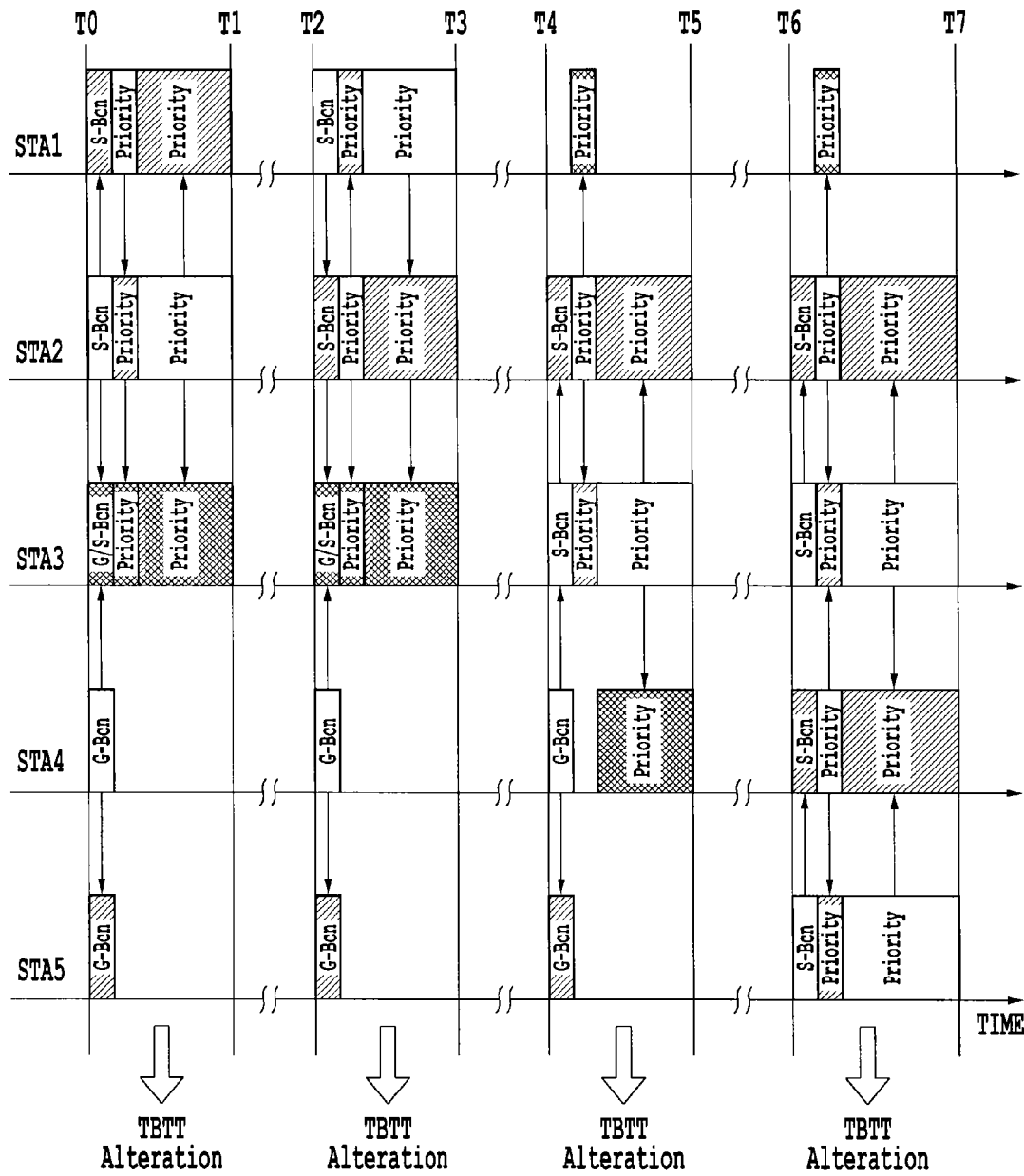
FIG. 45 is a view for explaining behaviors of STA3 in accordance with situations in the network topology shown in FIG. 43.

In this item, the contents of processing in the situation described with regard to the supplementary part 1 is described more minutely with reference to FIGS. 43 to 45.

FIG. 43 shows an example of the arrangement of communication stations supposed in the following description. In the shown example, there are five communication stations from STA1 to STA5. Then, the STA1, the STA2 and the STA3 are located at positions within a range in which the communication stations can mutually communicate, and the STA4 and the STA3 are located at positions within a range in which the communication stations can mutually communicate. Furthermore the STA4 and the STA5 are located within a range in which the communication stations can mutually communicate. In a case where such an arrival range of a signal is given, the behavior of the STA3 according to each situation is described with reference to FIGS. 44 and 45. Incidentally, the abscissa axes shown in FIGS. 44 and 45 indicate time, and an interval from the time T0 to the time T1 indicates a slot, namely the interval of the beacon transmission timing TBTT.

In the example shown in FIG. 44, the STA1 transmits an ordinary beacon (G-Bcn) at the time T0. Then, the STA2 specifies only the STA1 as a communication partner, and the STA2 uses the same time zone T0 to transmit a parasitic beacon (A-Bcn).

In this case, the STA3 receives the beacons of both of the STA1 and the STA2 in the same time zone T0. Because one of the received beacons in duplication is a parasitic beacon, the STA3 does not recognize the beacons as a collision of the beacon transmission timing TBTT, and does not activate the TBTT change procedure. Moreover, at the bit positions equivalent to the time zone T0 of the NBAI/NBOI recorded in a beacon transmitted by the STA3, "11" (indicating the existence of a beacon at that time and the desire of unhindered reception) is set in a case where the STA3 receives a beacon of the STA1, or "01" (indicating the existence of a beacon at the time and a not received state) is set in a case where the STA3 does not receive any beacons from the STA1.

Moreover, in FIG. 44, in each time zone of the times T2, T3 and T4, prioritized communication is performed between the STA1 and the STA2. These signals are also received by the STA3 although they are not necessary to be received by the STA3. Moreover, at the times T3 and T4, the prioritized communication is performed between the STA4 and the STA5. These signals are also received by the STA3 although they are not necessary to be received by the STA3.

In such a situation, the collision of signals is generated in the STA3, but there are no communication stations which are troubled by the collision. Consequently, the STA3 does not recognize the collision as the collision in the prioritized transmission time zone, and does not activate the TBTT change procedure. Moreover, at a bit position equivalent to the time zone of the NBAI/NBOI of a beacon transmitted by the STA3, "10" (indicating the existence of a signal having nothing to do with the local station and being the "transmission-reception dangerous zone") is set.

A neighboring station which has received a beacon from the STA3 refers to a bit string of the NBAI/NBOI, and finds the "10" set in the NBAI/NBOI bit at the bit position corresponding to the T3 and T4 of the super frame. Thereby, the neighboring station recognizes that these time zones are the transmission-reception dangerous zones for the STA3. Because there is a high possibility of returning no replies even if transmission to the STA3 is performed in the transmission-reception dangerous zones, the neighboring station can also restrain the transmission to the STA3.

Moreover, in FIG. 44, in the time zone of the time T6, the STA1 and the STA4 transmit an ordinary beacon (G-Bcn) in the same time zone. When the transmission times of both beacons shift from each other owing to the shifts of TBTT offset in each beacon transmission station, the STA3 can recognize that these duplicate beacons are transmitted in the same time zone.

In this case, the STA3 activates the TBTT change procedure, and transmits a message to either communication stations of the STA1 or the STA4 for informing the communication station of the desire of changing the TBTT. Moreover, at the bit position equivalent to the time zone of the NBAI/NBOI of the beacon transmitted by the STA3, "11" (indicating the existence of a beacon at the time and the desire of not being hindered) is set in a case where the STA3 receives the beacon of the STA1, or "01" (indicating the existence of a beacon at the time and the state of being not received) is set in a case where the STA3 does not receive any beacons of the STA1.

Moreover, FIG. 45 shows the situations judged to be a collision of signals by the STA3 at each time zone T0, T2, T4 and T6.

In the time zones shown at the times T0 and T2 in FIG. 45, STA1 transmits an auxiliary beacon (S-Bcn), and the prioritized communication is performed between the STA1 and the STA2. These signals are also received by the STA3 although they are not necessary to be received by the STA3. Moreover, an ordinary beacon (G-Bcn) of the STA4 is transmitted in the same time zone. When the transmission times of both beacons shift from each other owing to the shifts of TBTT offset in each communication station, the STA3 recognizes that these duplicate beacons are transmitted in the same time zone. In this case, the STA3 activates the TBTT change procedure to transmit a message informing any one of the communication stations STA1, STA2 and STA4 of a desire of changing the TBTT.

Incidentally, here, a case where the STA1 and the STA3 are beyond the limits of communication is supposed. At the time T2, the STA3 cannot receive the sub beacons of the STA1, but can judge that prioritized communication is performed in the time zone in the neighborhood by referring to the priority field of the signal from the STA2. Accordingly, the STA3 transmits a message informing either communication stations of the STA2 and the STA4 of the desire of changing its TBTT.

Also, in FIG. 45, in the time zone of the time T4, the STA3 transmits a sub beacon (S-Bcn), and the prioritized communication is performed between the STA3 and the STA2. Moreover, in the same time zone, a normal beacon (G-Bcn) of the STA4 is transmitted. Then, when the transmission times of the mutual beacon signals shift from each other owing to the shift of the TBTT offset, the STA3 or the STA4 recognizes that they transmit signals in the same time zone.

In this case, the STA3 or the STA4 judges that the TBTT which the local station uses collides, and either station activates the TBTT change procedure to grow out of the collision state.

Moreover, in FIG. 45, in the time zone of the time T6, the prioritized communication is performed between the STA3 and the STA2. Moreover, in the same time zone, the prioritized communication is performed between the STA4 and the STA5. Then, when the transmission times of the mutual signals shift from each other owing to the shift of the TBTT offset, the STA3 or the STA4 recognizes that they transmits signals in the same time zone.

In this case, the STA3 or the STA4 judges that the TBTT which the local station uses collides, and either station activates the TBTT change procedure to grow out of the collision state.

In the above, the specific embodiments are referred to while the present invention is described in detail. However, it is apparent that a person skilled in the art can modify and substitute the embodiments without departing from the scope and the sprit of the present invention.

Although in the present specification, descriptions have been given to a following principal embodiment, but the subject matter of the present invention is not limited to the principal embodiment. The principal embodiment concerns the case where, in a self-organized distribution type wireless network, when each communication station evades collisions according to the detection of transmission signals from the other communication station while performing access control to a medium, each communication station sets a range within which the local station can perform communication.

The present invention can publicly applied to a communication system as long as each communication station secures a band in which the station can perform transmission with priority to perform a data transmission such as a communication system for performing medium access control randomly according to occupying state of the medium like a CSMA, or a communication system for performing medium access control by TDMA.

Moreover, in the present specification, descriptions have been chiefly given to embodiment in which the present invention is applied to a self-organized distribution type wireless network, but it is needless to say that the present invention can be similarly applied to networks having the formats other than the self-organized distribution type.

Moreover, the present invention can be applied to the medium access control in each channel of a multi-channel type communication system in which each communication station perform hopping over a plurality of frequency channels while performing communication.

Moreover, in the present specification, though a wireless LAN has been exemplified for describing the embodiments of the present invention, the subject matter of the present invention is not limited to the wireless LAN. The present invention can be suitably applied to a communication system such as an Ultra Wide Band performing signal transmission and reception in a lower SNR environment.

In short, the present invention has been disclosed in the form of exemplification, and accordingly the contents described in the present specification should not be interpreted limitedly. For judging the subject matter of the present invention, the claims described at the head of the specification should be considered.

What is claimed is:

1. A communication circuit used in a mesh station using a signal described in IEEE 802.11, comprising:
   a modulator circuit configured to output a modulated signal based on information specifying a duration of transmission opportunities and information specifying a periodicity of the transmission opportunities,
   wherein the mesh station sets an offset of the transmission opportunity indicating a beginning of the transmission opportunity with respect to a beginning of a transmission interval.

2. The communication circuit according to claim 1, wherein the communication circuit
   sets the information specifying the duration of the transmission opportunities and the information specifying the periodicity of the transmission opportunities,
   transmits the information specifying the duration of the transmission opportunities, the information specifying the periodicity of the transmission opportunities, and the offset of the transmission opportunity to at least one other mesh station, and
   outputs the modulated signal during the transmission opportunity.

3. A communication method performed in a mesh station using a signal described in IEEE 802.11, comprising:
   outputting, with circuitry, a modulated signal based on information specifying a duration of transmission opportunities and information specifying a periodicity of the transmission opportunities; and setting, with the circuitry, an offset of the transmission opportunity indicating a beginning of the transmission opportunity with respect to a beginning of a transmission interval.

4. The communication method according to claim 3, further comprising:
   setting the information specifying the duration of the transmission opportunities and the information specifying the periodicity of the transmission opportunities;
   transmitting the information specifying the duration of the transmission opportunities, the information specifying the periodicity of the transmission opportunities, and the offset of the transmission opportunity to at least one other mesh station; and
   outputting the modulated signal during the transmission opportunity.

5. A non-transitory computer-readable storage medium storing computer-readable instructions thereon, which, when executed by a mesh station using a signal described in IEEE 802.11, cause the mesh station to perform a method comprising:
   outputting a modulated signal based on information specifying a duration of transmission opportunities and information specifying a periodicity of the transmission opportunities; and
   setting an offset of the transmission opportunity indicating a beginning of the transmission opportunity with respect to a beginning of a transmission interval.

6. The non-transitory computer-readable storage medium according to claim 5, further comprising:
   setting the information specifying the duration of the transmission opportunities and the information specifying the periodicity of the transmission opportunities;
   transmitting the information specifying the duration of the transmission opportunities, the information specifying the periodicity of the transmission opportunities, and the offset of the transmission opportunity to at least one other mesh station; and
   outputting the modulated signal during the transmission opportunity.

* * * * *